(12) United States Patent
Maynard et al.

(10) Patent No.: US 11,214,209 B2
(45) Date of Patent: Jan. 4, 2022

(54) RACK OF UNITARY ONE-PIECE CONSTRUCTION

(71) Applicant: Isabrem, Ltd., Oakville (CA)

(72) Inventors: Lyman B. Maynard, Burlington (CA); Jason Pridmore, Oakville (CA); Brian Layfield, Oakville (CA)

(73) Assignee: Isabrem Ltd., Ontario (CA)

( * ) Notice: Subject to any disclaimer, the term of this patent is extended or adjusted under 35 U.S.C. 154(b) by 80 days.

(21) Appl. No.: 16/400,827

(22) Filed: May 1, 2019

(65) Prior Publication Data

US 2019/0381959 A1    Dec. 19, 2019

Related U.S. Application Data

(60) Provisional application No. 62/684,450, filed on Jun. 13, 2018.

(51) Int. Cl.
*B60J 1/00* (2006.01)
*B60R 9/06* (2006.01)
(Continued)

(52) U.S. Cl.
CPC .......... *B60R 19/24* (2013.01); *B60J 1/2094* (2013.01); *B60R 9/06* (2013.01); *B60R 19/03* (2013.01); *B62D 33/0207* (2013.01); *B29C 45/00* (2013.01); *B29L 2031/30* (2013.01); *B60R 2019/247* (2013.01); *B62D 33/06* (2013.01)

(58) Field of Classification Search
CPC .... B60R 9/08; B60R 9/02; B60R 9/06; B60R 19/44; B60R 19/54; B60R 21/026; B60R 21/12; B62D 33/0207; B62D 33/0222; B60J 1/2094; B60P 3/40

USPC ............ 296/3; 293/123; 280/748, 749, 756; 224/402–405; D12/181, 414, 167, 183, D12/414.1, 412, 93, 325, 343
See application file for complete search history.

(56) References Cited

U.S. PATENT DOCUMENTS 3,664,704 A * 5/1972 Ellis ....................... B62D 33/02
                                                         296/37.6
4,659,131 A   4/1987 Flournoy
(Continued)

OTHER PUBLICATIONS backrack.com [online], "The Original BACKRACK™ Truck Rack," retrieved on Feb. 2, 2020, retrieved from URL <https://backrack.com/truck-racks/backrack.html>, 5 pages.
(Continued)

*Primary Examiner* — Gregory A Blankenship
(74) *Attorney, Agent, or Firm* — Fish & Richardson P.C.

(57) ABSTRACT

A rack of unitary one-piece construction for mounting to a vehicle is disclosed. The rack may be made of plastic, and may be manufactured by injection moulding. The rack may be mounted and fastened to and fastened to a truck bed. The rack protects the rear window and the roof of the truck cab when the rack is mounted to the truck bed. A connector that is received in a stake pocket and fastened to a rail of the truck bed may be used to fasten the rack to the rail of the truck bed. The injection-moulded one piece plastic rack may allow for flexibility of ease of installation and uninstallation at leisure. Line of sight from the cab through the rear window may be provided with the rack mounted to the vehicle. The load supported by the rack may be distributed to its base.

12 Claims, 73 Drawing Sheets

(51) Int. Cl.
  *B62D 33/02* (2006.01)
  *B60R 19/24* (2006.01)
  *B60R 19/03* (2006.01)
  *B60J 1/20* (2006.01)
  B29L 31/30 (2006.01)
  B62D 33/06 (2006.01)
  B29C 45/00 (2006.01)

(56) References Cited

U.S. PATENT DOCUMENTS

| | | | | |
|---|---|---|---|---|
| 4,715,643 A * | 12/1987 | Butler | B60J 1/2088 | 264/138 |
| 4,867,497 A * | 9/1989 | Jayne | B60P 7/0815 | 296/3 |
| 4,953,908 A * | 9/1990 | Dondlinger | B60J 1/2088 | 280/762 |
| 5,035,458 A * | 7/1991 | Boensch | B60R 21/00 | 296/1.05 |
| 5,137,320 A | 8/1992 | Christensen | | |
| 5,143,415 A | 9/1992 | Boudah | | |
| 5,258,893 A * | 11/1993 | Finneyfrock | B60Q 1/30 | 280/748 |
| 5,560,666 A | 10/1996 | Vieira et al. | | |
| D388,385 S * | 12/1997 | Protz, Sr. | | D12/167 |
| 5,692,791 A * | 12/1997 | Sulzer | B60J 7/102 | 224/403 |
| 5,836,635 A | 11/1998 | Dorman | | |
| 6,209,942 B1 * | 4/2001 | French | B62D 29/008 | 296/26.13 |
| 6,283,525 B1 * | 9/2001 | Morse | B62D 33/0273 | 280/748 |
| 6,347,731 B1 | 2/2002 | Burger | | |
| 6,557,917 B1 * | 5/2003 | Colcombe | B60R 9/00 | 224/403 |
| 6,983,968 B2 | 1/2006 | Brauer et al. | | |
| 7,210,721 B1 * | 5/2007 | Bell | B60P 3/40 | 224/310 |
| D553,553 S * | 10/2007 | Taylor | B60J 1/2088 | D12/414 |
| 7,322,499 B2 | 1/2008 | Storer | | |
| 7,464,976 B2 * | 12/2008 | Smith | B60R 9/00 | 296/26.11 |
| 7,475,928 B1 * | 1/2009 | Clum | B60R 21/00 | 280/748 |
| 7,780,195 B2 | 8/2010 | German | | |
| D644,591 S * | 9/2011 | Andonian | B60R 9/00 | D12/406 |
| 8,905,280 B2 | 12/2014 | Martin | | |
| D809,990 S * | 2/2018 | Schlup, Jr. | | D12/222 |
| D840,907 S * | 2/2019 | Parzyck | | D12/222 |
| D857,603 S * | 8/2019 | Mosingo | | D12/222 |
| D857,604 S * | 8/2019 | Mosingo | | D12/222 |
| D857,605 S * | 8/2019 | Mosingo | | D12/222 |
| 10,414,369 B2 * | 9/2019 | Parzyck | | B60R 21/026 |
| 2003/0011180 A1 * | 1/2003 | Coffman | B60R 21/02 | 280/748 |
| 2004/0007861 A1 * | 1/2004 | Hagen | B60R 21/02 | 280/748 |
| 2005/0052055 A1 * | 3/2005 | Cole | B60R 19/44 | 296/190.03 |
| 2005/0093320 A1 * | 5/2005 | Brauer | B62D 33/0207 | 296/3 |
| 2008/0048429 A1 * | 2/2008 | German | B60P 7/16 | 280/770 |
| 2008/0211247 A1 * | 9/2008 | Tarquinio | B60R 9/00 | 296/3 |
| 2008/0267729 A1 * | 10/2008 | Barker | B60P 1/43 | 410/3 |
| 2010/0288808 A1 * | 11/2010 | Marr, Jr. | B60R 9/06 | 224/403 |
| 2011/0108590 A1 * | 5/2011 | Kennedy | B60R 9/045 | 224/402 |
| 2015/0197202 A1 * | 7/2015 | Harrison | B62D 33/02 | 296/3 |
| 2015/0273987 A1 * | 10/2015 | O'Leary | B60K 13/04 | 180/89.2 |
| 2017/0120961 A1 * | 5/2017 | Diller | | B62D 33/0207 |
| 2018/0111562 A1 * | 4/2018 | Crandall | | B60P 7/0815 |
| 2018/0118148 A1 | 5/2018 | Parzyck et al. | | |
| 2019/0381959 A1 * | 12/2019 | Maynard | | B60R 19/24 |

OTHER PUBLICATIONS shapeways.com [online], "1/50 scale Logging Headache Rack '7 bar'," retrieved on Feb. 2, 2020, retrieved from URL <https://www.shapeways.com/product/5SGVMZT5K/1-50-scale-logging-headache-rack-7-bar>, 5 pages.

shapeways.com [online], "Products Tagged: Headache." retrieved on Feb. 2, 2020, retrieved from URL <https://www.shapeways.com/marketplace?tag=headache>, 6 pages.

shapeways.com [online], "Products tagged_headache rack," retrieved on Feb. 2, 2020, retrieved from URL <https://www.shapeways.com/marketplace?tag=headache+rack>, 3 pages.

* cited by examiner

RACK OF UNITARY ONE-PIECE CONSTRUCTION

CROSS REFERENCE TO RELATED APPLICATIONS

This application claims the benefit of U.S. Provisional Application No. 62/684,450, filed on Jun. 13, 2018, the entire contents of which is hereby incorporated by reference in its entirety.

FIELD

The present disclosure relates to cab racks, in particular, to a rack of unitary one-piece construction for protecting the rear window of a truck cab.

BACKGROUND

Pickup trucks typically have a truck cab, which has the controls for operating the truck and a rear window for the truck operator to have a rearward line of sight during operation of the truck, and a truck bed that is positioned behind the truck cab. Compared to the trunks of cars, truck beds are generally larger. Accordingly, pickup trucks may be used to transport cargo as the truck bed may hold cargo that is heavy, long, wide, or may comprise a number of different types of articles of different weights and dimensions.

However, during transportation of the cargo, the cargo may move due to the acceleration or deceleration of the pickup truck. Accordingly, the cargo may contact the rear window of the cab. With sufficient force, the cargo may damage the rear window. In addition, some cargo, such as ladders or lumber, may be longer than the length of the truck bed, such that, in order to hold such cargo, a portion of the cargo is inside the truck bed, while another portion of the cargo is resting on top of the truck cab.

One way to protect the rear window is to mount a rack to the truck bed, with the rack positioned between the rear window and the cargo. Various such racks have been developed. Unfortunately, existing racks are heavy, as they are made of relatively heavy materials such as metal (e.g. steel or aluminum). As such, it may be difficult for one person to install such heavy racks, and the weight of the racks may present issues during shipping and handling. Existing racks may also comprise a number of parts that may initially be disassembled, which may increase the complexity of installing the racks. In addition, existing racks may be fastened to the truck bed using a number of fasteners, such as bolts, nuts, brackets, hook and loop fasteners, adhesives, and the like. Once installed, it may be impractical to remove the racks due to the amount of time required, the complexity of the removal, and the risk of damaging the truck during the removal process, such that the racks may effectively be permanently installed to the truck bed. Even if the racks were to be uninstalled from the truck bed and removed, the racks may be too heavy to be removed by one person. Further, the weight of the existing racks may reduce the fuel efficiency of the truck. Moreover, as existing racks are made of metal, they may be susceptible to rust and wear and tear from exposure to environmental conditions, such has rain, when operating the truck outdoors, which may damage the existing racks, the fasteners used with the existing racks, or the vehicles on which the existing racks are mounted.

SUMMARY

In one aspect, there is provided a rack of unitary one-piece construction for mounting to a vehicle including a cab having a rear window, the rack comprising: a barrier; wherein: the barrier includes a plurality of apertures; each one of the plurality of apertures, independently, is defined between a respective plurality of merging barrier members; the barrier is configured for disposition in opposition to the rear window while the rack is mounted to the vehicle, such that: line of sight is provided from the cab, through the barrier, via the apertures; and the barrier prevents oversized objects from contacting the rear window.

In another aspect, there is provided a kit for installing a rack system on a vehicle, comprising: a rack of unitary one-piece construction for mounting to a vehicle including a cab having a rear window, the rack comprising: a barrier; wherein: the barrier includes a plurality of apertures; each one of the plurality of apertures, independently, is defined between a respective plurality of merging barrier members; the barrier is configured for disposition in opposition to the rear window while the rack is mounted to the vehicle, such that: line of sight is provided from the cab, through the barrier, via the apertures; and the barrier prevents oversized objects from contacting the rear window; and a connector for releasably coupling to the vehicle and releasably coupling to the rack for releasably fastening the rack to the vehicle.

In another aspect, there is provided a kit for installing a rack system on a vehicle, comprising: a rack of unitary one-piece construction for mounting to a vehicle including a cab having a rear window, the rack comprising: a barrier; wherein: the barrier includes a plurality of apertures; each one of the plurality of apertures, independently, is defined between a respective plurality of merging barrier members; the barrier is configured for disposition in opposition to the rear window while the rack is mounted to the vehicle, such that: line of sight is provided from the cab, through the barrier, via the apertures; and the barrier prevents oversized objects from contacting the rear window; and a first mounting bracket having a first part for receiving a portion of the barrier and a second part for mounting to the vehicle; a second mounting bracket having a first part for receiving a portion of the barrier and a second part for mounting to the vehicle; a first connector for releasably coupling to the vehicle and for releasably coupling to the first mounting bracket; a second connector for releasably coupling to the vehicle and for releasably coupling to the second mounting bracket; wherein the barrier and the first and second mounting brackets are cooperatively configured such that the releasable coupling of the first and second connectors to the vehicle and disposition of the barrier and the first and second mounting brackets relative to the first and second connectors is such that the barrier is disposed in opposition to the rear window of the vehicle.

In another aspect, there is provided a method of producing a rack of unitary one-piece construction for mounting to a vehicle including a cab having a rear window, the rack comprising a barrier, wherein the barrier includes a plurality of apertures, each one of the plurality of apertures, independently, is defined between a respective plurality of merging barrier members, the barrier is configured for disposition in opposition to the rear window while the rack is mounted to the vehicle, such that, line of sight is provided from the cab, through the barrier, via the apertures, and the barrier prevents oversized objects from contacting the rear window, wherein the method comprises: injection molding the rack.

In another aspect, there is provided a connector for releasably fastening a rack to a truck bed, the truck bed defining a stake pocket within the truck bed, the truck bed having a flange at an opening of the stake pocket, wherein:

the connector is cooperatively configured with the flange, such that, while the connector is disposed within the stake pocket, a side surface portion of the connector is being opposed by the flange, for limiting movement of the connector relative to the truck bed.

In another aspect, a rack of unitary one-piece construction for mounting to a vehicle including a cab having a rear window, the rack comprising a barrier defined by a plurality of barrier members, a base for mounting the rack to the vehicle, wherein, at least one of the plurality of barrier members defines a load supporting member that is configured to support a load applied to the barrier, the load supporting member including a longitudinal axis, a normal axis is defined relative to the longitudinal axis of the load supporting member, the plurality of barrier members includes at least one load distributing member, where the at least one load distributing member is disposed between the load supporting member and the base, and configured to distribute the load supported by the load supporting member to the base, wherein the barrier and the vehicle are co-operatively configured for disposition of the barrier in opposition to the rear window such that, while the rack is mounted to the vehicle, line of sight is provided from the cab below the load distributing member, the barrier prevents oversized objects from contacting the rear window, and for each of the at least one load distributing members, independently, a ray, that is disposed along a longitudinal axis of the at least one load distributing member and extending towards a side of the cab, is disposed at an acute angle between 30 degrees and 70 degrees relative to the normal axis of the load supporting member.

In another aspect, a kit for installing a rack system on a vehicle, comprising a rack of unitary one-piece construction for mounting to a vehicle including a cab having a rear window, the rack comprising a barrier defined by a plurality of barrier members, a base for mounting the rack to the vehicle, wherein at least one of the plurality of barrier members defines a load supporting member that is configured to support a load applied to the barrier, the load supporting member including a longitudinal axis, a normal axis is defined relative to the longitudinal axis of the load supporting member, the plurality of barrier members includes at least one load distributing member, where the at least one load distributing member is disposed between the load supporting member and the base, and configured to distribute the load supported by the load supporting member to the base, wherein the barrier and the vehicle are co-operatively configured for disposition of the barrier in opposition to the rear window such that, while the rack is mounted to the vehicle, line of sight is provided from the cab below the load distributing member, the barrier prevents oversized objects from contacting the rear window, for each of the at least one load distributing members, independently, a ray, that is disposed along a longitudinal axis of the at least one load distributing member and extending towards a side of the cab, is disposed at an acute angle between 30 degrees and 70 degrees relative to the normal axis of the load supporting member, and a connector for releasably coupling to the vehicle and releasably coupling to the rack for releasably fastening the rack to the vehicle.

In another aspect, a kit for installing a rack system on a vehicle, comprising, a rack of unitary one-piece construction for mounting to a vehicle including a cab having a rear window, the rack comprising, a barrier defined by a plurality of barrier members, a base for mounting the rack to the vehicle, wherein at least one of the plurality of barrier members defines a load supporting member that is configured to support a load applied to the barrier, the load supporting member including a longitudinal axis, a normal axis is defined relative to the longitudinal axis of the load supporting member, the plurality of barrier members includes at least one load distributing member, where the at least one load distributing member is disposed between the load supporting member and the base, and configured to distribute the load supported by the load supporting member to the base, wherein the barrier and the vehicle are co-operatively configured for disposition of the barrier in opposition to the rear window such that, while the rack is mounted to the vehicle, line of sight is provided from the cab below the load distributing member, the barrier prevents oversized objects from contacting the rear window, for each of the at least one load distributing members, independently, a ray, that is disposed along a longitudinal axis of the at least one load distributing member and extending towards a side of the cab, is disposed at an acute angle between 30 degrees and 70 degrees relative to the normal axis of the load supporting member, and a first mounting bracket having a first part for receiving a portion of the barrier and a second part for mounting to the vehicle, a second mounting bracket having a first part for receiving a portion of the barrier and a second part for mounting to the vehicle, a first connector for releasably coupling to the vehicle and for releasably coupling to the first mounting bracket, a second connector for releasably coupling to the vehicle and for releasably coupling to the second mounting bracket, wherein the barrier and the first and second mounting brackets are cooperatively configured such that the releasable coupling of the first and second connectors to the vehicle and disposition of the barrier and the first and second mounting brackets relative to the first and second connectors is such that the barrier is disposed in opposition to the rear window of the vehicle.

In another aspect, a method of producing a rack of unitary one-piece construction for mounting to a vehicle including a cab having a rear window, the rack comprising a barrier defined by a plurality of barrier members, a base for mounting the rack to the vehicle, wherein at least one of the plurality of barrier members defines a load supporting member that is configured to support a load applied to the barrier, the load supporting member including a longitudinal axis, a normal axis is defined relative to the longitudinal axis of the load supporting member, the plurality of barrier members includes at least one load distributing member, where the at least one load distributing member is disposed between the load supporting member and the base, and configured to distribute the load supported by the load supporting member to the base, wherein the barrier and the vehicle are co-operatively configured for disposition of the barrier in opposition to the rear window such that, while the rack is mounted to the vehicle, line of sight is provided from the cab below the load distributing member, the barrier prevents oversized objects from contacting the rear window, for each of the at least one load distributing members, independently, a ray, that is disposed along a longitudinal axis of the at least one load distributing member and extending towards a side of the cab, is disposed at an acute angle between 30 degrees and 70 degrees relative to the normal axis of the load supporting member; and, wherein the method comprises injection molding the rack.

Other aspects will be apparent from the description and drawings provided herein.

BRIEF DESCRIPTION OF DRAWINGS

In the figures, which illustrate example embodiments.

DETAILED DESCRIPTION

A rack of unitary one-piece construction for mounting to a vehicle is disclosed. The rack may be mounted to the vehicle, which may transport humans, such as pickup trucks. The rack may be made entirely of a high strength injection moulded plastic in one piece. The rack may be fastened to the vehicle, for example, a truck bed of a truck, using a connector. The connector may be made of aluminum, polymer, plastic, or composite, and may be extruded. The connector may be received in a rail of the truck bed, such as in a stake pocket, and may be fastened to the rail using existing openings defined in the rail of the truck bed. The connector may remain received in the stake pocket and fastened to the rail, or the connector may be removed easily if the connector and rack is to be installed to another vehicle, such as another truck. When the connector is received in the stake pocket and fastened to the rail of the truck bed, the connector may act as a mounting device when attaching the rack to the truck bed. The rack may be manufactured with a light weight and high strength material. The injection-moulded one piece plastic rack and connector may allow for flexibility of ease of installation and uninstallation at leisure.

Figure 1:
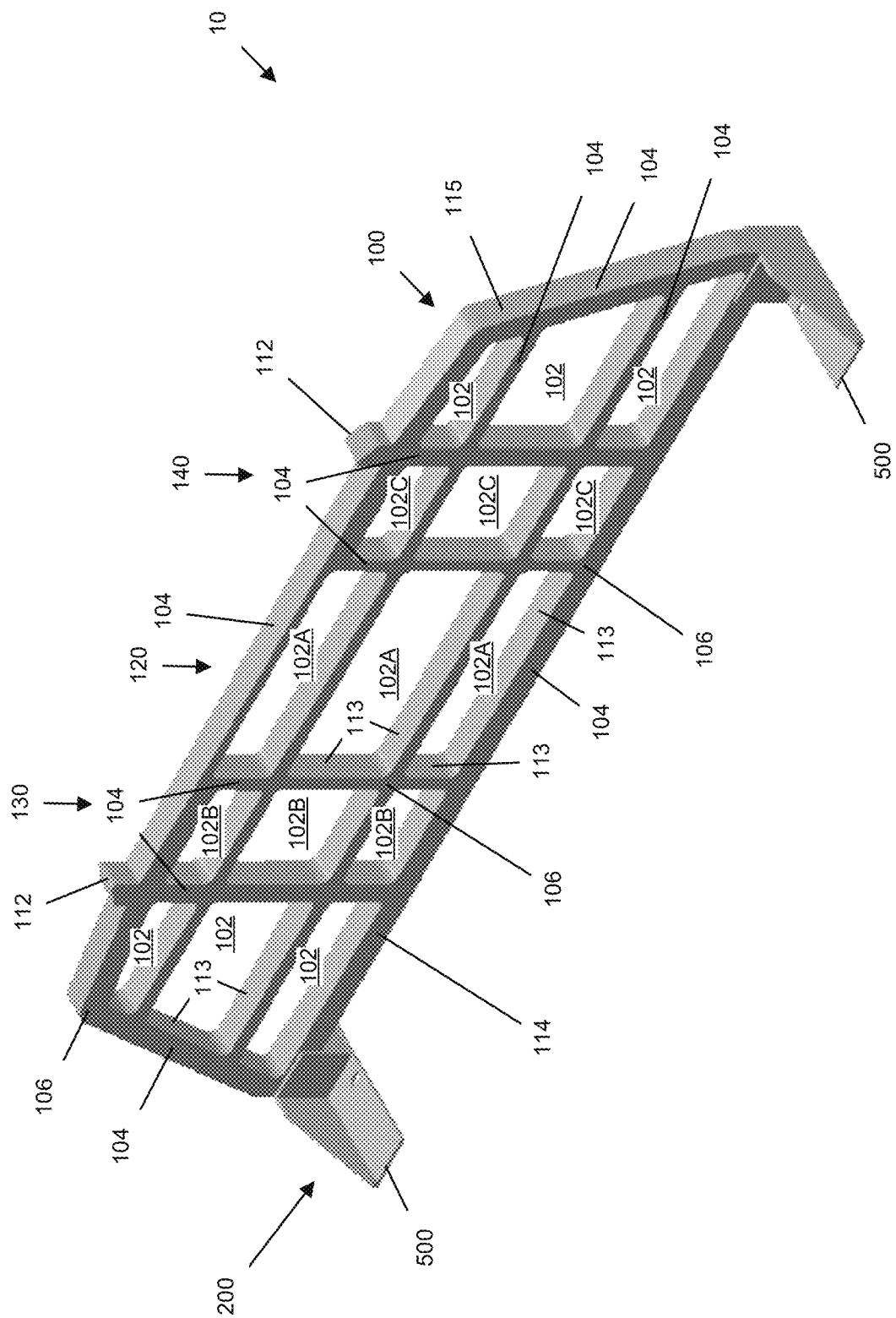
FIG. 1 is a perspective view of a rack.

FIGS. 1-4 depict an example rack 10. The rack 10 may be of unitary one-piece construction for mounting to a vehicle including a cab having a rear window. In some embodiments, the rack comprises a barrier 100. The barrier 100 may include a plurality of apertures 102, where each one of the plurality of apertures 102, independently, is defined between a respective plurality of merging barrier members 104. As depicted in FIG. 1, the barrier members 104 may be generally straight and have a vertical, horizontal, or diagonal orientation. Accordingly, the barrier members 104 may define apertures 102 having a four-sided or quadrilateral shape. In some embodiments, the barrier members 104 may be straight or curved, and may be oriented such that the barrier members 104 merge to define apertures 102 having a rounded shape, a shape with two sides, or more than two sides.

In some embodiments, for example, the cross-sectional profile of the barrier member 104 is circular, oval-shaped, triangular, square, rectangular, or polygonal. In some embodiments, for example, the cross-sectional profile of the barrier members 104 are the same. In some embodiments, for example, one or more of the barrier members 104 has a cross-sectional profile that is different from other of the barrier members 104.

The barrier 100 may be injection moulded to be of unitary one-piece construction. The material used for the barrier 100 may be high impact co-polymer, nylon, polypropylene, or thermoplastic. In some embodiments, the material used for the barrier 100 may be polypropylene with 30% glass fiber filler.

The rack 10 may be mounted to a vehicle with a cab that has a rear window. For example, where the vehicle is a truck, the rack 10 may be mounted to a rail of the truck bed, and, when the rack 10 is mounted to the truck bed, the rack 10 is positioned between the truck bed and the rear window of the cab. From the perspective of the cab, the rack 10, when positioned between the truck bed and the rear window of the cab, may provide a line of sight through the rack 10 via the apertures 102. Accordingly, the rack 10, when mounted to the vehicle, allows for operation of the vehicle. In some embodiments, the barrier 100 of the rack 10 is configured for disposition in opposition to a rear window of a vehicle while the rack 10 is mounted to the vehicle, such that line of sight is provided from the cab, through the barrier 100, via the apertures 102, and the barrier 100 prevents oversized objects from contacting the rear window.

In some embodiments, when the barrier 100 is disposed in opposition to the rear window, the barrier 100 is disposed in alignment with the rear window. For example, when the rack 10 is mounted to a rail of the truck bed, the barrier 100 is disposed generally parallel to the rear window of the cab.

In some embodiments, disposition of the barrier 100 in opposition to the rear window is such that the barrier 100 is disposed in alignment with the rear window.

In some embodiments, the plurality of apertures 102 is configured to prevent oversized objects from passing through the plurality of apertures 102. For example, an aperture 102 may be dimensioned to have a certain area, and may prevent an object having a larger cross-sectional area than the area of the aperture 102, the cross-section of the cross-sectional area being generally parallel with a plane defined by the body of the barrier 100, from passing through the aperture 102. As another example, an aperture 102 may have one or more dimensions that is less than one or more dimensions of an object, and the aperture 102 may prevent the object from passing through the aperture 102.

Figure 2:
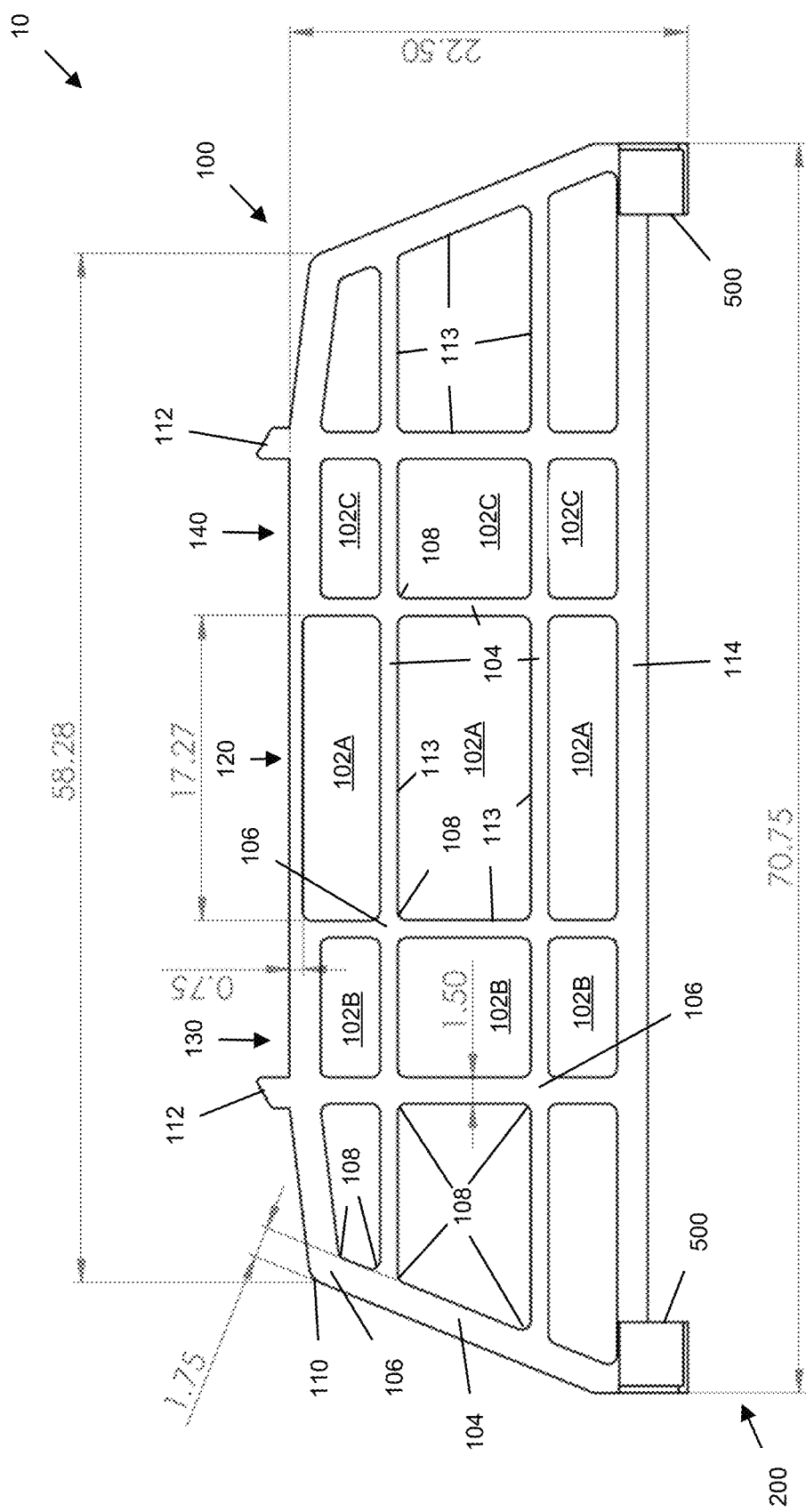
FIG. 2 is a front view of the rack of FIG. 1.

As depicted in FIG. 2, the rack 10 may have an example height of 22.50". In some embodiments, the barrier 100 has a minimum height of at least 18".

As depicted in FIG. 2, the rack 10 may have an example width of 70.75" inches. In some embodiments, the barrier 100 has a minimum width of at least 60". In some embodiments, a lower portion of the barrier 100 has a minimum width of at least 60". In some embodiments, as depicted in FIG. 2, an upper portion of the barrier 100 has an example width of 58.28".

As depicted in FIG. 2, one or more of the barrier members 104 may have example widths of 0.75", 1.50", and 1.75". In some embodiments, one or more of the barrier members 104, independently, has a minimum dimension of at least 1.25".

In some embodiments, each one of the barrier members 104, independently, has a minimum dimension of at least 1.25".

Figure 4:
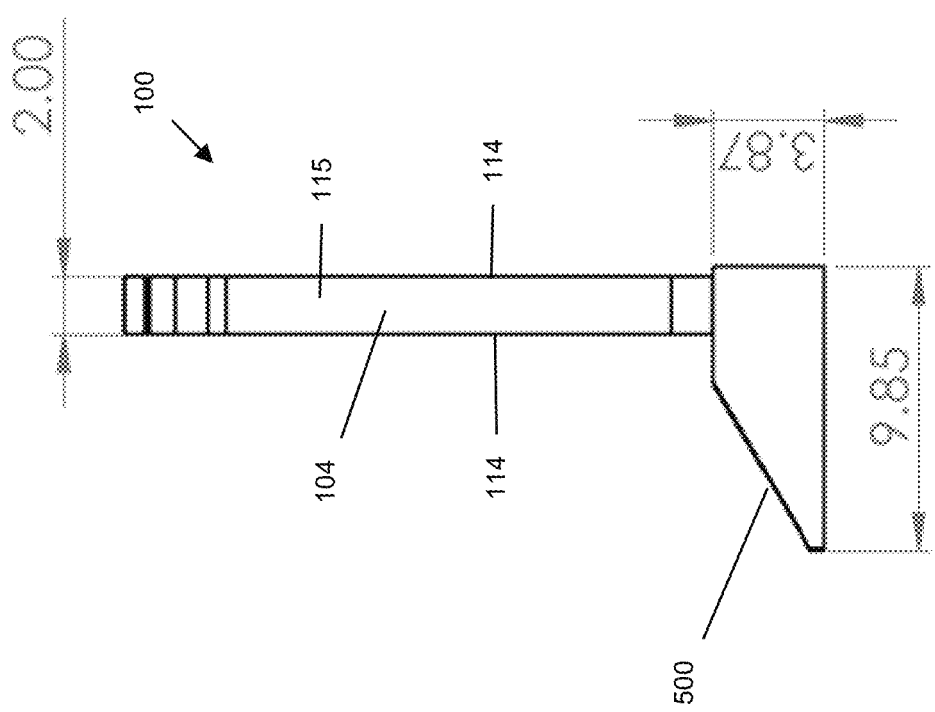
FIG. 4 is a side view of the rack of FIG. 1.

As depicted in FIG. 4, the barrier 100 may have an example thickness of 2.00". In some embodiments, one or more of the barrier members 104 may have an example thickness of 2.00". In some embodiments, one or more of the barrier members 104, independently, has a minimum thickness of at least 1.25". In some embodiments, one or more of the barrier members 104, independently, has a maximum thickness of 3", and a preferred thickness of 2".

In some embodiments, each one of the barrier members 104, independently, has a minimum thickness of at least 1.25". In some embodiments, each one of the barrier members 104, independently, has a maximum thickness of 3", and a preferred thickness of 2".

As depicted in FIG. 1 and FIG. 2, the barrier members 104 merge to define a plurality of merging points 106. The merging points 106 may be defined along a frame or perimeter of the barrier 100, or may be defined within the frame or perimeter of the barrier 100. The merging points 106, such as merging points 106 defined along the frame or perimeter of the barrier 100, may have an internal rounded corner 108, or an internal rounded corner 108 and an external rounded corner 110. The merging points 106, such as merging points 106 defined within the frame or perimeter of the barrier 100, may have one or more internal rounded corners 108. The internal rounded corner 108 or the external rounded corner 110 may provide structural strength to the barrier 100, and may reduce the amount of stress experienced by the barrier 100 when a force is applied to the barrier 100 by not presenting a stress concentration in the barrier 100 or by distributing the stress more evenly about the barrier 100.

In some embodiments, merger of at least one pair of merging barrier members 104 defines an internal rounded corner 108. In some embodiments, each one of the pairs of merging barrier members defines an internal rounded corner 108. In some embodiments, the internal rounded corner 108 has a minimum radius of at least 0.250". In some embodiments, the internal rounded corner 108 has a preferred radius of 1", and a most preferred radius of 0.750".

In some embodiments, merger of at least one pair of merging barrier members 104 defines an external rounded corner 110. In some embodiments, the external rounded corner 110 has a minimum radius of at least 1". In some embodiments, the external rounded corner 110 has a preferred radius of 3", and a most preferred radius of 2".

In some embodiments, for example, the barrier members 104 of the barrier 100 have internal surfaces 113 that define the shape of the apertures 102. The internal surfaces 113 of the barrier members 104 face into the apertures 102. In some embodiments, a barrier member 104 has two internal surfaces 113, where a first internal surface 113 defines a first aperture 102 or a portion of a first aperture 102, and a second internal surface 113 defines a second aperture 102 or a portion of a second aperture 102. In some embodiments, the internal surfaces 113 of a pair of merging barrier members 104 that define a rounded corner 108 are merged such that they define a continuous surface. In some embodiments, the internal surfaces 113 of a pair of merging barrier members 104 that define a rounded corner are merged and define a seamless surface. In some embodiments, the internal surfaces 113 of a pair of merging barrier members 104 that define a rounded corner are merged and define a surface having an absence of edges.

Figure 3:
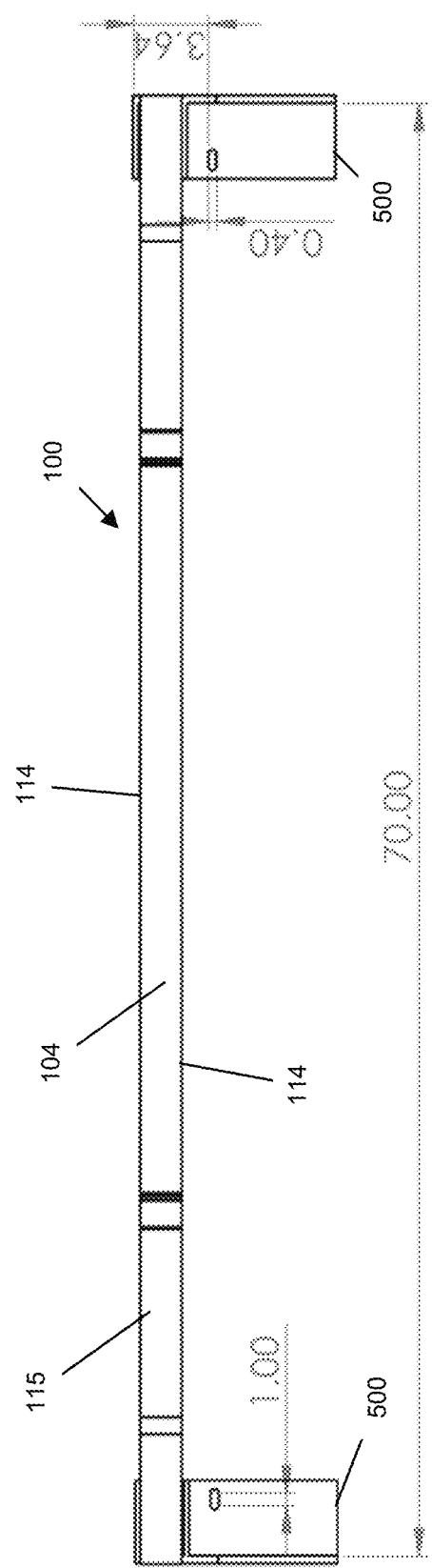
FIG. 3 is a top view of the rack of FIG. 1.

In some embodiments, the barrier 100 or barrier members 104 has external surfaces 114 that are generally parallel to a plane defined by the body of the barrier 100, for example, as depicted in FIG. 1 to FIG. 4. For example, when the rack 10 is mounted to a rail of a truck bed of a truck, such as depicted in FIG. 40 to FIG. 44, the external surfaces 114 on one side, for example, a front side, of the barrier 100 or barrier members 104 face the truck cab 2002 and the external surfaces 114 on the other side, for example, a rear side, of the barrier 100 or barrier members 104 face the truck bed 1600. FIG. 2 depicts one of the external surfaces 114 of the barrier 100 or barrier members 104. As depicted in FIG. 3 and FIG. 4, a first external surface 114 may be spaced apart from a second external surface 114 by a thickness of the barrier 100 or barrier member 104. As depicted in FIG. 3 and FIG. 4, a first external surface 114 may oppose a second external surface 114. As depicted in FIG. 3 and FIG. 4, a first external surface 114 may be parallel, or substantially parallel, to a second external surface 114. In some embodiments, external surfaces 114, for example, front external surfaces, of a pair of merging barrier members 104 may merge to define the external surface 114, for example, the front external surface, of the barrier 100. In some embodiments, external surfaces 114, for example, rear external surfaces, of a pair of merging barrier members 104 may merge to define the external surface 114, for example, the rear external surface, of the barrier 100. In some embodiments, external surfaces 114, for example, front external surfaces, of two or more merging barrier members 104 may merge to define the external surface 114, for example, the front external surface, of the barrier 100. In some embodiments, external surfaces 114, for example, rear external surfaces, of two or more merging barrier members 104 may merge to define the external surface 114, for example, the rear external surface, of the barrier 100. In some embodiments, external surfaces 114, for example, front external surfaces, of merging barrier members 104 may merge to define the external surface 114, for example, the front external surface, of the barrier 100. In some embodiments, external surfaces 114, for example, rear external surfaces, merging barrier members 104 may merge to define the external surface 114, for example, the rear external surface, of the barrier 100. In some embodiments, the external surface 114 of a barrier member 104 extends from a first internal surface 113 of the barrier member 104 to a second internal surface 113 of the barrier member 104. In some embodiments, the external surface 114 of the barrier member 104 or the barrier 100 is continuous, smooth, or seamless, with an absence of edges. In some embodiments, the external surface 114 of a barrier member 104 extends continuously, smoothly, or seamlessly, with an absence of edges, from a first internal surface 113 of the barrier member 104 to a second internal surface 113 of the barrier member 104, such that the external surface 114 of the barrier member 104 or the barrier 100 does not define an opening for receiving a supporting structure in the barrier member 104 or the barrier 100.

In some embodiments, an external surface 114 of a barrier member 104 is merged with an internal surface 113 of the barrier member 104.

In some embodiments, for example, the barrier 100 defines a perimeter surface 115 wherein the perimeter surface 115 of the barrier 100 defines a continuous surface, as depicted in FIG. 1 to FIG. 4. In some embodiments, the perimeter surface 115 of the barrier 100 defines a seamless surface. In some embodiments, the perimeter surface 115 of the barrier 100 defines a surface having an absence of edges.

In some embodiments, an external surface 114 of a barrier member 104 is merged with a perimeter surface 115 of the barrier 100. In some embodiments, the external surface 114 of a barrier member 104 extends continuously, smoothly, or seamlessly, with an absence of edges, from an internal surface 113 of the barrier member 104 to a perimeter surface 115 of the barrier member 104 or the barrier 100.

The barrier 100, or the barrier members 104, may be configured to define the apertures 102 based on the design of the cab of vehicle upon which the rack 10 is installed. For example, some vehicle cabs may be configured to have three portions: a central portion, which has, for example, a rear view mirror, a hand brake, a gear shift, an audio/video system, and controls for the audio/video system; a first portion or driver portion that is adjacent the central portion, which has, for example, a steering wheel, an ignition switch, gas and brake pedals, and a seat for a driver; and a second portion or passenger portion that is adjacent the central portion on the opposite side of the central portion as the first portion, which has, for example, a glove compartment and a seat for a passenger. In such an example, the central portion of vehicle cabs may not be intended to have a passenger or seat a passenger during operation of the vehicle.

In some embodiments, the barrier 100 may be configured to define the apertures 102 based on vehicle cabs having such an example configuration described above. In such embodiments, apertures 102 in portions of the barrier 100 that may be opposed or aligned with portions of the vehicle cab that may have a person during operation of the vehicle may be configured to prevent oversized objects from passing through and contacting these portions of the cab to protect a person that may be in the cab. The apertures 102 in such portions of the barrier 100 may have an area that is narrower or smaller than apertures 102 disposed in the central portion of the barrier 100, which may prevent smaller objects from passing through and contacting these portions of the rear window of the cab. Similarly, apertures 102 in portions of the barrier 100 that may be opposed or aligned with portions of the vehicle cab that may not have a person during operation of the vehicle may be configured to provide line of sight from the cab, through the barrier 100, via the apertures 102, such that a person in the cab may see past the barrier 100 to operate the vehicle. The apertures 102 in such portions of the barrier 100 may have an area that is wider or larger that the area defined by the apertures 102 in the side portions or first and second portions of the barrier, which may provide a less obstructed or clearer or wider or longer line of sight from the cab, through the barrier 100, via the apertures 102.

As depicted in FIG. 1 and FIG. 2, the barrier 100 may have a central portion 120, a first portion 130, and a second portion 140. In some embodiments, the barrier 100 is configured for disposition in opposition to a rear window of a cab having a central portion, which may not be intended to have a passenger or seat a passenger during operation of the vehicle, and first and second portions, which may be intended to have a passenger or seat a passenger during operation of the vehicle. When the barrier 100 is disposed in opposition to the rear window of such a cab, the central portion 120 of the barrier 100 may be opposed to a portion of the rear window corresponding to the central portion of the cab, the first portion 130 of the barrier 100 may be opposed to a portion of the rear window corresponding to the first portion of the cab, and the second portion 140 of the barrier 100 may be opposed to a portion of the rear window corresponding to the second portion of the cab. In some embodiments, the central portion 120 of the barrier 100 includes at least one central aperture 102A. As depicted in FIG. 1 and FIG. 2, the central portion 120 of the barrier 100 includes three central apertures 102A arranged in a column. In some embodiments, the first portion 130 of the barrier 100 includes at least one aperture 102B. In the example embodiment depicted in FIG. 1 and FIG. 2, the first portion 130 of the barrier 100 includes three apertures 102B arranged in a column. In some embodiments, the second portion 140 of the barrier 100 includes at least one aperture 102C. As depicted in FIG. 1 and FIG. 2, the second portion 140 of the barrier 100 includes three apertures 102C arranged in a column. In some embodiments, the central aperture 102A may be wider or larger than the first aperture 102B or the second aperture 102C. While the central aperture 102A, the first aperture 102B, and the second aperture 102C, or the barrier members 104 that define the central aperture 102A, the first aperture 102B, and the second aperture 102C, may prevent objects from contacting the rear window, the first aperture 102B and the second aperture 102C, or the barrier members 104 that define the first aperture 102B and the second aperture 102C, may prevent smaller objects from contacting the rear window corresponding to portions of the cab, such as the first and second portions of the cab adjacent to the central portion of the cab, that may be intended to have a passenger or seat a passenger during operation of the vehicle, compared to objects that may be prevented from contacting the rear window by the central aperture 102A. While the central aperture 102A is disposed in opposition to a portion of a rear window corresponding to the central portion of the cab, the central aperture 102A may provide a clearer or wider or longer line of sight from the cab through the barrier 100 for operation of the vehicle.

In some embodiments, the barrier 100 has a central portion 120, a first portion 130 adjacent the central portion 120, and a second portion 140 adjacent the central portion 120 and opposite the first portion 130, wherein the barrier 100 includes a central aperture 102A in the central portion 120 to provide line of sight from the cab through the central portion 120 of the barrier 100 via the central aperture 102A.

In some embodiments, the barrier 100 includes an aperture 102B in the first portion 130, the aperture 120B positioned adjacent the central aperture 102A, to prevent oversized objects from contacting a portion of the rear window that is aligned with the first portion 130 of the barrier 100.

In some embodiments, the aperture 102B in the first portion 130 is narrower than the central aperture 102A.

In some embodiments, the barrier 100 includes an aperture 102C in the second portion 140, the aperture 102C positioned adjacent the central aperture 102A, to prevent oversized objects from contacting a portion of the rear window that is aligned with the second portion 140 of the barrier 100.

In some embodiments, the aperture 102C in the second portion 140 is narrower than the central aperture 102A.

In some embodiments, the barrier 100 has a central portion 120, a first portion 130 disposed adjacent the central portion 120 on one side of the central portion 120, and a second portion 140 disposed adjacent the central portion 120 on a second, opposite side of the central portion 120, wherein the central portion 120 includes at least one aperture 102A having a first area, and the first portion 130 and the second portion 140 each include at least one aperture 102B and 102C having a second area, wherein the first area is larger than the second area. In some embodiments, the area of the aperture 102A of the central portion 120 is larger than the area of the apertures 102B and 102C of the first portion 130 and the second portion 140.

In some embodiments, the central portion 120 of the barrier 100 includes a plurality of apertures 102A, and the first portion 130 and the second portion 140 each include a plurality of apertures 102B and 102C, wherein each of the apertures 102A defined in the central portion 120 have an area and each of the apertures 102B and 102C defined in the first portion 130 and the second portion 140 have an area, the area of each of the apertures 102A in the central portion 120 being larger than the area of each of the apertures 102B and 102C in the first portion 130 and the second portion 140.

In some embodiments, the plurality of apertures 102A in the central portion 120 are disposed in a column and have a common width.

In some embodiments, the merging barrier members 104 of the barrier 100 define a first set of apertures 102A disposed in a central portion 120 of the barrier 100, a second set of apertures 102B defined in a first portion 130 of the barrier 100 disposed adjacent to and on a first side of the central portion 120, and a third set of apertures 102C defined in a second portion 140 of the barrier 100 disposed adjacent to the central portion 120 on a second opposite side of the central portion 120; wherein the first set of apertures 102A are larger than the second and third set of apertures 102B and 102C.

In some embodiments, the second and third set of apertures 102B and 102C each comprise a plurality of apertures of different sizes.

The barrier 100 may comprise one or more protrusions 112. As depicted in FIGS. 1 and 2, the barrier 100 has two protrusions 112. The protrusions 112 may extend from a frame or perimeter of the barrier 100. When the rack 10 is mounted to a vehicle and the barrier 100 is disposed in opposition to the rear window, the protrusions 112 may be pointing in a generally upward direction. When the rack 10 is mounted to a vehicle and the barrier 100 is disposed in opposition to the rear window, the protrusions 112 may prevent or reduce lateral movement of cargo resting on the frame or perimeter of the barrier 100. For example, when cargo, such as a ladder or lumber, is resting on the frame or perimeter of the barrier 100 between the protrusions 112, lateral movement of the cargo may be prevented or reduced by the protrusions 112, such that the cargo does not fall off the barrier 100 and the barrier 100 maintains support of the cargo.

In some embodiments, the barrier 100 is a solid part that is manufactured by injection moulding without supporting structures (e.g. skeleton frame, trusses, etc.) disposed in the barrier 100 or in contact with the barrier 100 to add structural strength to the barrier.

In such embodiments, the barrier 100 does not contact a secondary supporting structure disposed within or adjacent to the barrier 100. In some embodiments, when the rack 10 is mounted to the vehicle, the barrier 100 is disposed in an upright manner or position. In some embodiments, the barrier 100 maintains its shape and configuration when disposed in an upright manner in the absence of a supporting structure disposed within or adjacent to the barrier 100. In some embodiments, the barrier 100 supports itself to be disposed in an upright manner. In some embodiments, the barrier members 104 provide structural strength to the barrier 100. In some embodiments, the barrier members 104 support the barrier 100 to be disposed in an upright manner.

In some embodiments, the rack 10, in an absence of contact with a supporting structure disposed within the barrier 100, the rack 10 is configured for disposition in opposition to the rear window for providing line of sight from the cab, through the barrier, via the apertures, and preventing, via the barrier 100, oversized objects from contacting the rear window.

In some embodiments, the rack 10 is fastened directly to the vehicle.

To mount and fasten the rack 10 to a vehicle, the rack 10 may comprise a base 200. The base 200 may be configured to engage with the vehicle, for example, a rail of a truck bed. When the rack 10 is engaged with the vehicle via the base 200 of the rack 10, the rack 10 may be mounted to the vehicle. When the rack 10 is mounted to the vehicle, the rack 10 may be fastened to the vehicle.

The base 200 may be injection moulded to be of unitary one-piece construction. The material used for the base 200 may be high impact co-polymer, nylon, polypropylene, or thermoplastic. In some embodiments, the material used for the base 200 may be polypropylene with 30% glass fiber filler.

In some embodiments, the rack 10 comprises a base 200 configured for mounting the rack 10 to the vehicle, such that, while the rack 10 is mounted to the vehicle via the base 200, the barrier 100 is configured for disposition in opposition to the rear window.

In some embodiments, the rack 10 further comprises a base 200 for mounting the rack 10 to the vehicle, wherein the barrier 100 and the base 200 are cooperatively configured such that, while the base 200 is mounted to the vehicle, the barrier 100 is disposed in opposition to the rear window.

In some embodiments, the base 200 and the barrier 100 are of unitary one piece construction. For example, as depicted in FIG. 1, the barrier 100 and the base 200 are of unitary one piece construction.

In some embodiments, the base 200 comprises a first mounting bracket 500 and a second mounting bracket 500, each of the first and second mounting brackets 500 comprising a mounting surface for engaging a portion of the vehicle, wherein engagement of the mounting surface of the first and second mounting brackets 500 and the vehicle is such that the barrier is disposed in opposition to the rear window.

In some embodiments, the base 200 comprises a first mounting bracket 500 and a second mounting bracket 500, each of the first and second mounting brackets 500 comprising a mounting surface for engaging the cab to mount the rack 10 to the vehicle.

In some embodiments, each of the first and second mounting brackets 500 comprise at least one opening 504 for receiving a mechanical fastener to fasten the rack 10 to the vehicle.

In some embodiments, the first mounting bracket 500 is positioned on a first end of the barrier 100, and the second mounting bracket 500 is positioned on a second end of the barrier 100, as depicted in FIG. 1 and FIG. 2. In some embodiments, the first mounting bracket 500 is disposed at a first end of the barrier 100, and the second mounting bracket 500 is disposed at a second end of the barrier 100.

FIG. 1, and FIG. 5 to FIG. 8 depict an example mounting bracket 500 for engaging with the vehicle to mount and fasten the rack 10 to the vehicle. In some embodiments, for example, the mounting bracket 500 has a bottom wall 502 having a mounting surface for engaging with the vehicle, at least one opening 504 for receiving a mechanical fastener (e.g. nuts and bolts, eye bolt, nails, screws, pegs, hook and loop fastener, adhesive, and the like) to fasten the rack 10 to the vehicle, a side wall 506, an intermediate wall 508, an end wall 510, and a slot defined between the intermediate wall 508 and the end wall 510.

Figure 7:
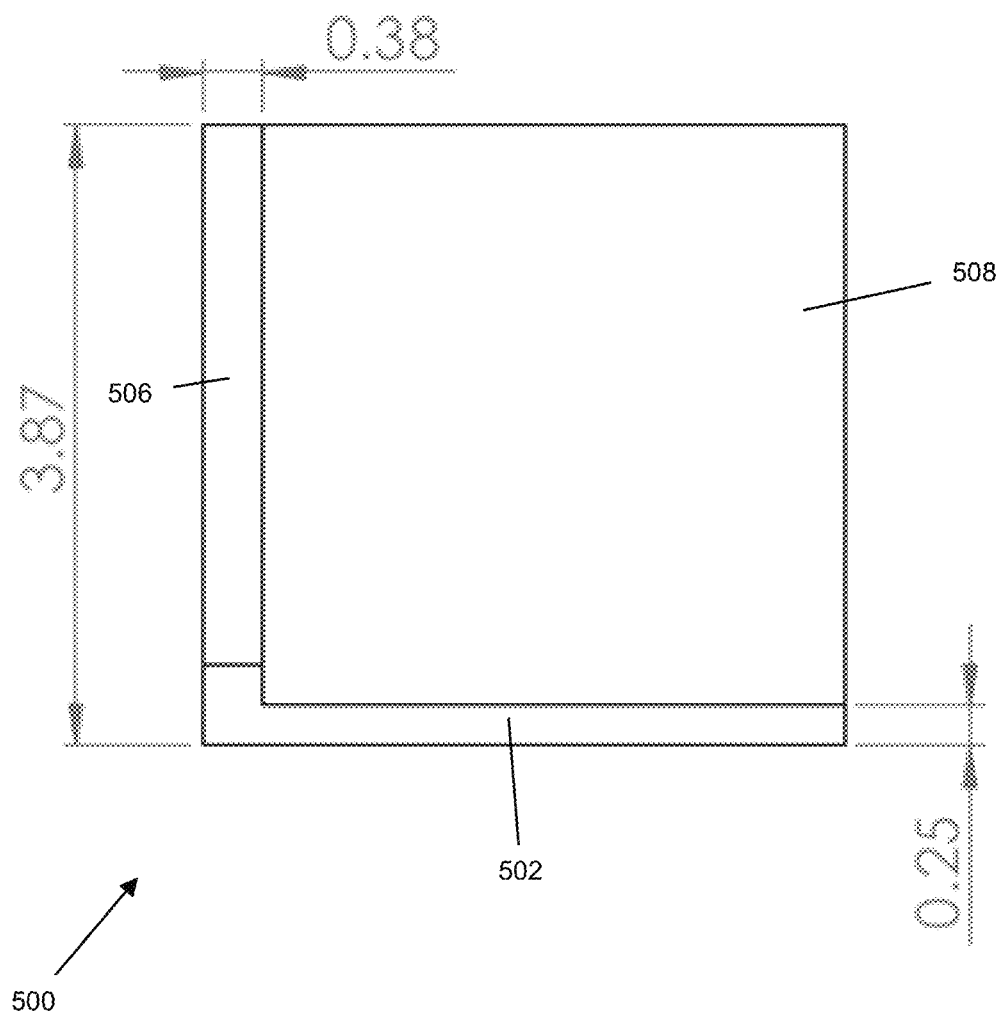
FIG. 7 is a front view of the mounting bracket of FIG. 6.
Figure 8:
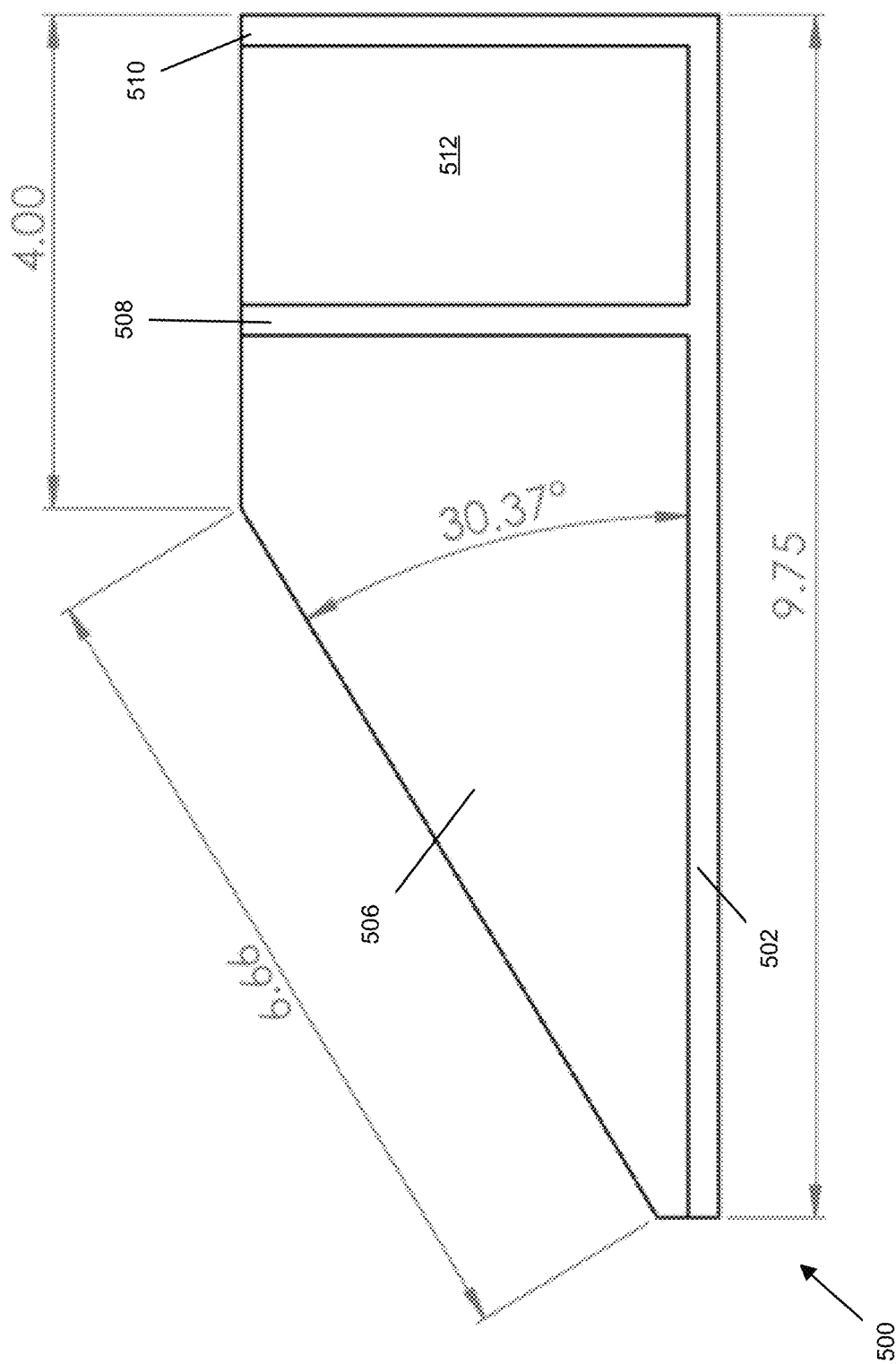
FIG. 8 is a side view of the mounting bracket of FIG. 6.

The bottom wall 502 of the mounting bracket 500 may be configured to engage with the vehicle to mount and fasten the rack 10 to the vehicle. In some embodiments, the vehicle on which the rack 10 is mounted is a truck. In such embodiments, the rack 10 may be mounted to a truck bed, which has rails with a generally flat top surface. Accordingly, the bottom wall 502 has a mounting surface, for example, a bottom surface, that may also be generally flat for engaging with the top surface of the rail of the truck bed. In some embodiments, the bottom wall 502 may be configured such that the mounting surface is configured for mounting to the vehicle. For example, if the rack 10 is to be mounted on a curved or irregular surface of a vehicle, or has a channel or slot, the bottom wall 502 may be configured such that the mounting surface is configured for mounting to such a curved or irregular surface, channel, or slot of the vehicle. In such an example, the bottom wall 502 may be configured such that the mounting surface is similarly curved or irregular, or may be configured to be received in the channel or slot. As depicted in FIG. 7, an example thickness of the bottom wall 502 is 0.25". As depicted in FIG. 8, the bottom wall 502 has an example length of 9.75". In some embodiments, the bottom wall 502 has a length of 9" to 11", such that the mounting bracket 500 has a length of 9" to 11".

Figure 5:
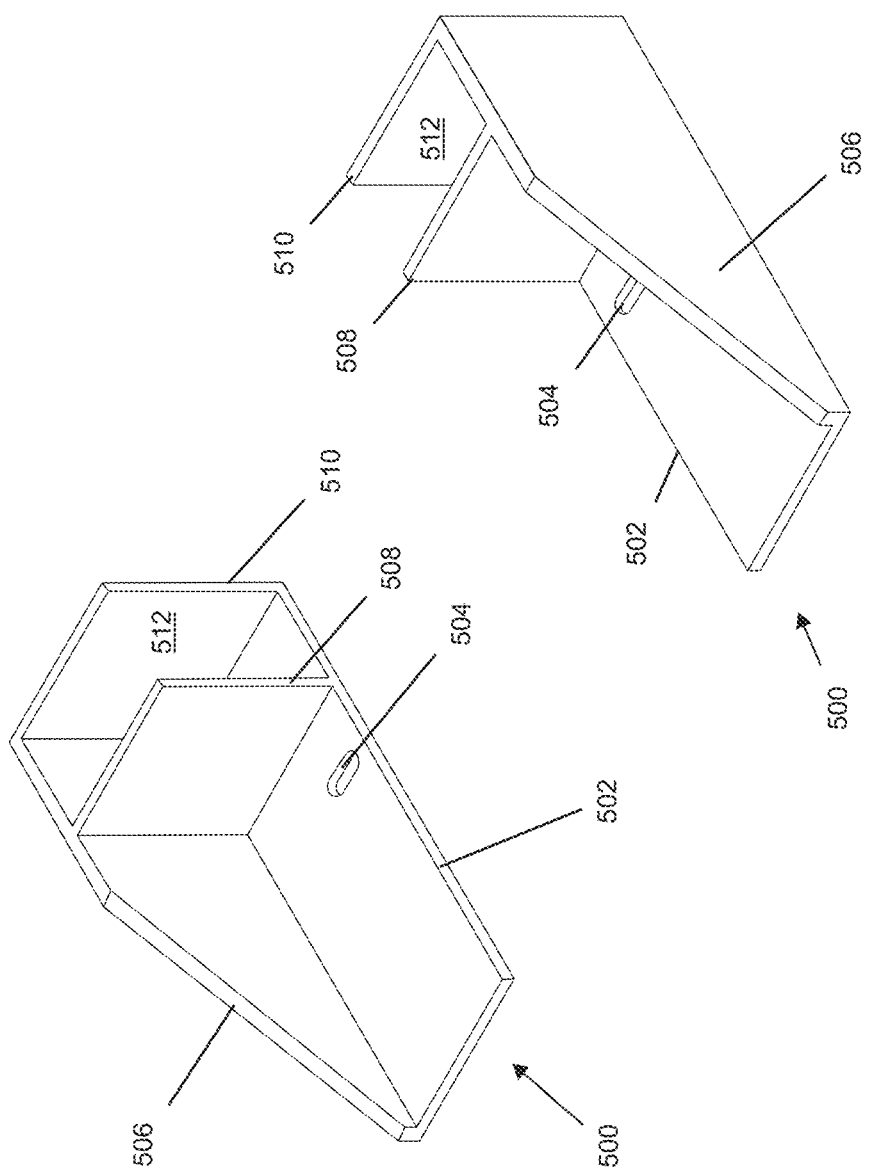
FIG. 5 is a perspective view of mounting brackets.
Figure 6:
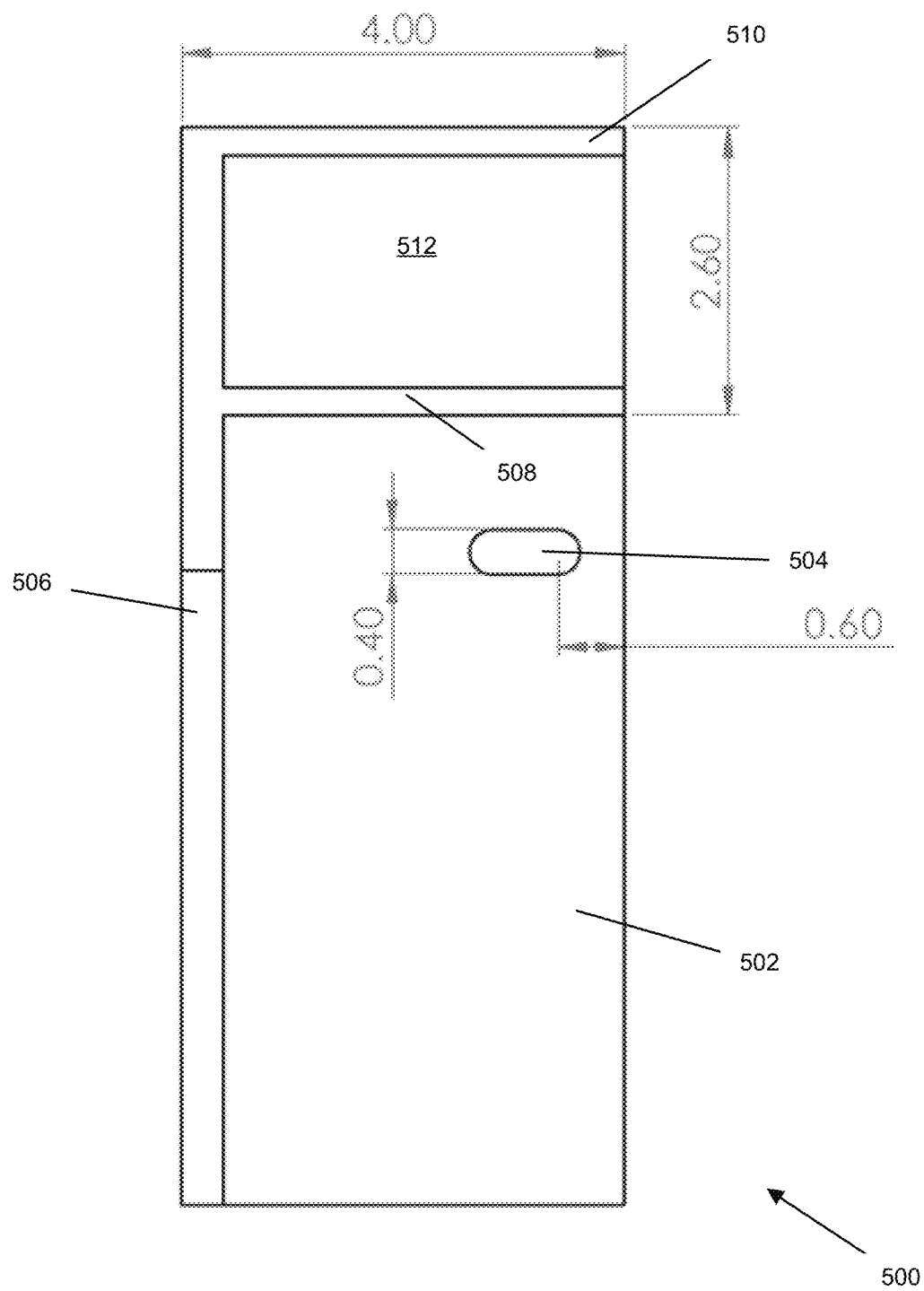
FIG. 6 is a top view of one of the mounting brackets of FIG. 5.

The opening 504 may be configured to receive a mechanical fastener. As depicted in FIG. 5 and FIG. 6, the opening 504 may have an oblong shape, and may have an example width of 0.40". In some embodiments, the opening 504 may have another shape (e.g. circular shape) for receiving the mechanical fastener. In some embodiments, the mounting bracket 500 has more than one opening 504, such that the mounting bracket 500 may engage the vehicle at more than one position based on the position of the openings 504 on the mounting bracket 500, and such that the rack 10 having the mounting bracket 500 may be mounted and fastened to the vehicle at more than one position based on the position of the openings 504 on the mounting bracket 500.

The mounting bracket 500 may have a side wall 506 for providing structural support to the mounting bracket 500. As depicted, the side wall 506 has a slanted portion, and a straight portion that is merged with the intermediate wall 508 and the end wall 510. As depicted in FIG. 8, the slanted portion of the side wall 506 has an example length of 6.66", and the straight portion of the side wall 506 has an example length of 4.00". As depicted in FIG. 8, the slanted portion of the side wall 506 and the bottom wall 502 defines an example angle of 30.37° therebetween. In some embodiments, the slanted portion of the side wall 506 and the bottom wall 502 may define an angle between 25° to 45° therebetween. As depicted in FIG. 7, the side wall 506 has an example height of 3.87" and an example thickness of 0.38".

In some embodiments, the intermediate wall 508 and the end wall 510 of the mounting bracket 500 defines a slot 512. In some embodiments, the slot 512 may be configured for merging or connecting with the barrier 100 for mounting the barrier 100 to a vehicle. As depicted in FIG. 5 and FIG. 6, the slot 512 may have a generally rectangular shape. As depicted in FIG. 6, the slot 512 has an example length of 2.60". As depicted in FIG. 6, the mounting bracket 500 has an example width of 4.00". In some embodiments, the mounting bracket 500 has a width from 3.75" to 4.50".

In some embodiments, the walls of the mounting bracket, such as the bottom wall 502, the side wall 506, the intermediate wall 508, and the end wall 510, may have a thickness between 0.250" to 0.375".

In some embodiments, the mounting bracket 500 may have one or more slots, channels, rails, ribs, or otherwise a guide on the mounting surface for aligning the mounting bracket 500 with a vehicle, or a portion of a vehicle, for mounting the rack 10 to the vehicle.

As depicted in FIG. 5, the slot 512 extends from the intermediate wall 508 to the end wall 510, and to the bottom wall 502. In such an embodiment, the slot 512 receives the barrier 100, such that the barrier 100 contacts, or substantially contacts, the bottom wall 502. When the barrier 100 is disposed within the slots 512 provided by the mounting bracket 500 such that the barrier 100 and the mounting bracket 500 are connected, the rack 10 is defined by the barrier 100 and the mounting bracket 500, which together will define a height. To adjust the height of the rack 10, in some embodiments, the slot 512 has a filler or spacer inside the slot 512, such that when the barrier 100 is received in the slot 512, the rack 10 defined by the barrier 100 and the bracket 500 will have a height that is greater than the height of the rack 10 defined by the barrier 100 and the bracket 500 without the filler.

In some embodiments, where the rack 10 is to be mounted on a vehicle with a relatively lower cab height, for example a Ford F150®, the mounting bracket 500 may not have a filler or spacer, such that the barrier 100 may be disposed in opposition of a rear window while the rack 10 is mounted to the vehicle based on the relatively low cab height. In some embodiments, where the rack 10 is to be mounted on a vehicle with a relatively high cab height, for example, a Ford F250® or Ford F350®, the mounting bracket 500 may have a filler or spacer, such that the barrier 100 may be disposed in opposition of a rear window while the rack 10 is mounted to the vehicle based on the relatively high cab height.

When the mounting bracket 500 is manufactured, for example, by injection moulding, the spacer or filler may be moulded into the slot 512 as additional material inside the slot 512, such that the additional material fills a portion of the slot 512.

Accordingly, in some embodiments, the mounting bracket 500 has a filler or spacer in the slot 512, and in other embodiments, the mounting bracket 500 does not have a filler or spacer in the slot 512.

Figure 9:
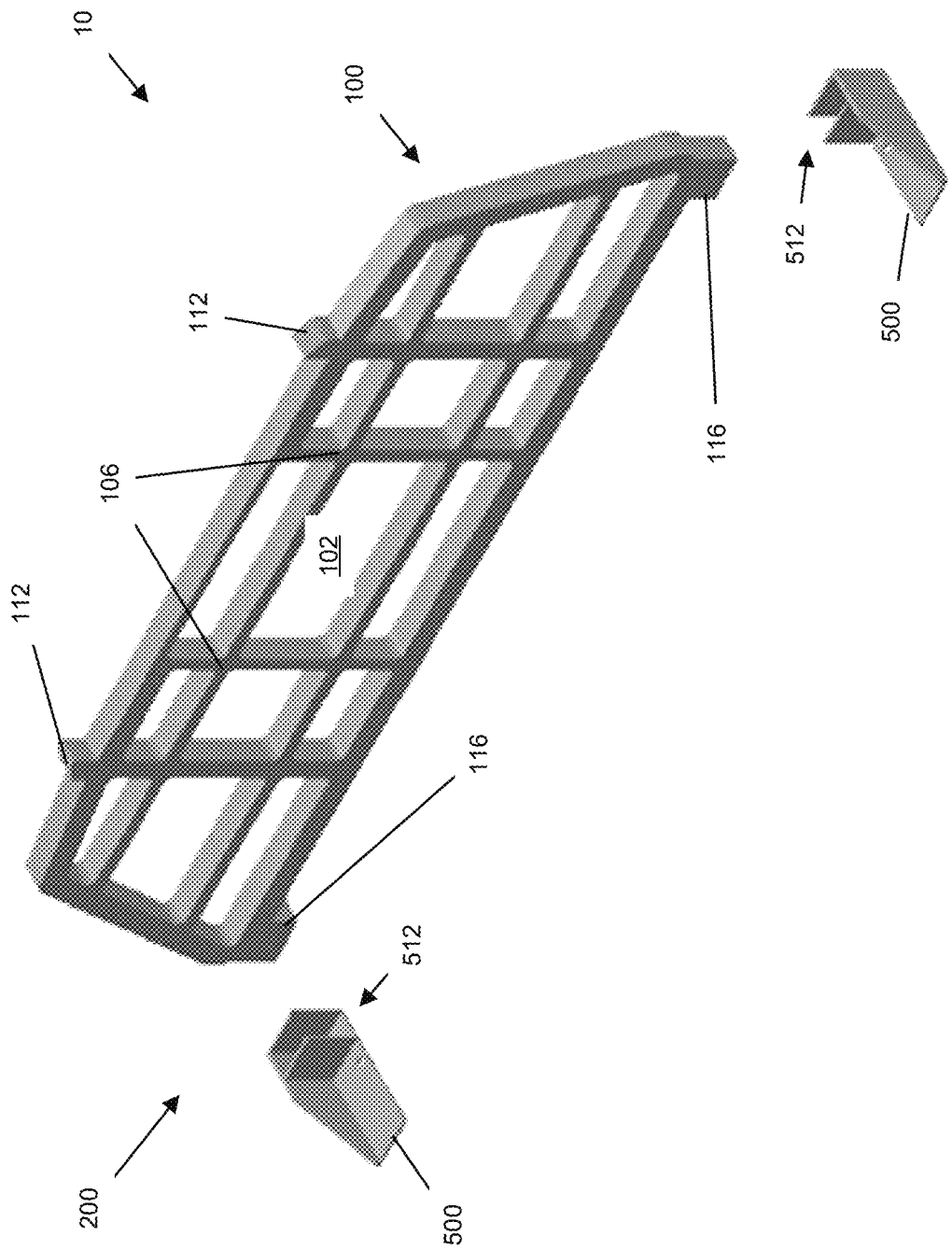
FIG. 9 is a perspective view of a rack having a barrier and mounting brackets.

In some embodiments, the barrier 100 comprises legs 116. As depicted in FIG. 9, the legs 116 extend from a lower portion of the barrier 100. In some embodiments, where the barrier 100 and the mounting brackets 500 are separate components that are fastened together, the legs 116 of the barrier 100 may be received in the slots 512 of the mounting brackets 500. When the legs 116 of the barrier are received in the slots 512 of the mounting brackets 500, the barrier 100 and the mounting brackets 500 may be fastened together using, for example, a mechanical fastener.

Figure 73:
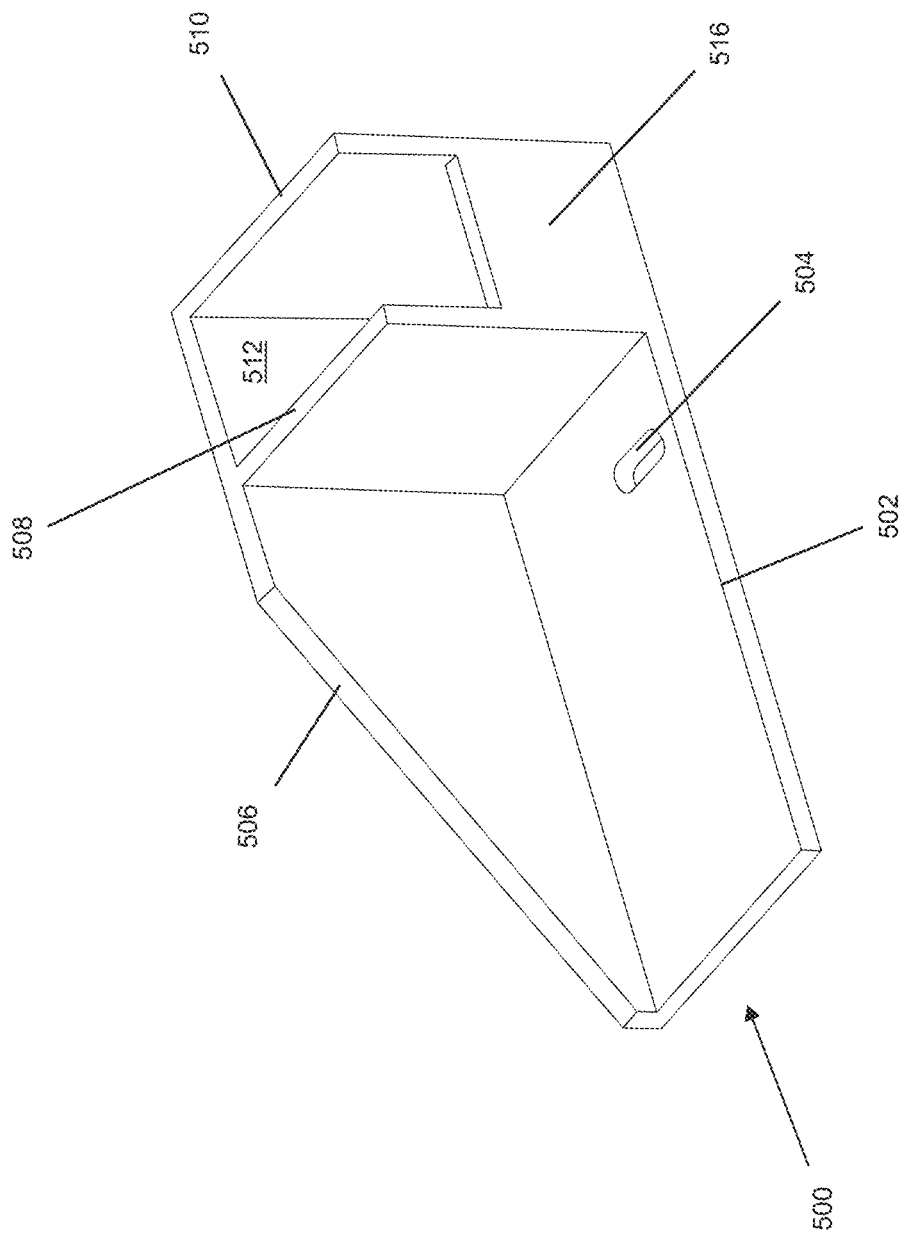
FIG. 73 is a perspective view of an alternate embodiment of the mounting bracket of FIG. 5.

As depicted in FIG. 5, the slot 512 has a top opening and a side opening defined between the intermediate wall 508 and the end wall 510. In some embodiments, for example, as depicted in FIG. 73, a wall 516 extends from the bottom wall 502 and between the intermediate wall 508 and the end wall 510 to reduce the size of the opening defined along the side of the mounting bracket 500, or covering at least a portion of the opening defined along the side of the mounting bracket 500, such that the leg 116 of the barrier 100 may be received in the slot 512 by lowering the leg 116 into the slot 512. In this regard, the slot 512, with at least a portion of the opening defined along the side of the mounting bracket 500 covered or reduced in size by the wall 516, the slot 512 is a pocket.

In some embodiments, the rack 10 is manufactured by injection moulding, such that the rack 10 is of unitary one-piece construction for mounting to a vehicle. Where the rack 10 comprises the barrier 100, the barrier 100 is injection moulded as a unitary one-piece construction for mounting to a vehicle.

In some embodiments, where the rack 10 comprises the barrier 100 and the base 200 having one or more mounting brackets 500, the rack 10 may be manufactured by injection moulding, such that the barrier 100 and the base 200 having one or more mounting brackets 500 is of unitary one-piece construction for mounting to the vehicle, as depicted in FIG. 1. In such embodiments, the barrier 100 and the base 200 having one or more mounting brackets 500 are injection moulded together and are merged together to be of unitary one-piece construction.

In other embodiments, where the rack 10 comprises the barrier 100 and the base 200 having one or more mounting brackets 500, the rack 10 may be manufactured by injection moulding, such that the barrier 100 and the base 200 having the one or more mounting brackets 500 are separately manufactured, as depicted in FIG. 9. In such embodiments, the barrier 100 may be injection moulded, and the base 200 having the one or more mounting brackets 500 may be separately injection moulded. The barrier 100 may be fastened to the base 200 having the one or more mounting brackets 500 using fasteners (e.g. nuts and bolts, eye bolt, nails, screws, pegs, and the like), friction fit, interference fit, or complementary connecting structures. Where the barrier 100 and the base 200 has complementary connecting structures, the barrier 100 may have a male or female connecting structure (e.g. pins, prongs, or tabs, and slots, holes, or channels), and the base 200 having the one or more mounting brackets 500 may have the other of the male or female connecting structure that is complementary to the connecting structure of the barrier 100, where the male and female connecting structures are cooperatively configured to engage, such that when the male and female connecting structures engage, the barrier 100 and the base 200 having the one or more mounting brackets 500 may be connected together. In some embodiments, when the barrier 100 and the base 200 having the one or more mounting brackets 500 are connected together, they may be releasably connected together, or may be connected together and not be releasable. In some embodiments, the barrier 100 and the base 200 may snap fit together.

In some embodiments, the rack 10 comprises a connector 1000 of unitary one-piece construction that may be received in an internal stake pocket of a rail of a truck bed, and may be fastened to the rail of the truck bed using a mechanical fastener and existing openings on the rail of the truck bed. The top of the connector may be configured to increase the strength of the connector 1000 for fastening the rack 10 to the vehicle by being fastened to be disposed opposite a flange extending from the top surface of the rail into the stake pocket for engagement with the flange. The engagement of the connector 1000 with the flange may reduce or mitigate movement of the rack 10 when the rack 10 is connected to the connector 1000 and fastened to the vehicle.

In some embodiments, the connector 1000 may be manufactured by extrusion, and may be manufactured with aluminum. In some embodiments, the connector 1000 may be manufactured by injection moulded, and may be manufactured with high impact co-polymer, nylon, or polypropylene, thermoplastic, or composite. In some embodiments, the connector 1000 may be injection moulded using polypropylene with 30% glass fiber filler.

In some embodiments, the rack 10 comprises a connector 1000 for releasably fastening the rack 10 to the vehicle.

In some embodiments, the connector 1000 is configured to receive a mechanical fastener to fasten the rack 10 to the vehicle using the mechanical fastener.

In some embodiments, the vehicle is a truck having a truck bed, and the connector 1000 is configured for insertion within a stake pocket defined within a rail of the truck bed.

In some embodiments, the connector 1000 is cooperatively configured with a flange of the truck bed, the flange extending into the stake pocket, such that, while the connector 1000 is disposed within the stake pocket, a side surface portion of the connector 1000 is opposed by the flange of the truck bed, for limiting movement of the connector 1000 relative to the truck bed.

In some embodiments, a connector 1000 for releasably fastening a rack to a truck bed, the truck bed defining a stake pocket within the truck bed, the truck bed having a flange at an opening of the stake pocket, wherein the connector 1000 is cooperatively configured with the flange, such that, while the connector 1000 is disposed within the stake pocket, a side surface portion of the connector 1000 is being opposed by the flange, for limiting movement of the connector relative to the truck bed.

In some embodiments, the truck bed of the truck includes a flange extending into the stake pocket of the truck. While the connector 1000 is inserted within the stake pocket, the connector 100 and the flange are cooperatively configured such that a side surface portion of the connector 1000 is opposed by the flange for limiting movement of the connector 1000 relative to the truck bed.

In some embodiments, the connector 1000 comprises a side channel 1002 to receive a mechanical fastener to fasten the connector 1000 to a rail of the truck bed.

In some embodiments, the connector 1000 comprises a channel 1004 to receive a mechanical fastener to releasably fasten the rack 10 to the truck bed.

In some embodiments, the connector 1000 is cooperatively configured with the flange, such that, while the connector 1000 is disposed within the stake pocket, a side surface portion of the connector 1000 is being opposed by the flange, for limiting lateral movement of the connector 1000 relative to the truck bed.

Figure 10:
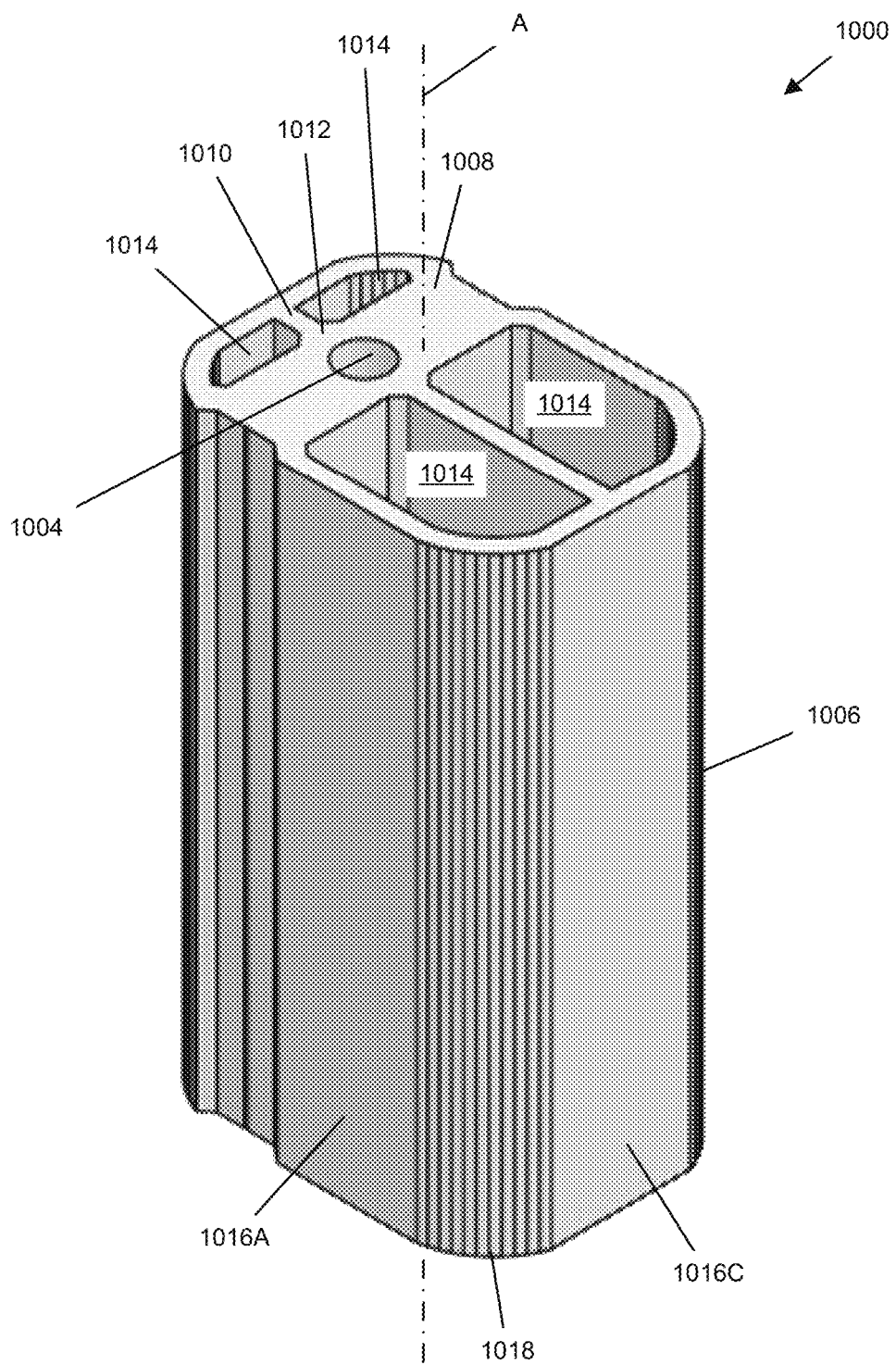
FIG. 10 is a perspective view of a connector.

FIG. 10 to FIG. 15 depict an example connector 1000. As depicted in FIG. 10, in some embodiments, the connector 1000 may comprise a body 1006 defining a longitudinal axis A, a first internal support 1008 inside the body 1006 and extending along the axis A, a second internal support 1010 inside the body 1006 and extending along the axis A, wherein the first internal support 1008 is merged with the second internal support to define a merging point 1012, wherein the body 1006 and the first 1008 and second internal supports 1010 define four internal cavities 1014, and a channel 1004 extending along the body 1006 and extending parallel to or substantially parallel to the axis A and defined at a merging point 1012 of the first 1008 and second internal supports 1010 to receive a fastener.

Figure 11:
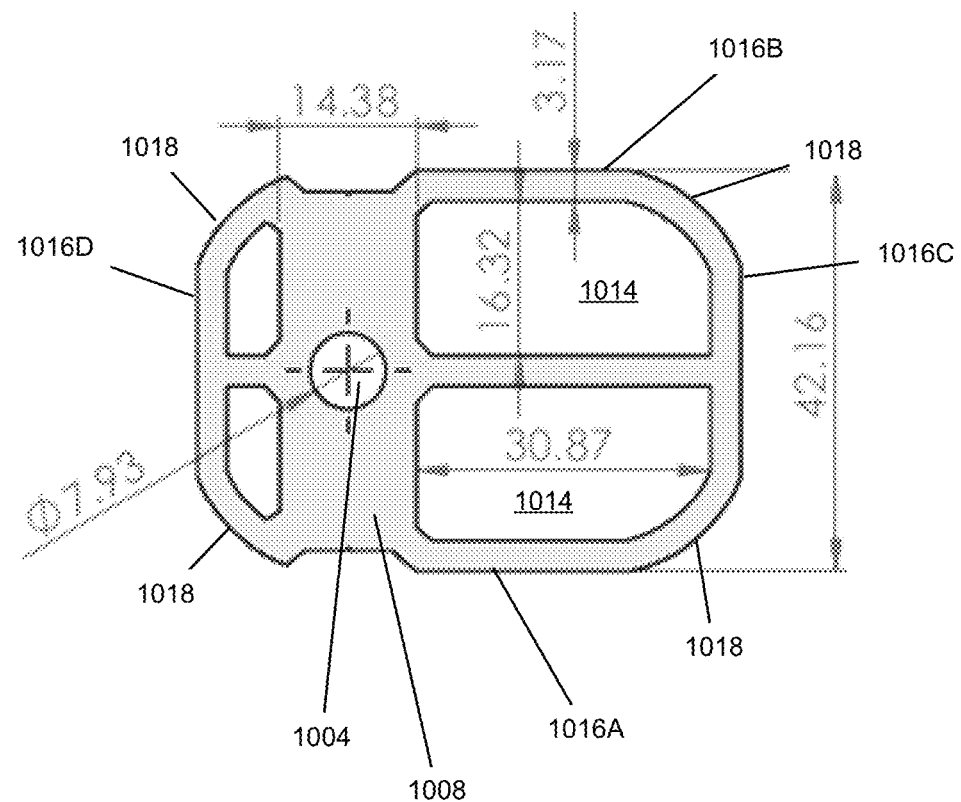
FIG. 11 is a top view of the connector of FIG. 10.

In some embodiments, the body 1006 of the connector 1000 has one or more walls 1016. For example, the body 1006 of the connector 1000 has a first wall 1016A, a second wall 1016B, a third wall 1016C, and a fourth wall 1016D, as depicted in FIG. 11, the first wall 1016A opposite the second wall 1016B and the third wall 1016C opposite the fourth wall 1016D.

In some embodiments, the first internal support 1008 extends laterally between the first wall 1016A and the second wall 1016B.

In some embodiments, the second internal support 1010 extends laterally between the third wall 1016C and the fourth wall 1016D.

In some embodiments, adjacent merging walls of the body 1006 define a rounded corner 1018.

In some embodiments, the connector 1000 is extruded.

Figure 14:
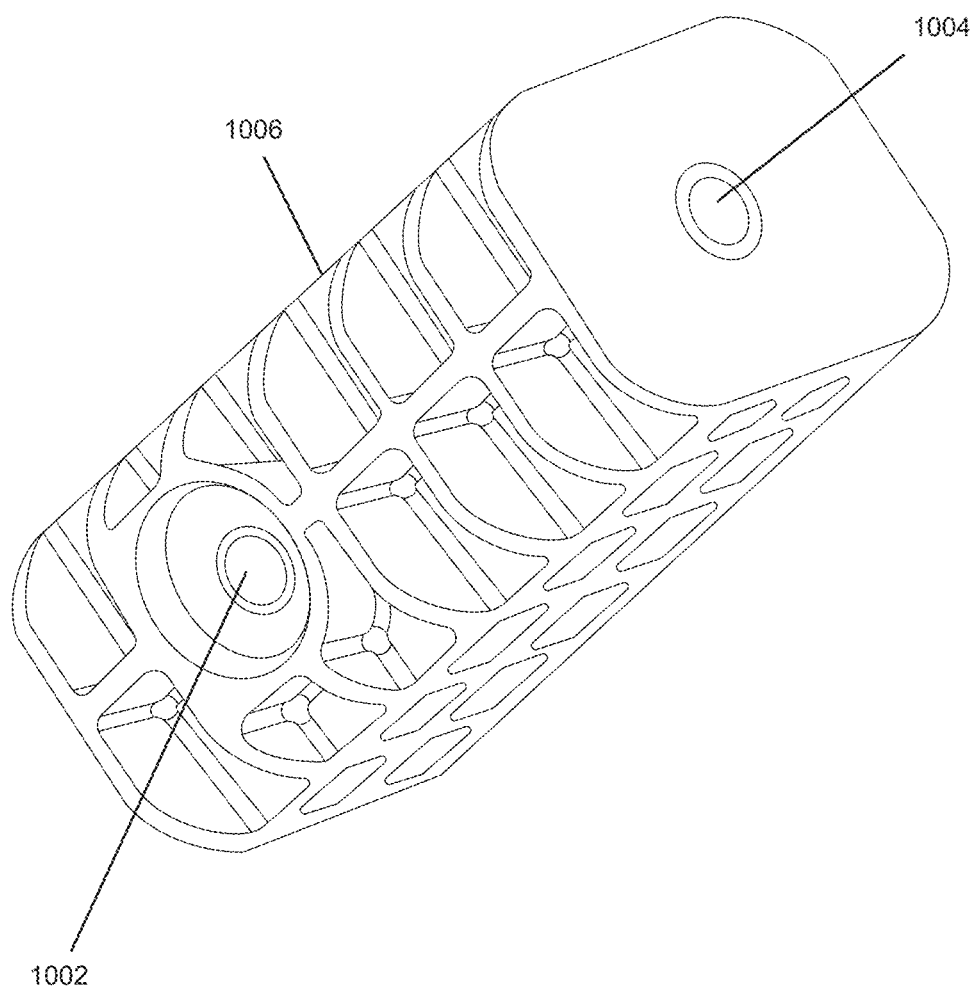
FIG. 14 is a perspective view of a connector.
Figure 15:
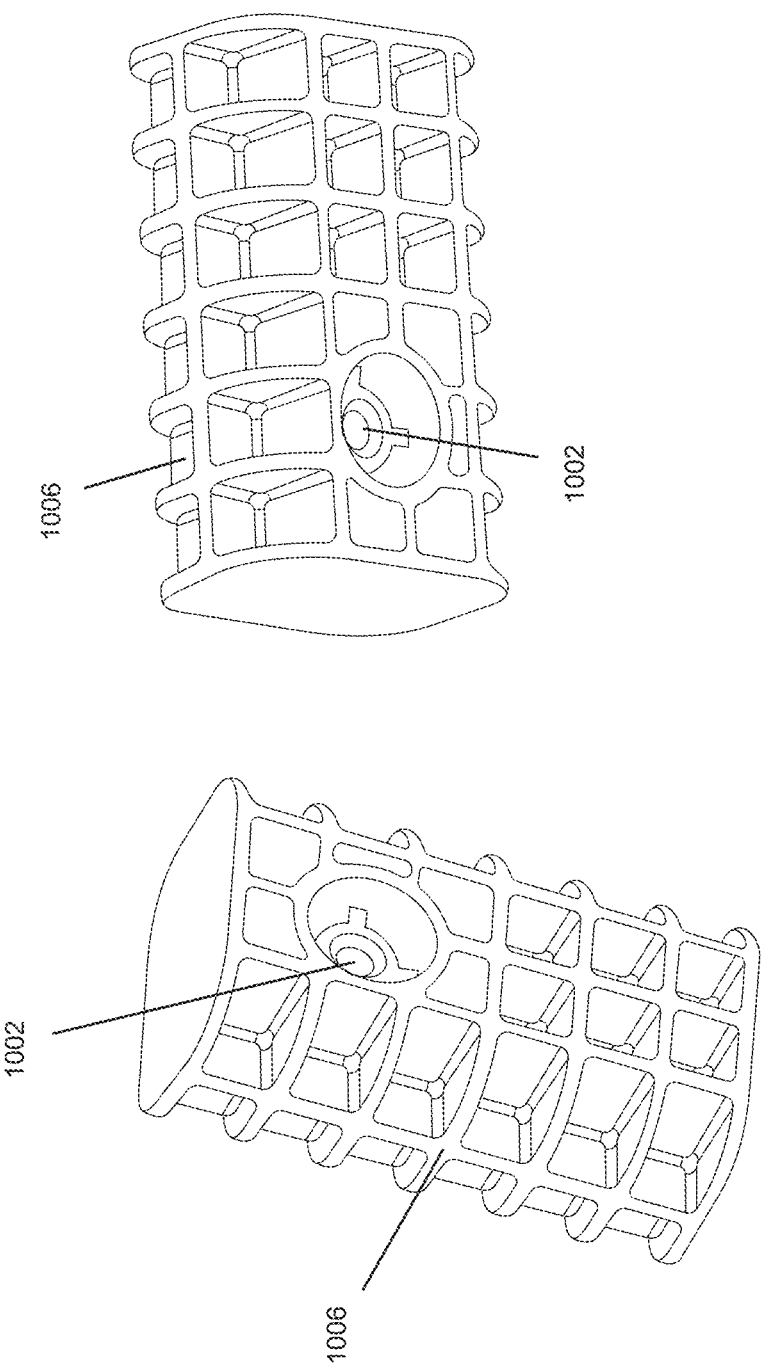
FIG. 15 is a perspective view of a connector.

In some embodiments, the body 1006 has a ribbed structure, as depicted in FIG. 14 and FIG. 15.

Figure 12:
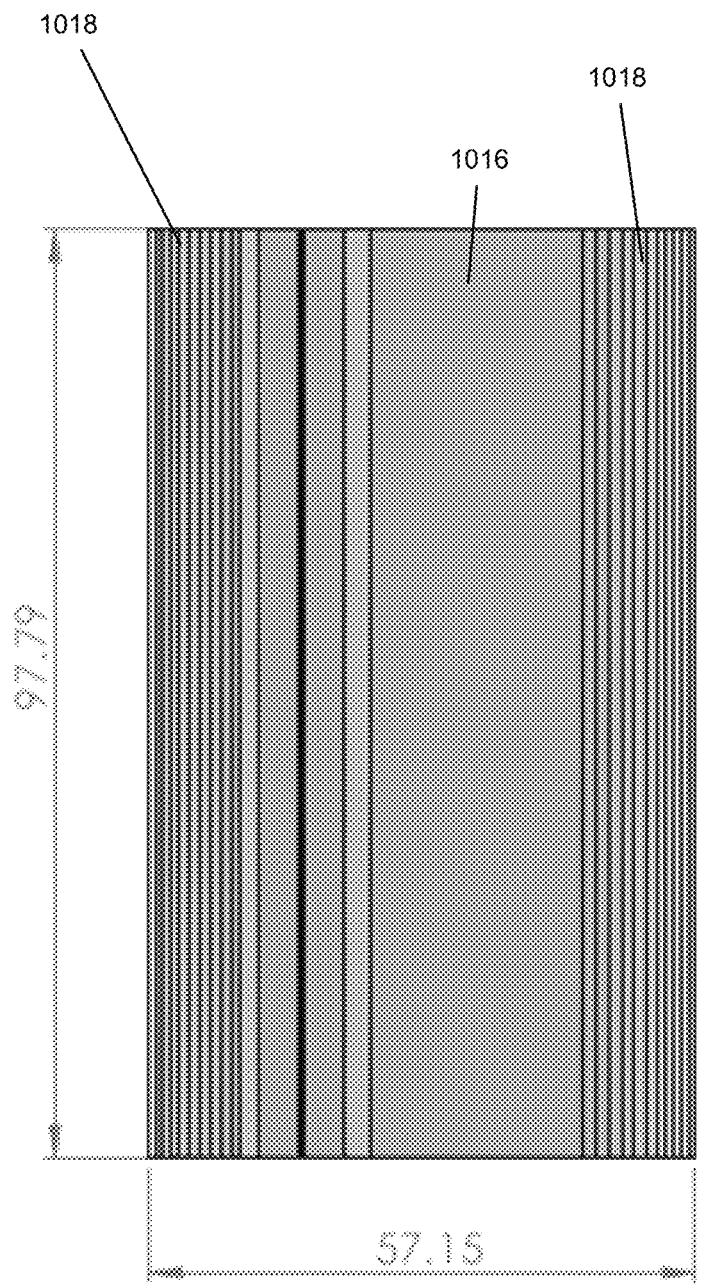
FIG. 12 is a side view of the connector of FIG. 10.

As depicted in FIG. 11 and FIG. 12, the connector 1000 has an example width of 42.16", an example length of 57.15", and a height of 97.79". As depicted in FIG. 11, the walls 1016 of the connector 1000 may have an example thickness of 3.17". As depicted in FIG. 11, the first internal support 1008 has an example thickness of 14.4". As depicted in FIG. 11, the channel 1004 has an example diameter of 7.93".

As depicted in FIG. 11, the body 1006 and the first 1008 and second internal supports 1010 define internal cavities 1014 of different dimensions, with a pair of cavities 1014 larger than the other pair of cavities 1014. In some embodiments, the connector 1000 has cavities 1014 as the internal supports 1008 and 1010 provide sufficient structural strength for the connector 1000. Accordingly, the cavities 1014 may provide a weight reduction for the connector 1000.

As depicted in FIG. 10, adjacent merging walls, for example, walls 1016A and 1016C, of the body 1006 define a rounded corner 1018. The rounded corner 1018 may provide structural strength to the connector 1000.

As depicted in FIG. 14 and FIG. 15, the connector 1000 may comprise a side channel 1002 to receive a mechanical fastener for fastening the connector 1000 to a rail of a truck bed. As depicted in FIG. 14 and FIG. 15, where the connector 1000 has a rectangular shape, the side channel 1002 may be positioned on the relatively long side or relatively short side of the connector 1000.

Figure 13:
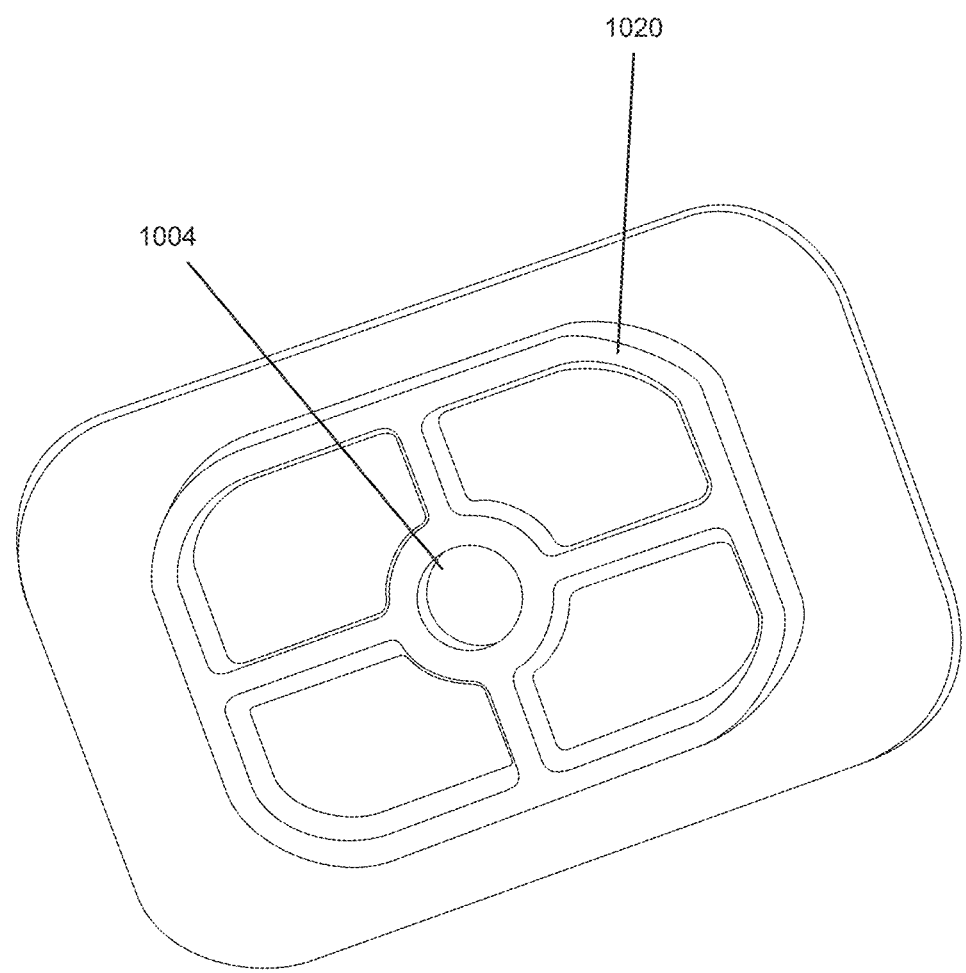
FIG. 13 is a top view of a connector.

FIG. 13 depicts another embodiment of the connector 1000. As depicted in FIG. 13, the connector 1000 has a channel 1004, and the connector 1000 is ribbed 1020 to strengthen the connector 1000. In some embodiments, the ribs 1020 may be configured for engagement with a base 200, for example, a mounting bracket 500, of the rack 10 to position the rack 10 relative to the connector 1000 for fastening the rack 10 to the connector 1000.

FIG. 14 and FIG. 15 depict another embodiment of the connector 1000. As depicted in FIG. 14 and FIG. 15, the connector 1000 has a ribbed body for providing structural strength to the connector 1000, but the connector 1000 does not define cavities 1014. The ribbed body 1006 of the connector 1000 of FIG. 14 and FIG. 15 may provide structural strength to the connector 1000 while reducing the weight of the connector 1000.

In some embodiments, the rack 10 is manufactured by injection moulding, such that the rack 10 is of unitary one-piece construction for mounting to a vehicle. Where the rack 10 comprises the barrier 100, the barrier 100 is injection moulded as a unitary one-piece construction for mounting to a vehicle.

In some embodiments, where the rack 10 comprises the barrier 100, the base 200 having one or more mounting brackets 500, and the connector 1000, the rack 10 may be manufactured by injection moulding, such that the barrier 100, the base 200 having one or more mounting brackets 500, and the connector 1000 is of unitary one-piece construction for mounting to the vehicle. In such embodiments, the barrier 100, the base 200 having one or more mounting brackets 500, and the connector 1000 are injection moulded together and are merged together to be of unitary one-piece construction. In such embodiments, the connector 1000 may extend from the mounting surface, for example, the bottom surface, of at least one of, or each of, the mounting brackets 500.

Figure 45:
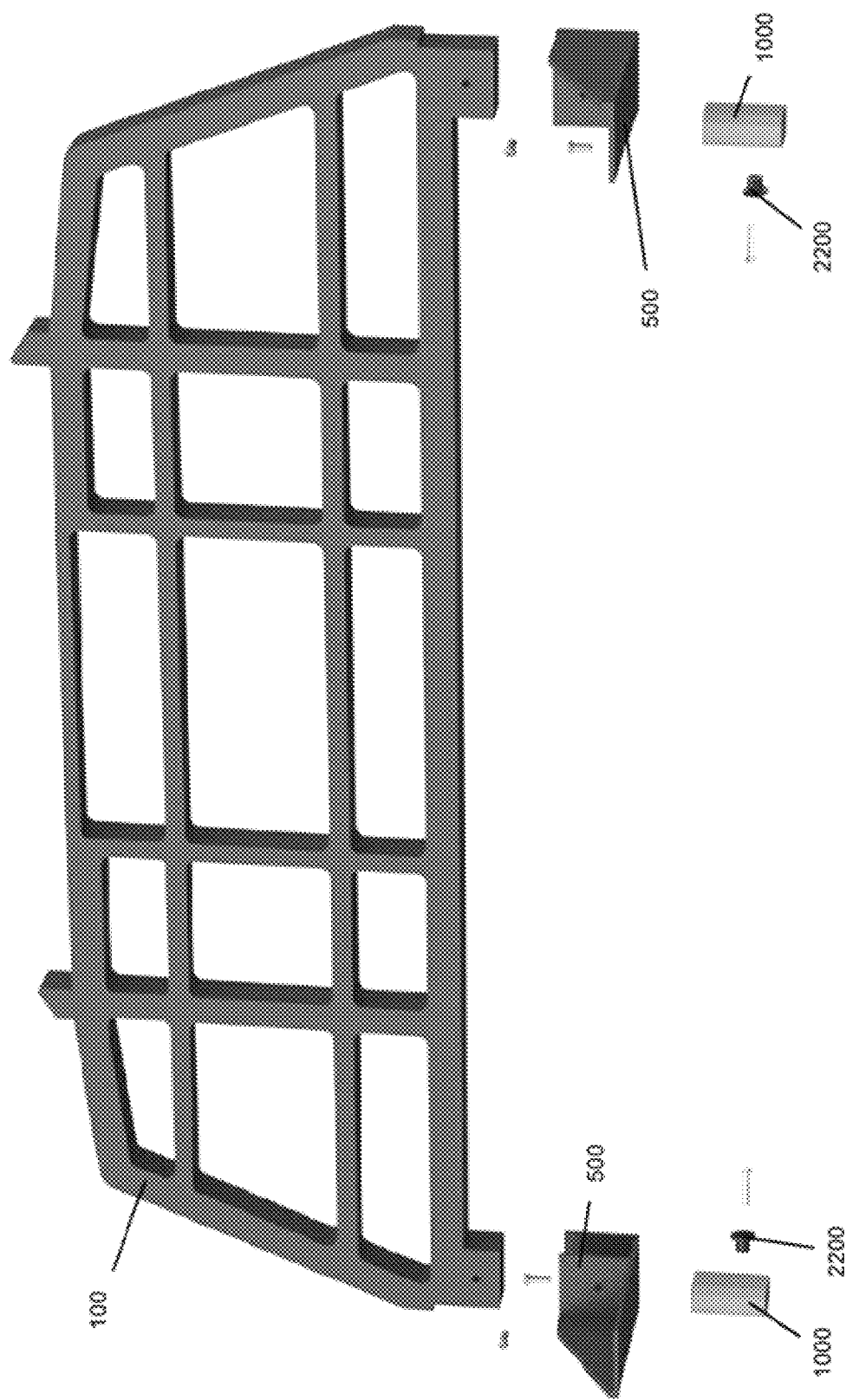
FIG. 45 is a perspective view of a rack having a barrier, mounting brackets, and connectors.
Figure 46:
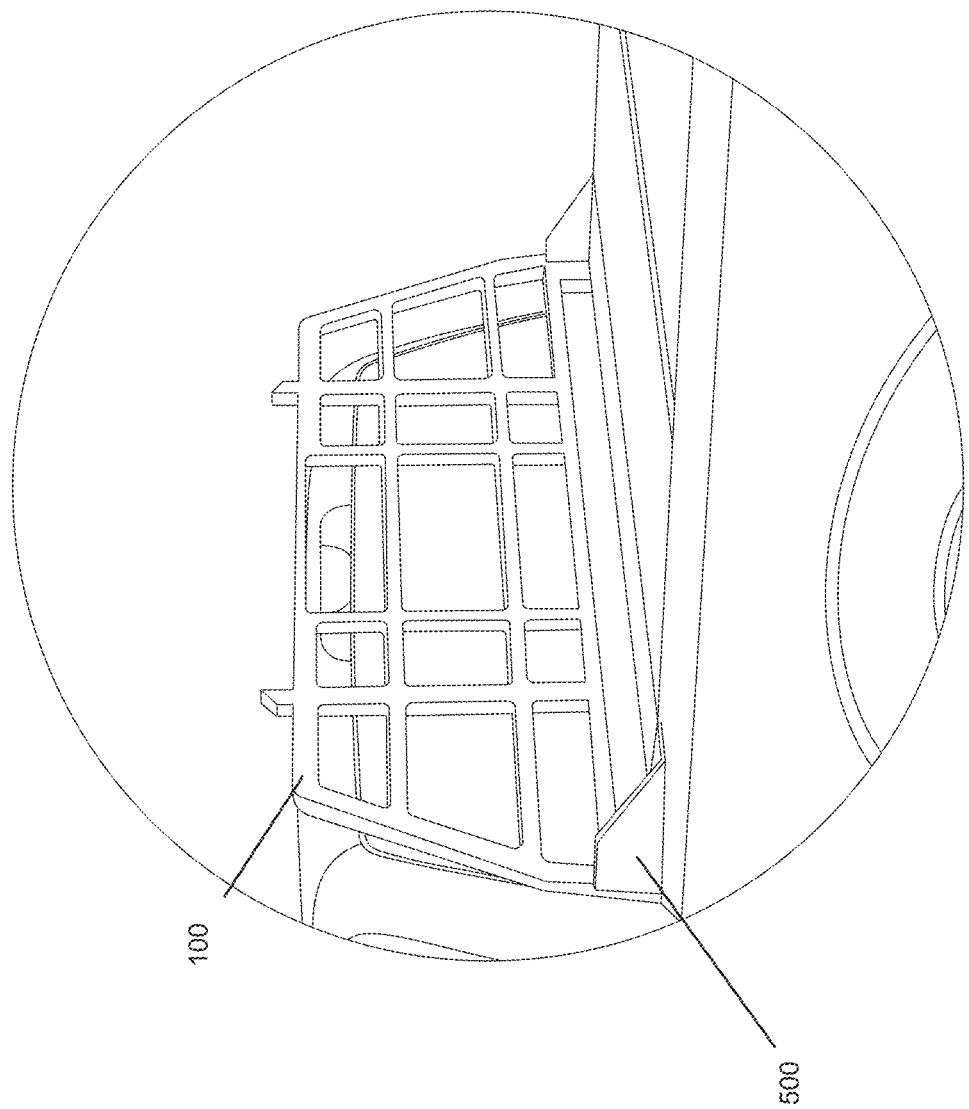
FIG. 46 is a schematic of a rack fastened to a rail of a truck bed with a cover.
Figure 47:
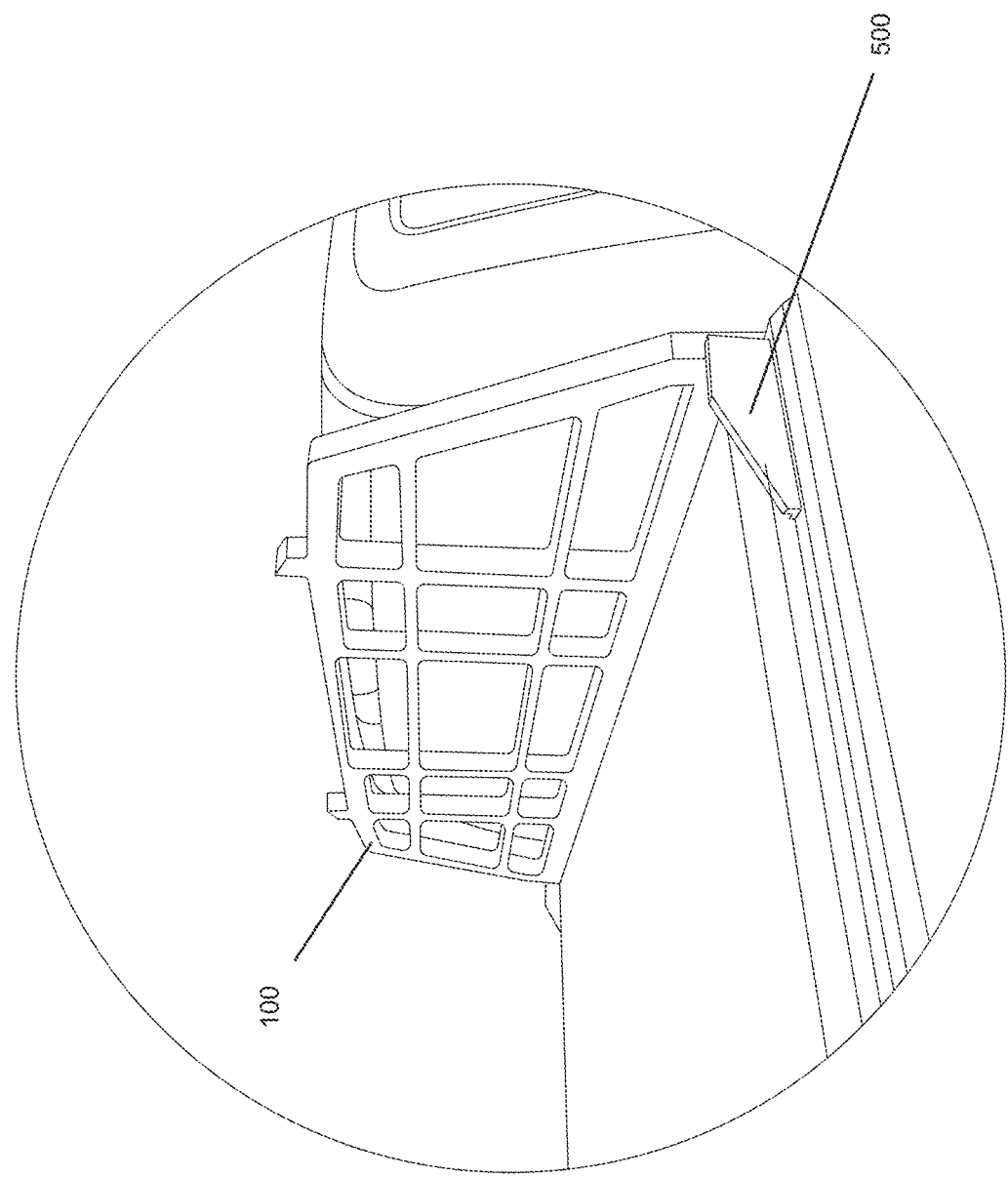
FIG. 47 is a schematic of a rack fastened to a rail of a truck bed with a cover.
Figure 48:
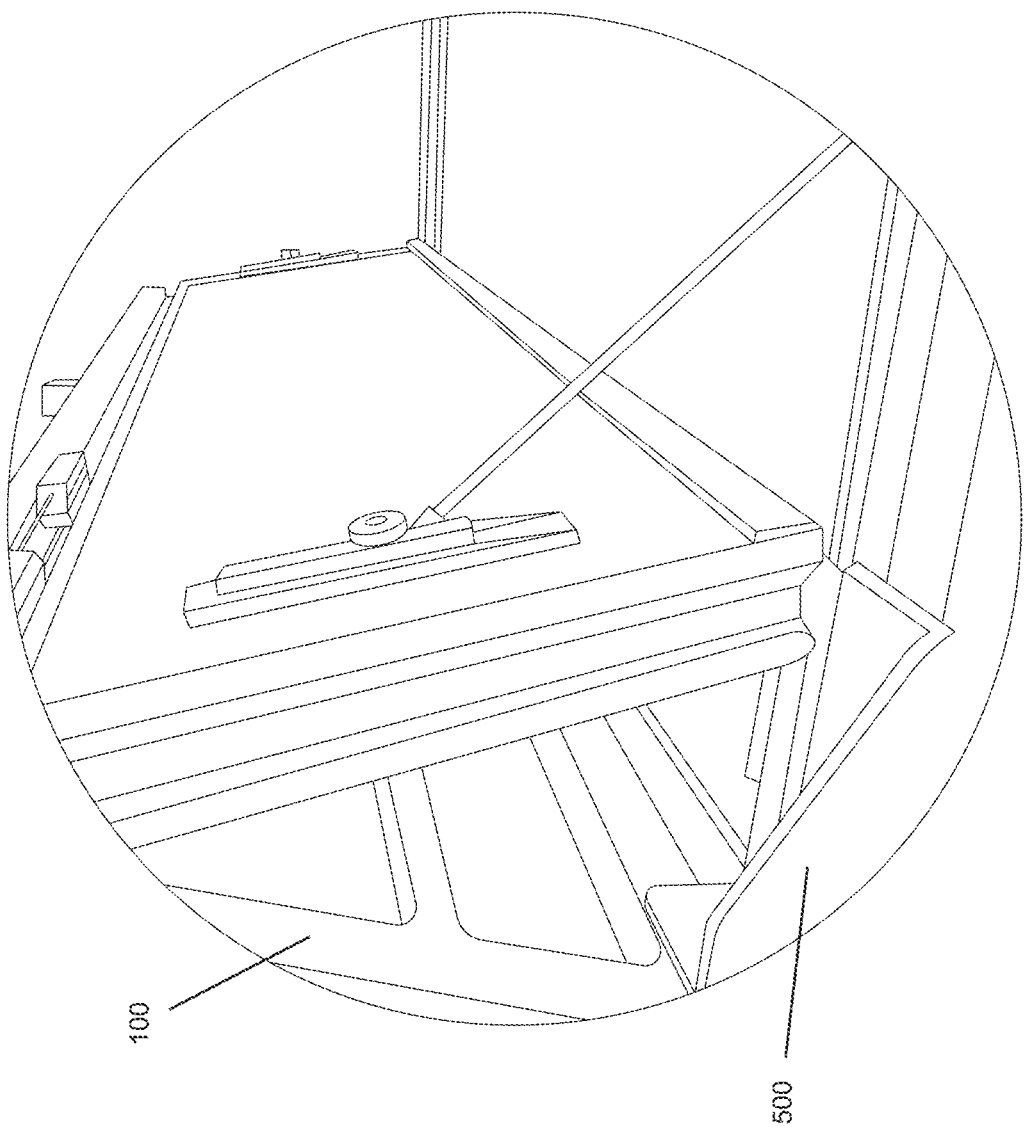
FIG. 48 is a schematic of a rack fastened to a rail of a truck bed with a cover.
Figure 49:
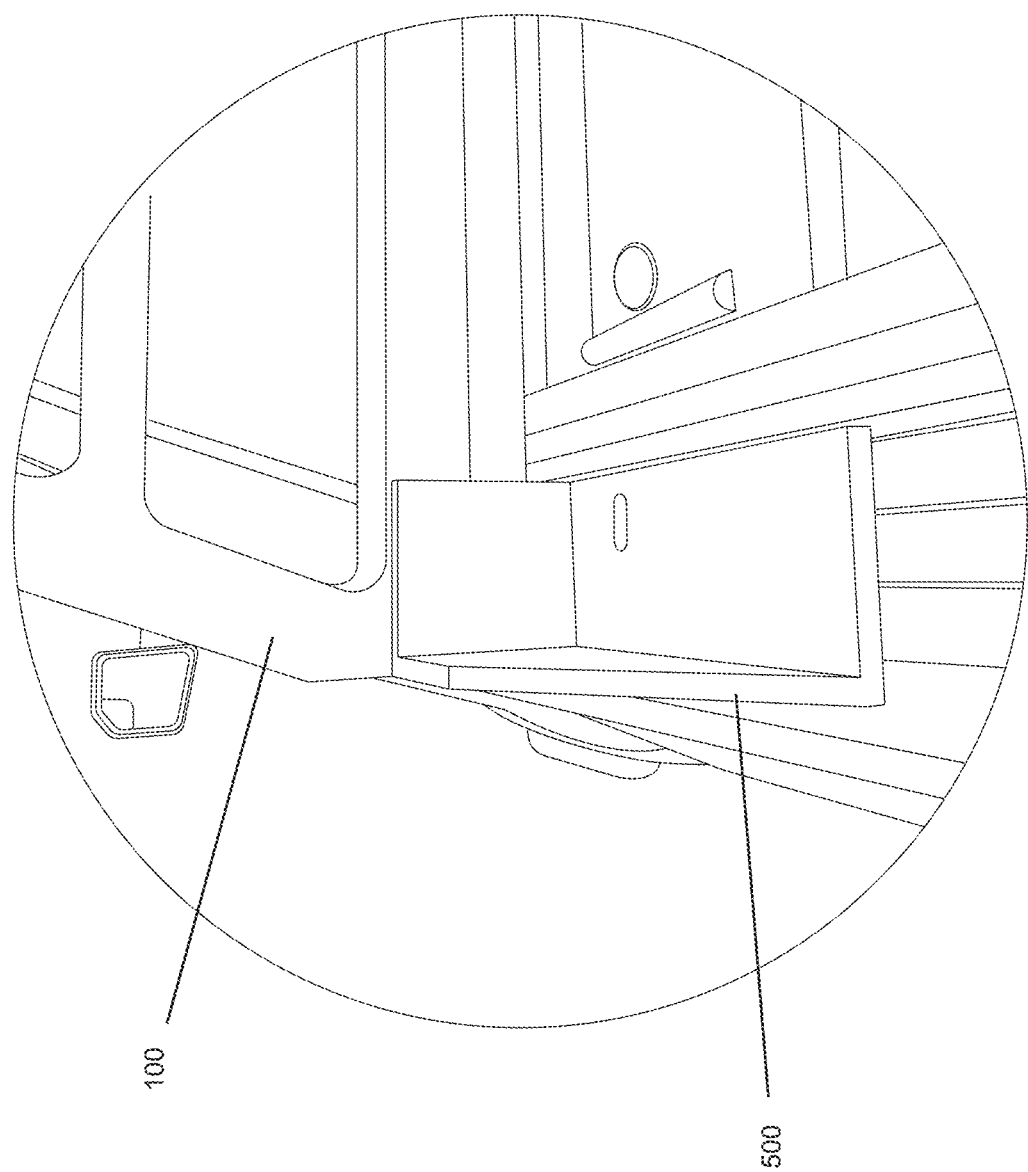
FIG. 49 is a schematic of a rack fastened to a rail of a truck bed with a cover.

In other embodiments, as depicted in FIG. 45, where the rack 10 comprises the barrier 100 and the base 200 having one or more mounting brackets 500, and the connector 1000, the rack 10 may be manufactured by injection moulding, such that the barrier 100 the base 200 having the one or more mounting brackets 500, and the connector 1000 are separately manufactured as separate components of the rack 10. In such embodiments, the barrier 100 may be injection moulded, and the base 200 having the one or more mounting brackets 500 may be separately injection moulded, and the connector 1000 may be separately injection moulded, extruded, or otherwise manufactured. The barrier 100 may be fastened to the base 200 having the one or more mounting brackets 500 using fasteners (e.g. nuts and bolts, eye bolt, nails, screws, pegs, and the like), friction fit, interference fit, or complementary connecting structures. Where the barrier 100 and the base 200 has complementary connecting structures, the barrier 100 may have a male or female connecting structure (e.g. pins, prongs, or tabs, and slots, holes, or channels), and the base 200 having the one or more mounting brackets 500 may have the other of the male or female connecting structure that is complementary to the connecting structure of the barrier 100, where the male and female connecting structures are cooperatively configured to engage, such that when the male and female connecting structures engage, the barrier 100 and the base 200 having the one or more mounting brackets 500 may be connected together. In some embodiments, when the barrier 100 and the base 200 having the one or more mounting brackets 500 are connected together, they may be releasably connected together, or may be connected together and not be releasable. In some embodiments, the barrier 100 and the base 200 may snap fit together. The connected barrier 100 and base 200 may be connected to the connector 1000 using a mechanical fastener, as described herein.

The rack 10 of unitary one-piece construction described herein may be mounted to a vehicle including a cab having a rear window. In some embodiments, the rack 10 may be mounted to a truck with a truck bed. In some embodiments, the rack 10 may be mounted to a truck bed of a truck using the connector 1000.

Figure 16:
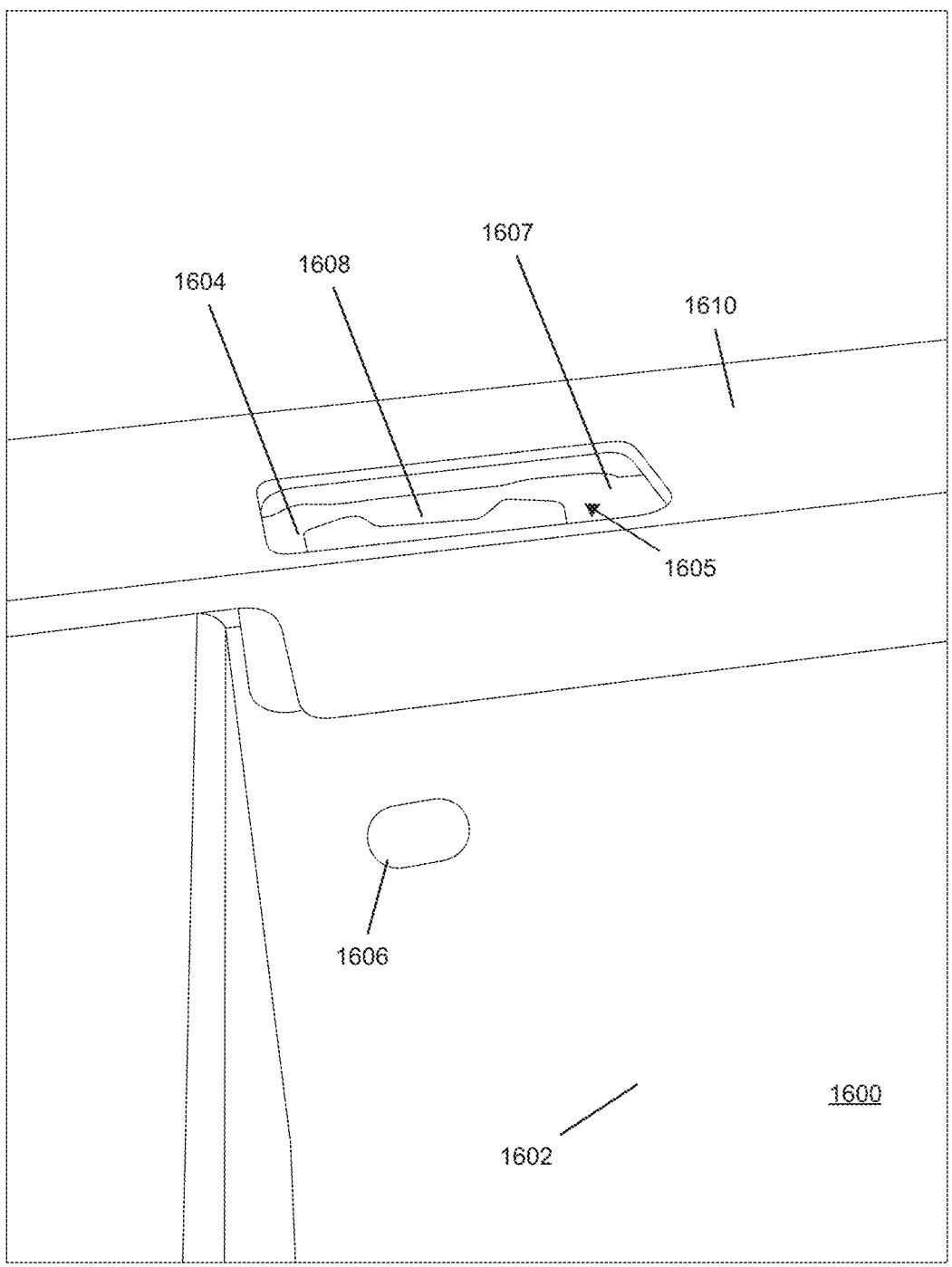
FIG. 16 is a schematic of a rail of a truck bed and a stake pocket.

FIG. 16 depicts an example truck bed 1600 of a truck. In some embodiments, the truck bed 1600 has a rail 1602. The rail 1602 defines an opening 1604 from a top surface 1607 of the rail 1602, and a side opening 1606. A flange or lip 1608 extends from the top surface 1607 of the rail 1602. In some embodiments, the rail 1602 defines a stake pocket 1605. In some embodiments, a cover 1610 covers the top surface 1607 of the rail 1602, and may have an opening that may be generally similar to the opening 1604 of the stake pocket 1605 such that the stake pocket 1605 may receive, for example, the connector 1000.

As depicted in FIG. 16, the flange 1608 extends from the top surface 1607 of the rail 1602 into the rail 1602. As depicted in FIG. 16, the opening 1604 has four sides. In some embodiments, a flange 1608 may extend from the top surface 1607 of the rail 1602 into the rail 1602 from each of the sides of the opening 1604. For example, the flange 1608 may have a length of ⅛".

As depicted in FIG. 16, the rail 1602 defines an opening 1606 along the side of the rail 1602. The opening 1606 may receive a mechanical fastener for fastening a connector 1000 received in the stake pocket 1605. As depicted in FIG. 16, the opening 1606 may have an oblong shape. In some embodiments, the opening 1606 may have other shapes, such as a circular shape. When the truck bed 1600 is being manufactured, the opening 1606 may be used to move the rail 1602.

Figure 17:
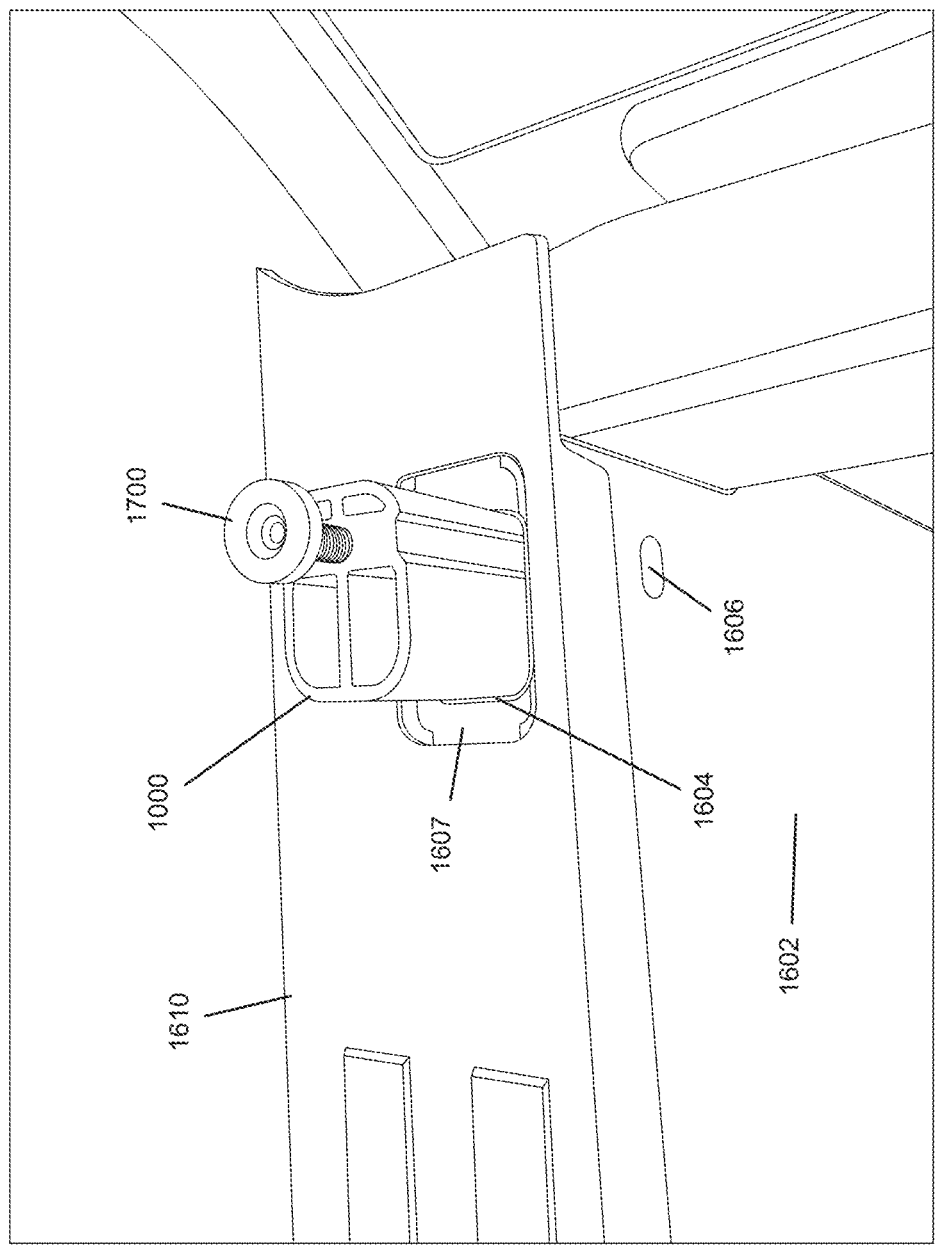
FIG. 17 is a schematic of a connector inside a stake pocket.
Figure 18:
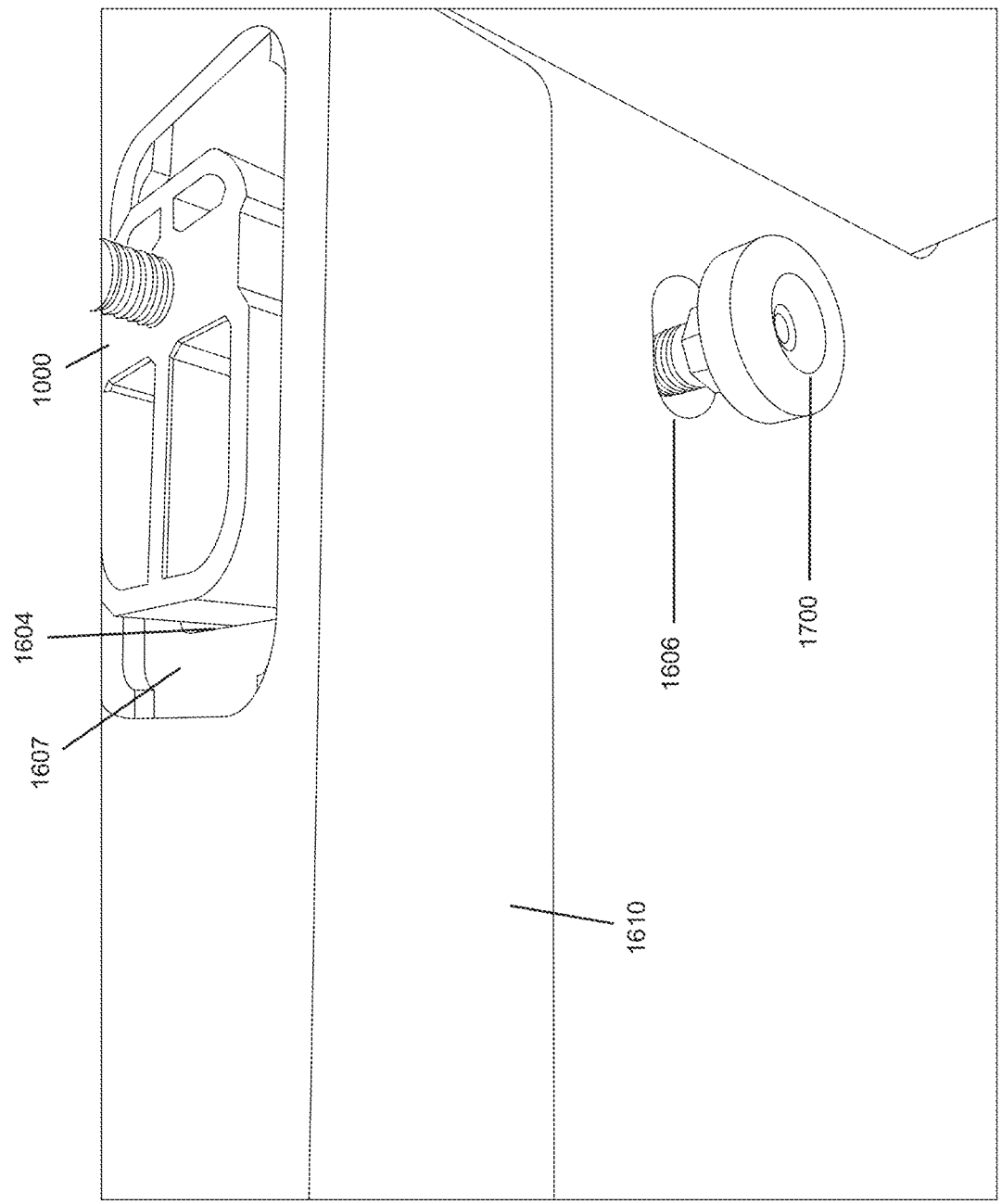
FIG. 18 is a schematic of a connector fastened to a rail of a truck bed.
Figure 19:
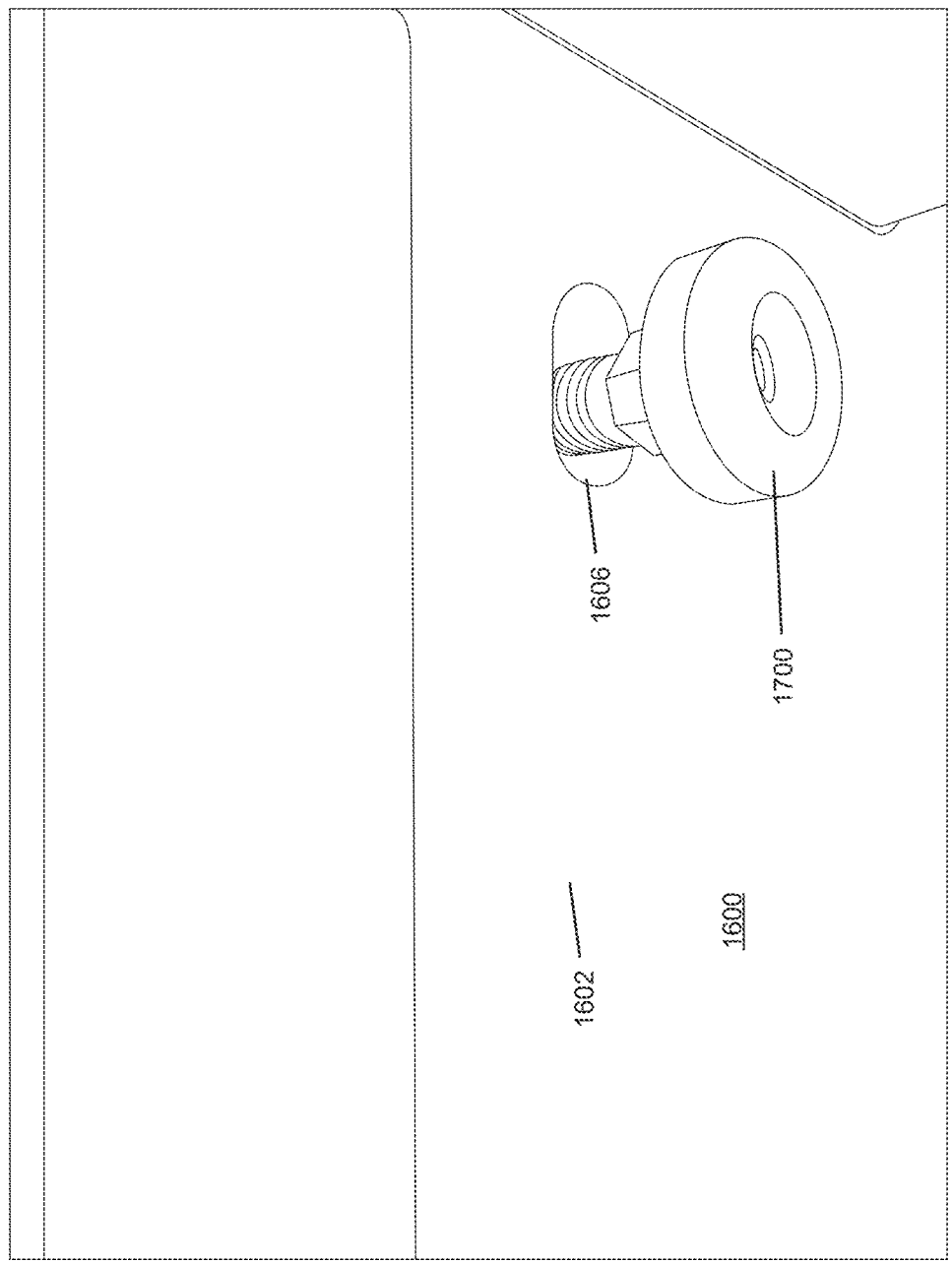
FIG. 19 is a schematic of a fastener received in a side hole of a rail of a truck bed.
Figure 20:
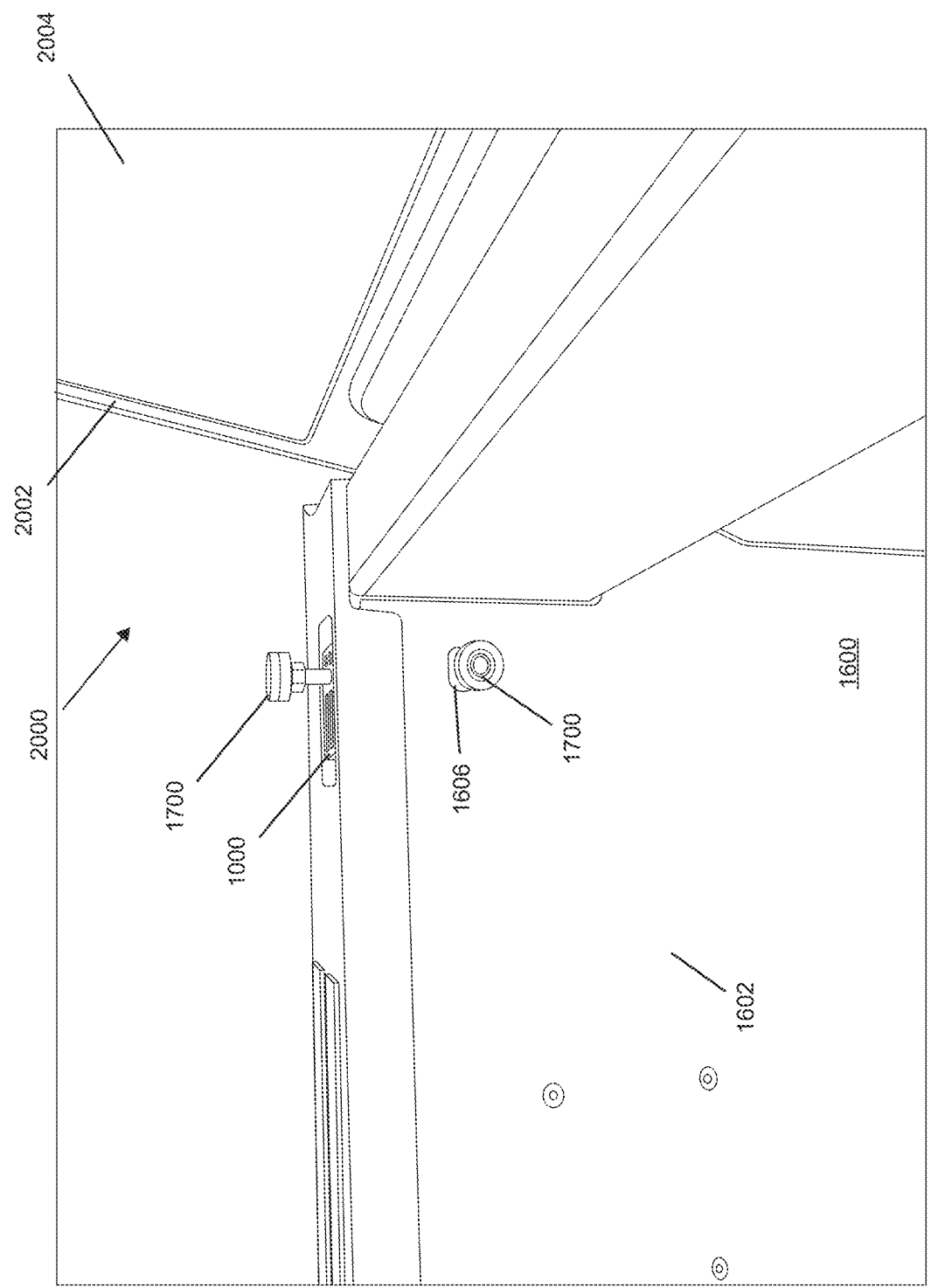
FIG. 20 is a schematic of a connector fastened to a rail of a truck bed.
Figure 21:
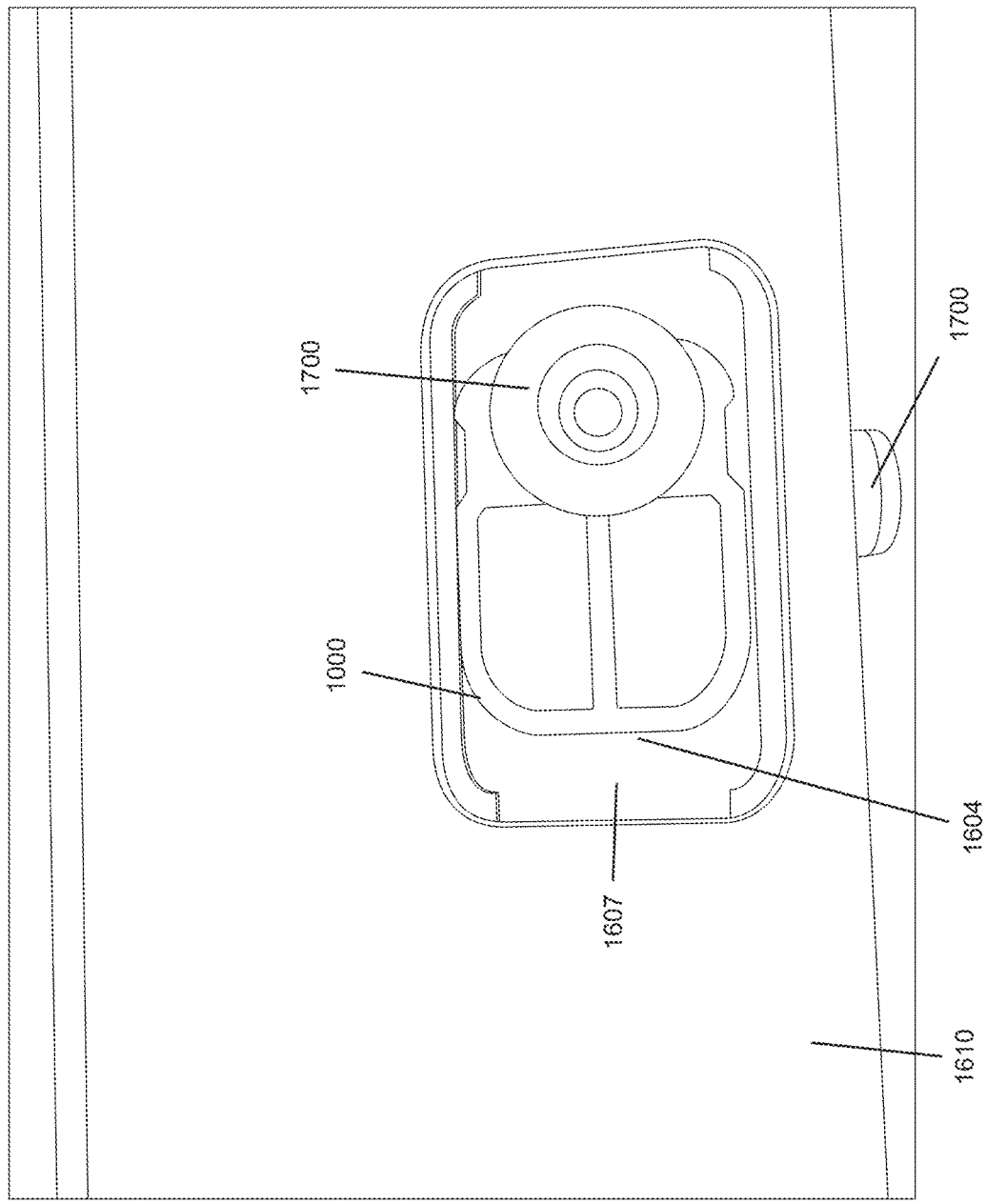
FIG. 21 is a schematic of a connector fastened to a rail of a truck bed.

FIG. 17 to FIG. 21 depict a connector 1000 received in the stake pocket 1605. FIG. 17 depicts a fastener 1700 received in the channel 1004 of the connector 1000. As depicted in FIG. 17 to FIG. 21, the connector 1000 may be received into the stake pocket 1605. As depicted in FIG. 21, the connector 1000 is configured to have a tight tolerance with the opening 1604 and the stake pocket 1605. As depicted in FIG. 18 and FIG. 19, a fastener 1700 is received through the opening 1606 and may fasten the connector 1000 to the rail 1602. As depicted in FIG. 20 and FIG. 21, when the connector 1000 is received in the stake pocket 1605 and is fastened to the rail 1602, a top surface of the connector 1000 may be generally flush or aligned with the top surface 1607 of the rail 1602 or the top surface of the cover 1610.

In some embodiments, the connector 1000 is cooperatively configured with the flange 1608 of the rail 1602 of the truck bed 1600, the flange 1608 extending into the stake pocket 1608, such that, while the connector 1000 is disposed within the stake pocket 1605, a side surface portion of the connector 1000 is being opposed by the flange 1608 of the truck bed, for limiting movement of the connector 1000 relative to the truck bed 1600.

When the connector 1000 is received in the stake pocket 1605 and fastened to the rail 1602 using a fastener received by the opening 1606, the connector 1000 is positioned in the stake pocket 1605 such that there is a tight tolerance between the opening 1604 and the connector 1000, such that a portion of the walls 1016 of the connector 1000 are proximate to the flanges 1608 extending from the surface 1607 of the rail 1602 into the rail 1602. In some embodiments, portions of the walls 1016 of the connector 1000 are positioned opposite the flanges 1608. In some embodiments, the flanges 1608 may surround the connector 1000 when the connector 1000 is fastened to the rail 1602 and positioned on the rail 1602 using the fastener received through the opening 1606.

When a rack 10 is fastened to the connector 1000 that is fastened to the rail 1602 of the truck bed 1600, and the rack 10 moves forward or backward, or side to side, for example, as the rack 10 supports cargo or during operation of the truck, portions of the walls 1016 of the connector 1000 may engage the flanges 1608 to limit the forward or backward, or side to side movement of the connector 1000, relative to the truck bed 1600. Accordingly, the connector 1000 and the flanges 1608 of the rail 1602 of the truck bed 1600 may be cooperatively configured to reduce, mitigate, or limit movement of the connector 1000 and the rack 10, or stabilize the connector 1000 and the rack 10, during operation of the vehicle.

FIG. 20 depicts the connector 1000 fastened to the rail 1602 of the truck bed 1600 of a truck 2000. As depicted in FIG. 20, the truck 2000 has a cab 2002 with a rear window 2004. The rack 10 of unitary one-piece construction for mounting to the truck 2000 may be mounted to the rail 1602 of the truck bed 1600 and fastened to the truck 2000 using a fastener extending through the opening 504 of the mounting bracket 500 and received in the channel 1004 of the connector 1000 that is fastened to the rail 1602 of the truck bed 1600. When the rack 10 is fastened to the connector 1000, the barrier 100 may be disposed in opposition to the rear window 2004.

In some embodiments, to reduce, mitigate, or limit upward or downward movement of the connector 1000, the connector 1000 may be fastened to the rail 1602 using a washer 2200.

FIG. 22 to FIG. 25 depict an example washer 2200. The washer 2200 may be manufactured by injection moulding. The washer 2200 may be made of the same material as the connector 1000, which may include high impact copolymer, nylon, polypropylene, polypropylene with 30% glass fiber filler, thermoplastic, or composite.

Figure 22:
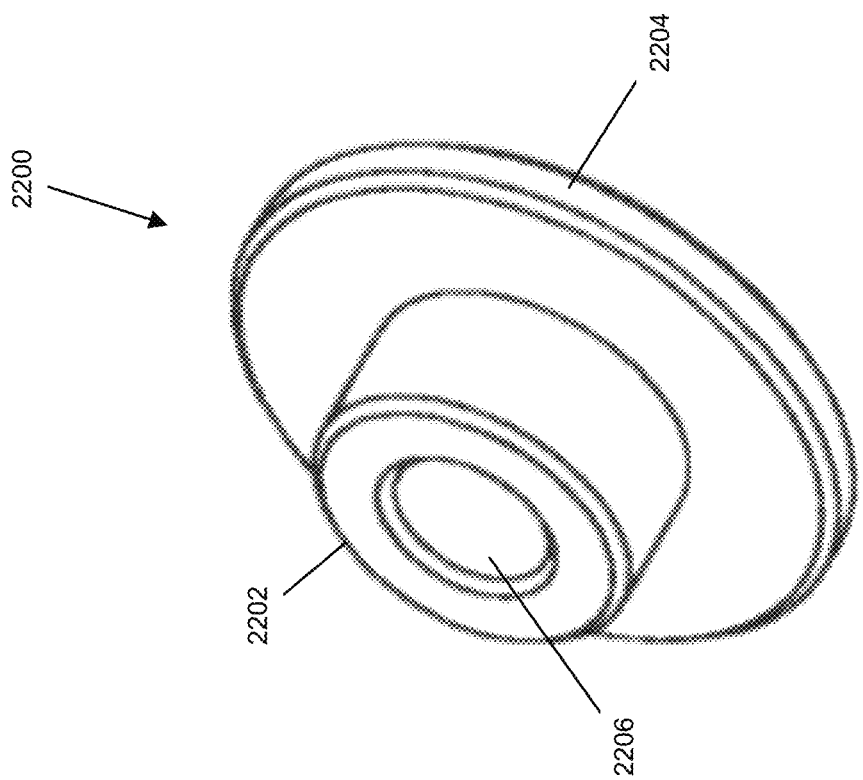
FIG. 22 is a perspective view of a washer.

As depicted in FIG. 22, the washer 2200 has an insertion portion 2202, a shoulder portion 2204, and a channel 2206 defined by the washer 2200.

Figure 24:
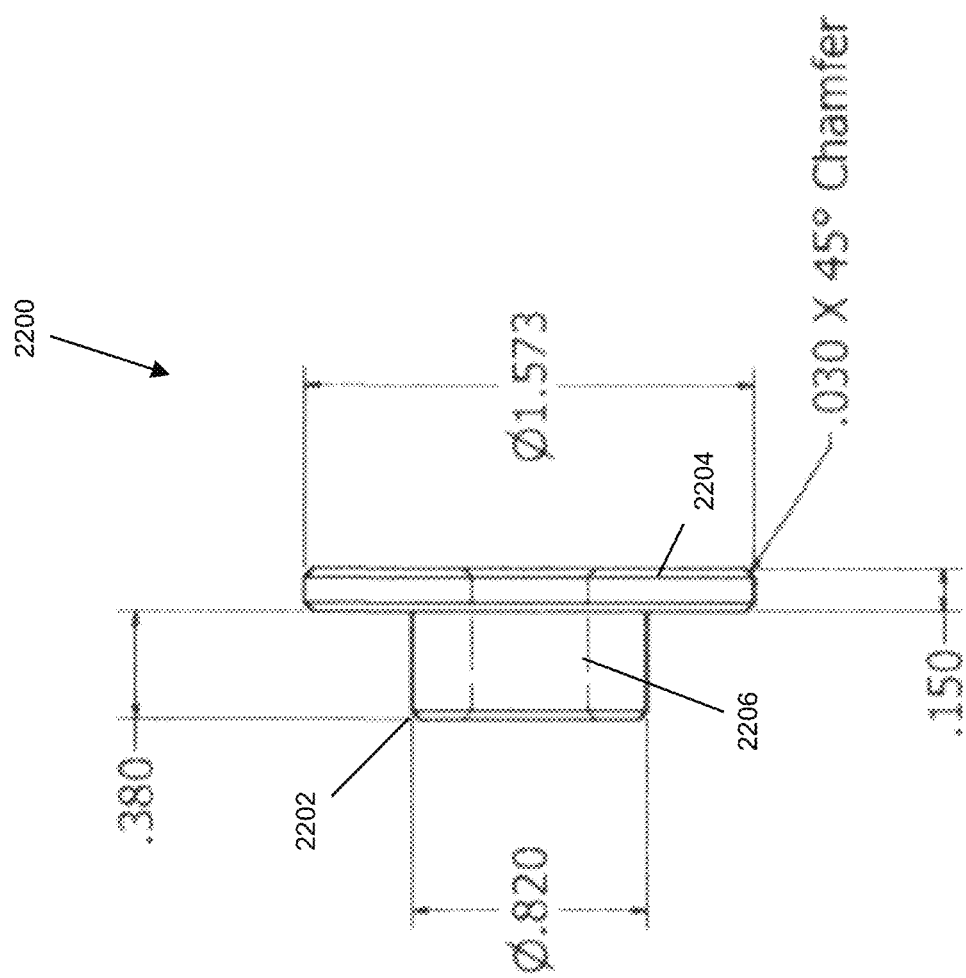
FIG. 24 is a side view of the washer of FIG. 22.
Figure 25:
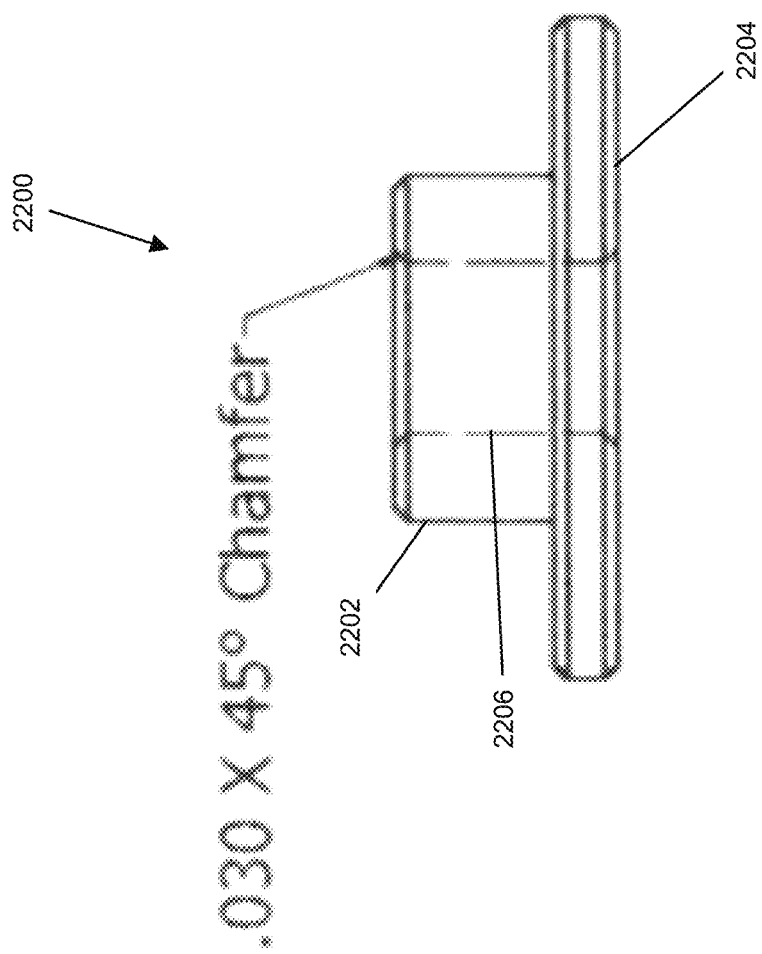
FIG. 25 is a top view of the washer of FIG. 22.

The washer 2200, for example, the insertion portion 2202 of the washer 2200, may be inserted in the side opening 1606 of the rail 1602, such that when the insertion portion 2202 is inserted in the side opening 1606, the insertion portion 2202, or a part of the insertion portion 2202, is inside the rail 1602. As depicted in FIG. 24, the insertion portion 2202 may have an example diameter of 0.820", and may have an example length of 0.380". As depicted in FIG. 25, the insertion portion 2202 may have an example chamber of 0.030" at 45°.

In some embodiments, the insertion portion 2202 may be configured to fit into the opening 1606. In some embodiments, the insertion portion 2202 may be configured to fit tightly into the opening 1606. In some embodiments, the insertion portion 2202 may be configured to friction fit, interference fit, or snap fit into the opening 1606. In some embodiments, the insertion portion 2202, or a portion of the insertion portion 2202, may be configured to be received in, to fit into, or to mate with the side channel 1002 of the connector 1000.

The shoulder portion 2204 of the washer 2200 may engage the rail 1602 when the washer 2200 is inserted in the rail 1602, such that the washer 2200 does not pass through the rail 1602. Further, when a fastener is received through the washer 2200 to fasten the connector 1000 to the rail 1602, the washer 2200, for example, the shoulder portion 2204, may allow the fastener to be sufficiently torqued or torqued to specification to fasten the connector 1000 to the rail 1600. The shoulder portion 2204 depicted in FIG. 22 has a generally circular shape. In some embodiments, the shoulder portion 2204 has a shape that is generally similar to the shape of the side opening 1606 on the rail 1602. For example, where the side opening 1606 has an oblong shape, the shoulder portion 2204 also has an oblong shape, such that the washer 2200 does not pass through the opening 1606. As depicted in FIG. 24, the shoulder portion 2204 has an example length of 0.150", an example diameter of 1.573", and has an example chamber of 0.030" at 45°.

Figure 23:
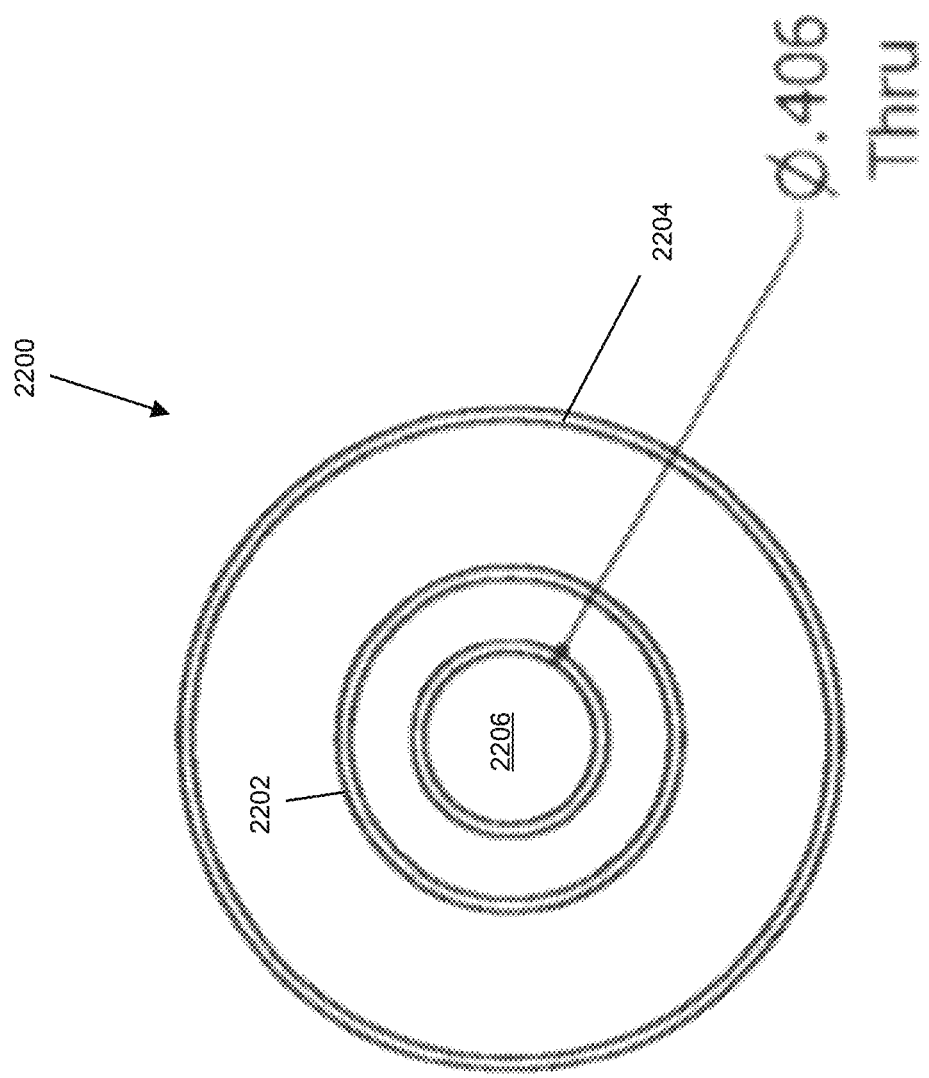
FIG. 23 is a front view of the washer of FIG. 22.

The channel 2206 may extend through the washer 2200 to receive a mechanical fastener, such that the mechanical fastener may extend through the side opening 1606 of the rail 1602 when the washer 2200 is inserted in the side opening 1606. The channel 2206 may be configured to receive a mechanical fastener. As depicted in FIG. 23, the channel 2206 has an example diameter of 0.406".

In some embodiments, when the washer 2200 is used to fasten the connector 1000 to the rail 1600, a surface 1016 of the connector 1000 may be 3/16" from an inner surface of the rail 1602.

In some embodiments, when the washer 2200 is used to fasten the connector 1000 to the rail 1600 using the opening 1606, with the insertion portion 2202 configured to fit into the opening 1606, upward or downward movement of the connector 1000, which may be caused by upward, downward, forward, backward, or side to side movement of the rack 10, may be reduced, limited, or mitigated, as the insertion portion 2202 engages with the surface of the rail 1602 defining the opening 1606.

Figure 26:
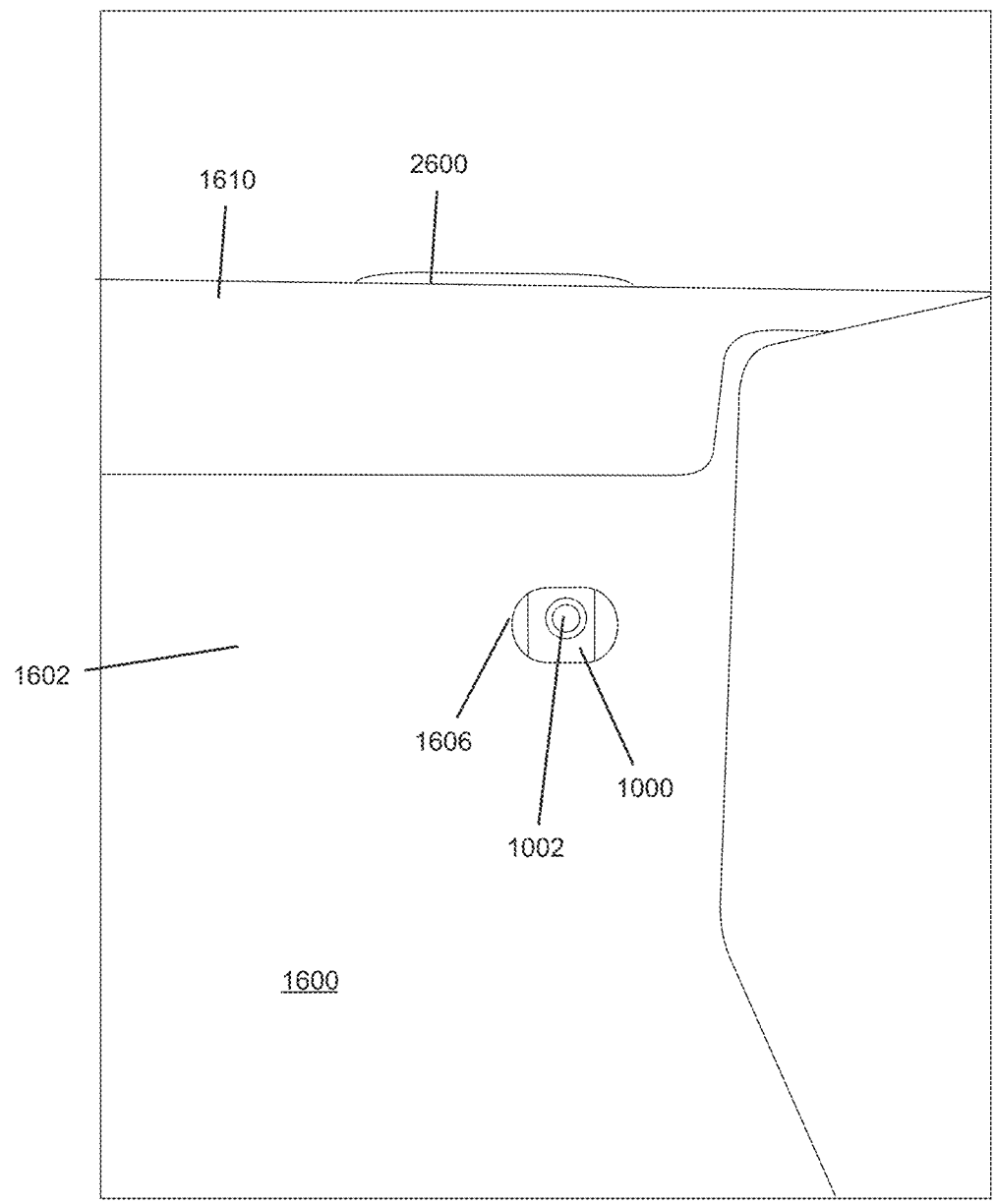
FIG. 26 is a schematic of a connector received in a stake pocket of a rail of a truck bed.

FIG. 26 to FIG. 31 depict schematics for fastening the connector 1000 to the rail 1602 using the washer 2200. FIG. 26 depicts the connector 1000 received in the stake pocket 1605, but not fastened to the rail 1602 of the truck bed 1600. As depicted in FIG. 26, the connector 1000 is positioned such that a fastener may extend through the opening 1606 and engage with the channel 1002 to fasten the connector 1000 to the rail 1602.

Figure 27:
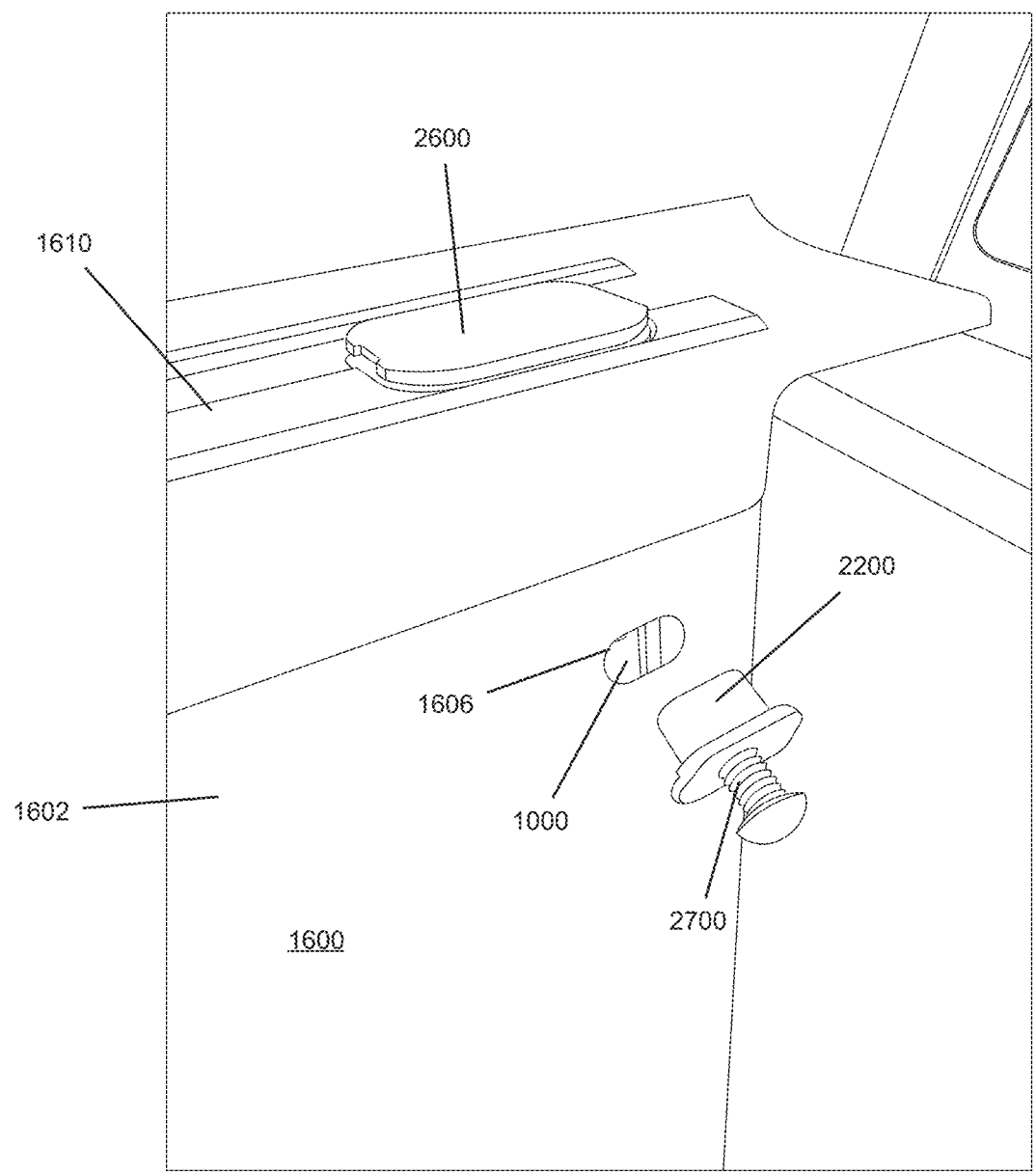
FIG. 27 is a schematic of a connector received in a stake pocket of a rail of a truck bed to be fastened using a washer.

FIG. 26 and FIG. 27 depicts a cover 2600 that may be fastened to a connector 1000, such that when the connector 1000 is in the stake pocket 1605, the cover 2600 protects the connector 1000 from wear and tear and environment conditions.

FIG. 27 depicts a fastener 2700 received in the channel 2206 of the fastener 2200.

Figure 28:
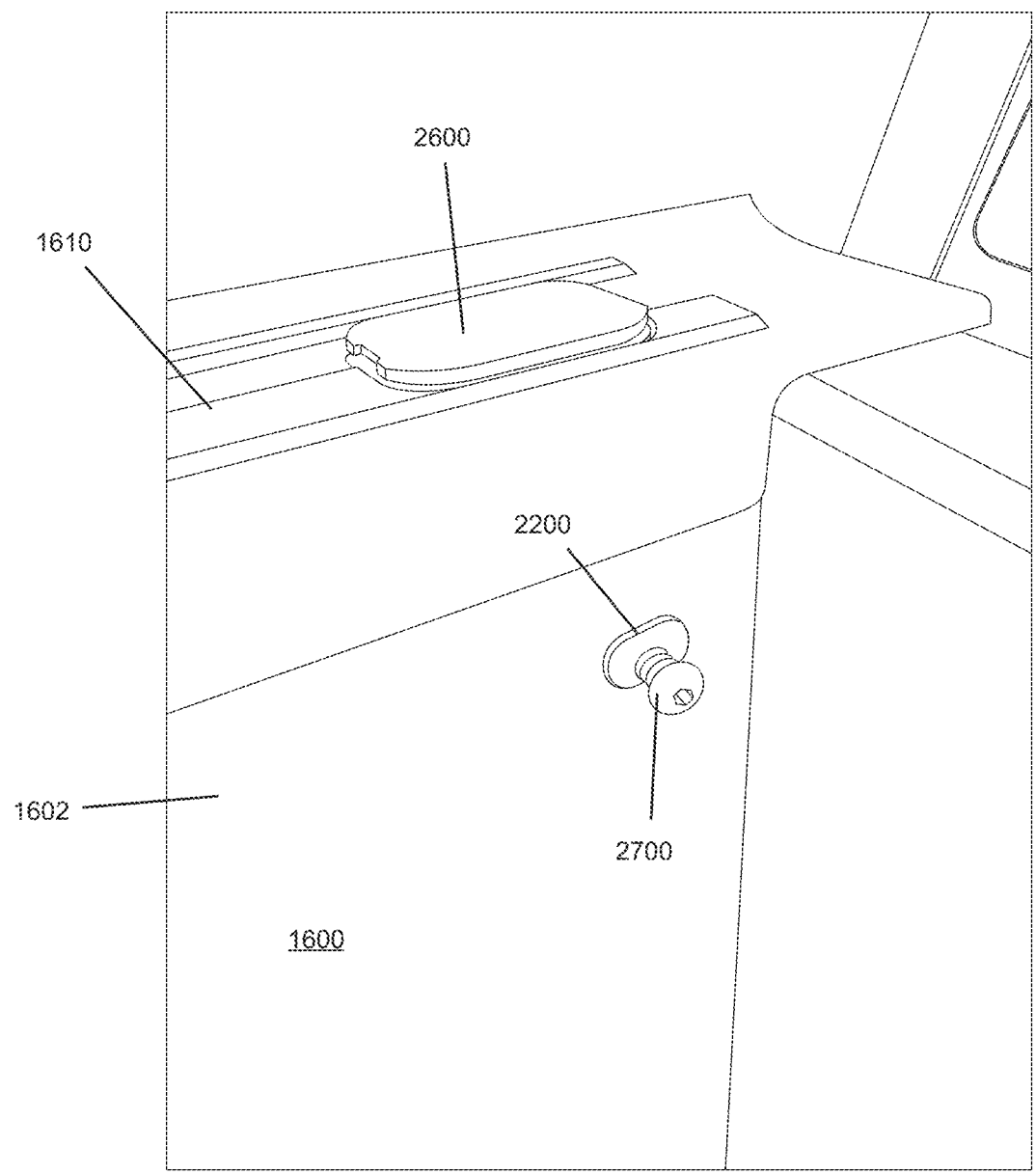
FIG. 28 is a schematic of a connector being fastened to a rail of a truck bed.

FIG. 28 depicts the insertion portion 2202 of the washer 2200 inserted in the opening 1606, and the shoulder portion 2204 of the washer 2202 engaging with the rail 1602 to prevent the washer 2200 from being pushed through the opening 1606. The insertion portion 2202 may fit or fit tightly in the opening 1606. The insertion portion 2202 may be friction fit, interference fit, or snap fit into the opening 1606. The fastener 2700 is received in the channel 2206 and is positioned to engage with the channel 1002 to connect the connector 1000 to the rail 1602. In some embodiments, the insertion portion 2202, or a portion of the insertion portion 2202, may be received in, to fit into, or to mate with the side channel 1002 of the connector 1000.

Figure 29:
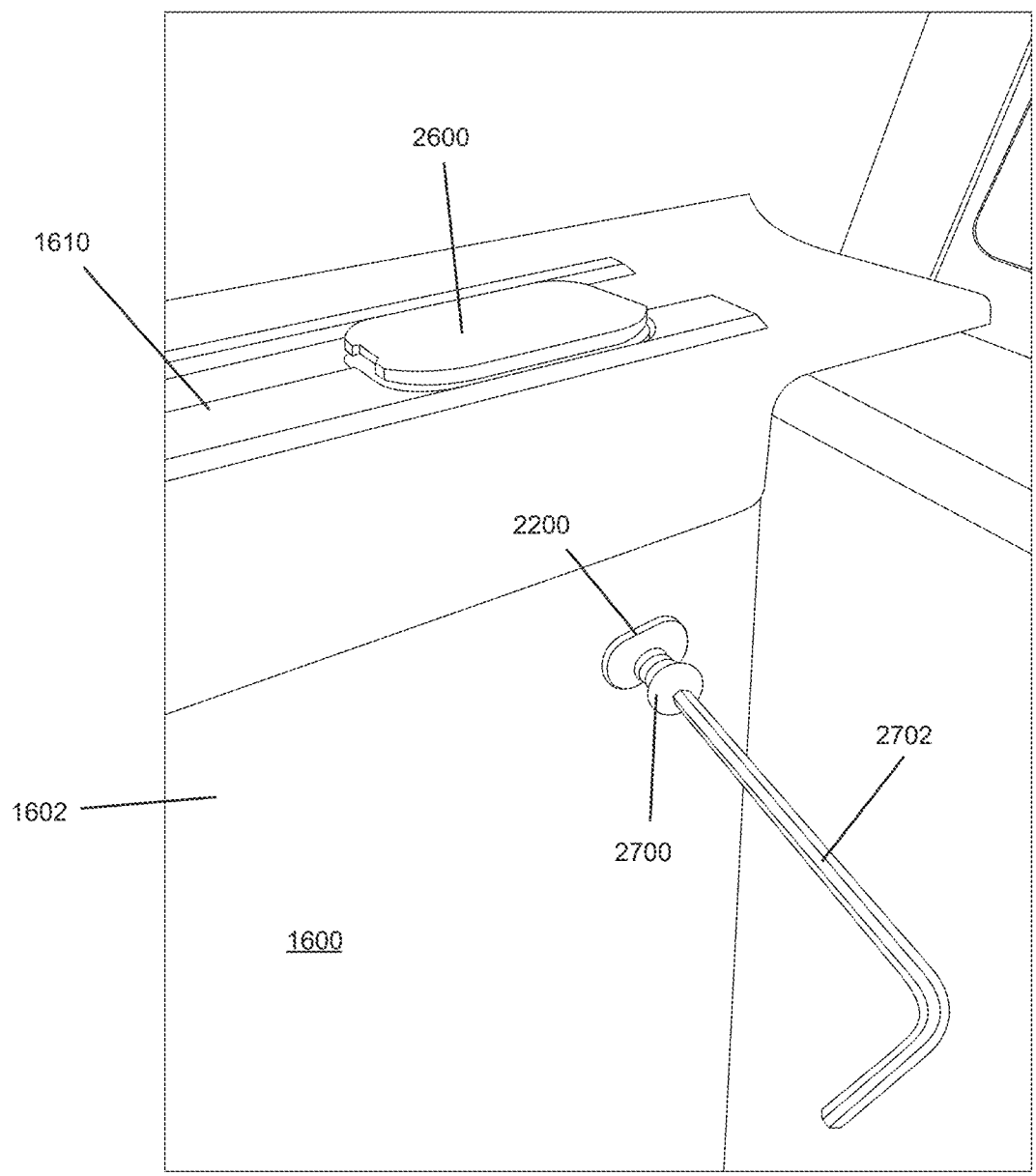
FIG. 29 is a schematic of a connector being fastened to a rail of a truck bed.

As depicted in FIG. 29, with the fastener 2700 received in the channel 2206 and is positioned to engage with the channel 1002 to connect the connector 1000 to the rail 1602, the fastener 2700 may be sufficiently torqued to specification to engage with the channel 1002 to fasten the connector 1000 to the rail 1602. In some embodiments, as depicted in FIG. 29, the fastener 2700 may be torqued with an Allen key or a hex key.

Figure 30:
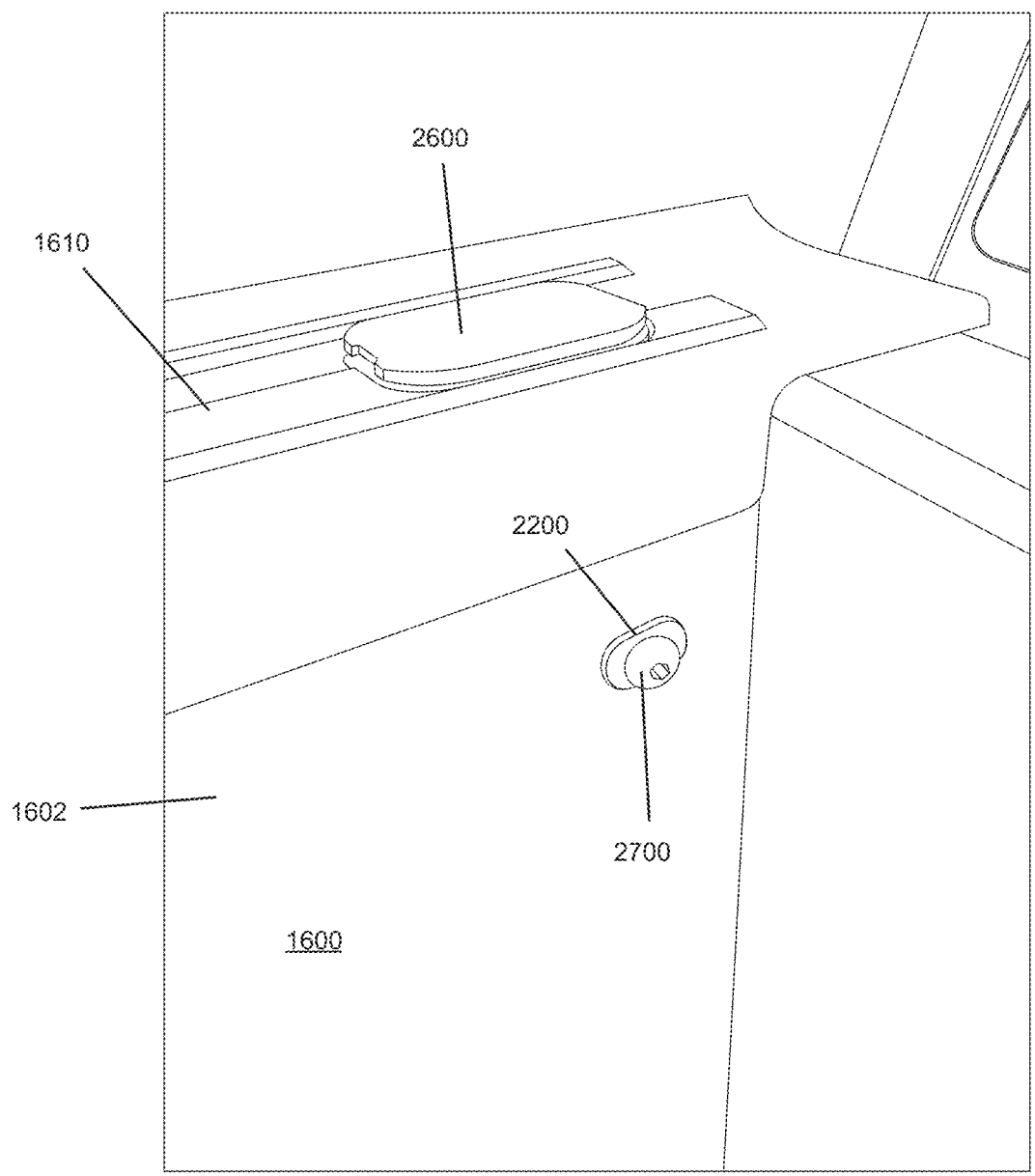
FIG. 30 is a schematic of a connector fastened to a rail of a truck bed.

FIG. 30 depicts the connector 1000 fastened to the rail 1602, using the washer 2200 that received the fastener 2700 through the channel 2206. In such an embodiment, the connector 1000, the flange 1608 of the rail 1602, and the washer 2700 may be cooperatively configured such that, while the connector 1000 is disposed within the stake pocket 1605, a side surface portion of the connector 1000 is being opposed by the flange 1608 of the truck bed, for reducing, mitigating, or limiting forward, backward, side to side, lateral, upward, and downward movement of the connector 1000 relative to the truck bed 1600.

Figure 31:
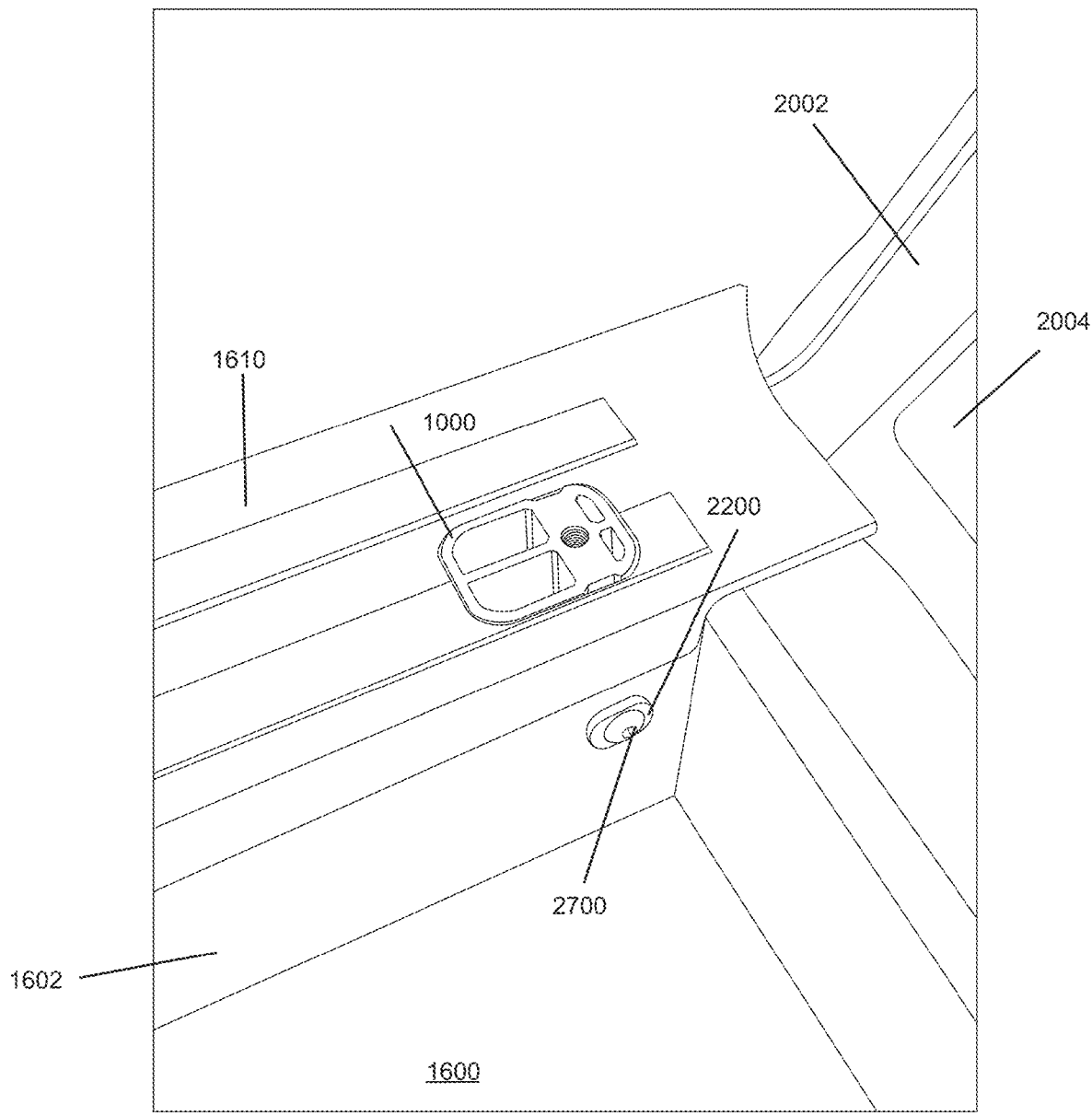
FIG. 31 is a schematic of a connector fastened to a rail of a truck bed.

FIG. 31 depicts the connector 1000 fastened to the rail 1602 without the cover 2600. As depicted in FIG. 31, the top surface of the connector 1000 may be generally aligned with or flush with the top surface 1607 of the rail 1602 or the top surface of the cover 1610.

Figure 32:
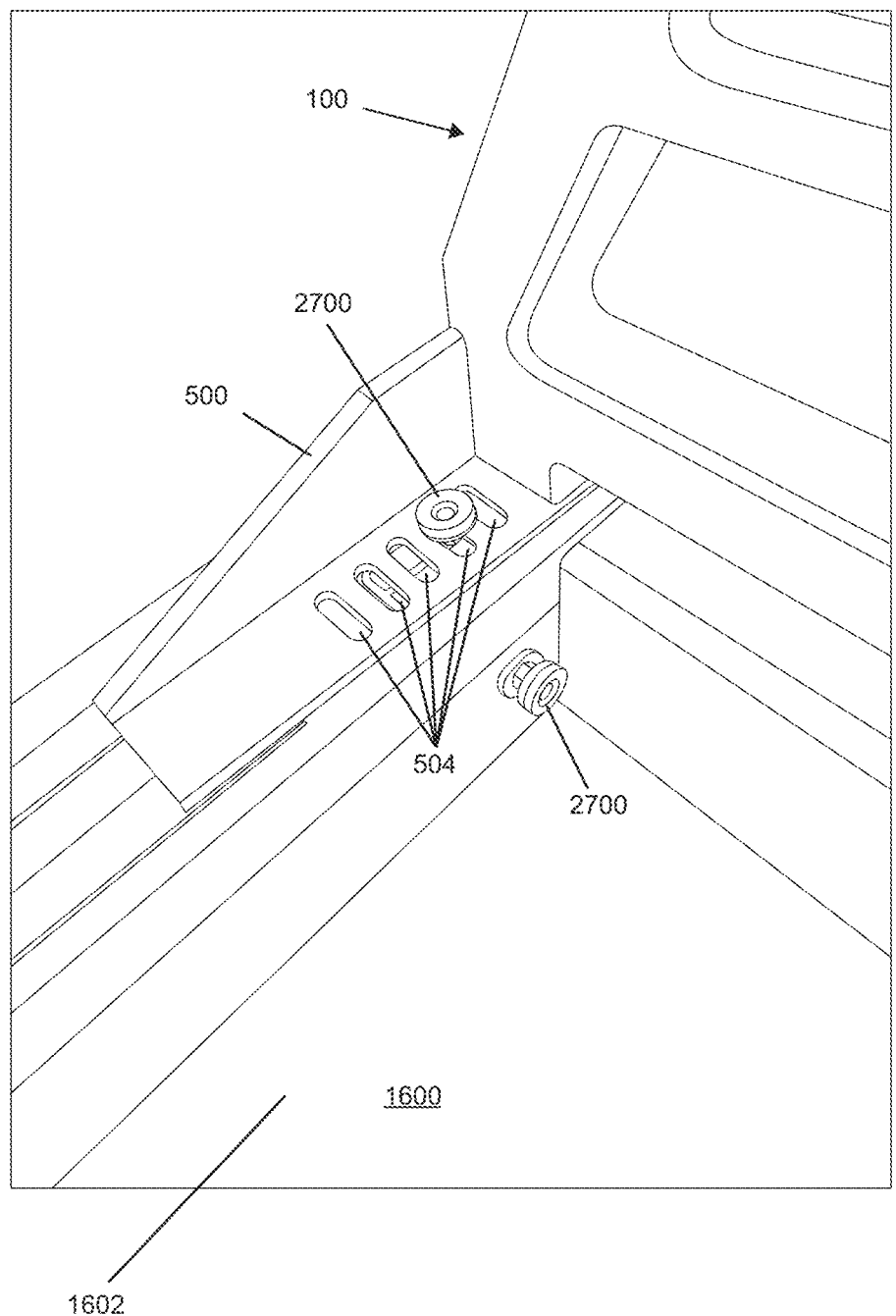
FIG. 32 is a schematic of a rack fastened to a rail of a truck bed using a connector.

FIG. 32 depicts an example rack 10 mounted to the rail 1602 of the truck bed 1600 and fastened to the rail 1602 using the connector 1000 that is fastened to the rail 1602 using the washer 2200 and the fastener 2700. As depicted in FIG. 32, the mounting bracket 500 of the rack 10 is connected to the barrier 100. The mounting bracket 500 has, for example, five openings 504 for positioning the barrier 100 relative to the rear window of the cab of the truck and to fasten the rack 10 to the rail 1602 at the desired position of the barrier 100. As depicted in FIG. 32, a fastener 2700, such as nuts and bolts, hex bolts, Allen key bolts, eye bolt, nails, screws, pegs, and the like, may be received through the opening 504 of the mounting bracket 500 and be received in and engage with the channel 1004 of the connector 1000, such that the mounting bracket 500 is fastened to the connector 1000. Wth the barrier 100 connected to the mounting bracket 500 and the connector 1000 fastened to the rail 1602, the rack 10 is fastened to the rail 1602 when the rack 10 is fastened to the connector 1000.

In some embodiments, the mounting bracket 500 may have one or more slots, channels, rails, ribs, or otherwise a guide on the mounting surface for aligning the mounting bracket 500 with the rail 1602 of the truck bed 1600 to mount the rail 10 to the truck 2000.

Figure 33:
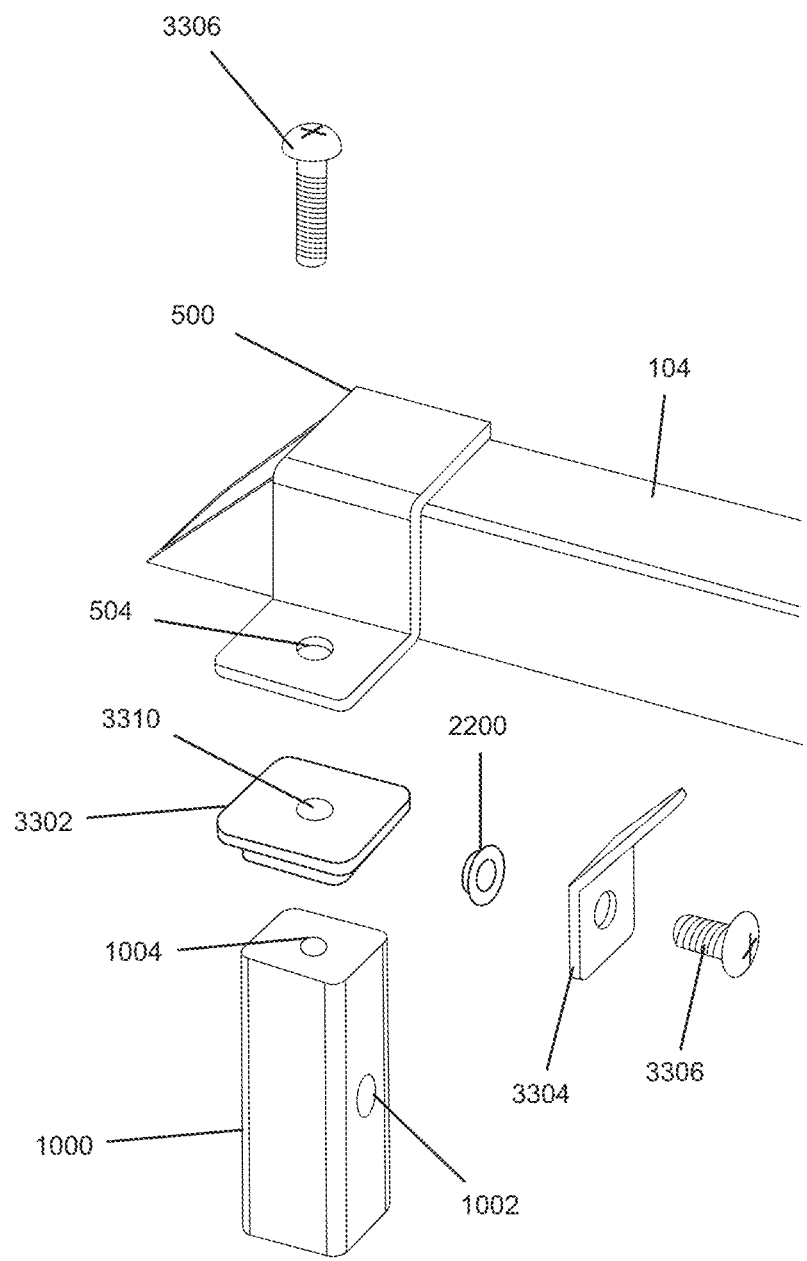
FIG. 33 is a schematic of fastening a rack to a connector.
Figure 34:
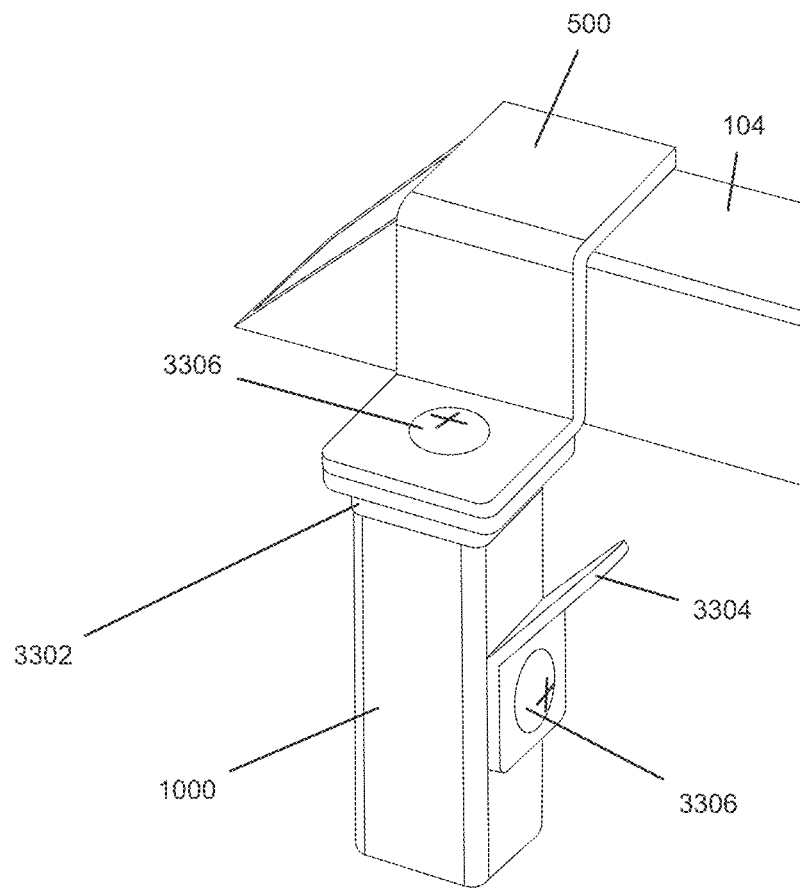
FIG. 34 is a schematic of a rack fastened to a connector.

FIG. 33 is a schematic of fastening a rack 10 to a connector 1000, and FIG. 34 is a schematic of a rack 10 fastened to a connector 1000.

As depicted in FIG. 33 and FIG. 34, the rack 10 has a barrier member 104 merged with an embodiment of a mounting bracket 500. The mounting bracket has an opening 504 to receive a fastener 3306. FIG. 33 and FIG. 34 depict a connector 1000 having a side channel 1002 to receive a fastener 3306 and a channel 1004 to receive a fastener 3306. A washer 2200 may be inserted in the side channel 1002 and receive a fastener 3306. The connector 1000 may have a load plate, or a load plate 3302 may be positionable between the mounting bracket 500 and the connector 1000. The load plate 3302 may have a channel 3310 for receiving a mechanical fastener for fastening with the connector 1000. The load plate 3302 may be positionable such that while the connector 1600 is disposed within a stake pocket 1605 of a rail 1602 of a truck bed 1600, a side surface portion or a flange of the load plate 3302 is opposed by the flange 1608 of the rail 1602 of the truck bed 1600 for limiting movement of the connector 1000 relative to the truck bed 1600. A tie plate 3304 may be positionable between the fastener 3306 and the washer 2200. The tie plate 3304 may provide a tie point, such as a loop, to secure cargo within the truck bed 1600.

FIG. 34 depicts a fastener 3306 received in the opening 504 of the mounting bracket 500 and the channel 1002 to secure the mounting bracket 500 and the barrier member 104 to the connector 1000, and a fastener 3306 received through the tie plate 3304 and the washer 2200. While the rail 1602 is not depicted in FIG. 34, when the connector 1000 is received in the stake pocket 1605 of the rail 1602, the connector 1000 is fastened to the rail 1602 using the fastener 3306 and the washer 2200, and the tie plate 3304 is secured to the rail 1602 to provide a tie point for securing cargo.

Figure 35:
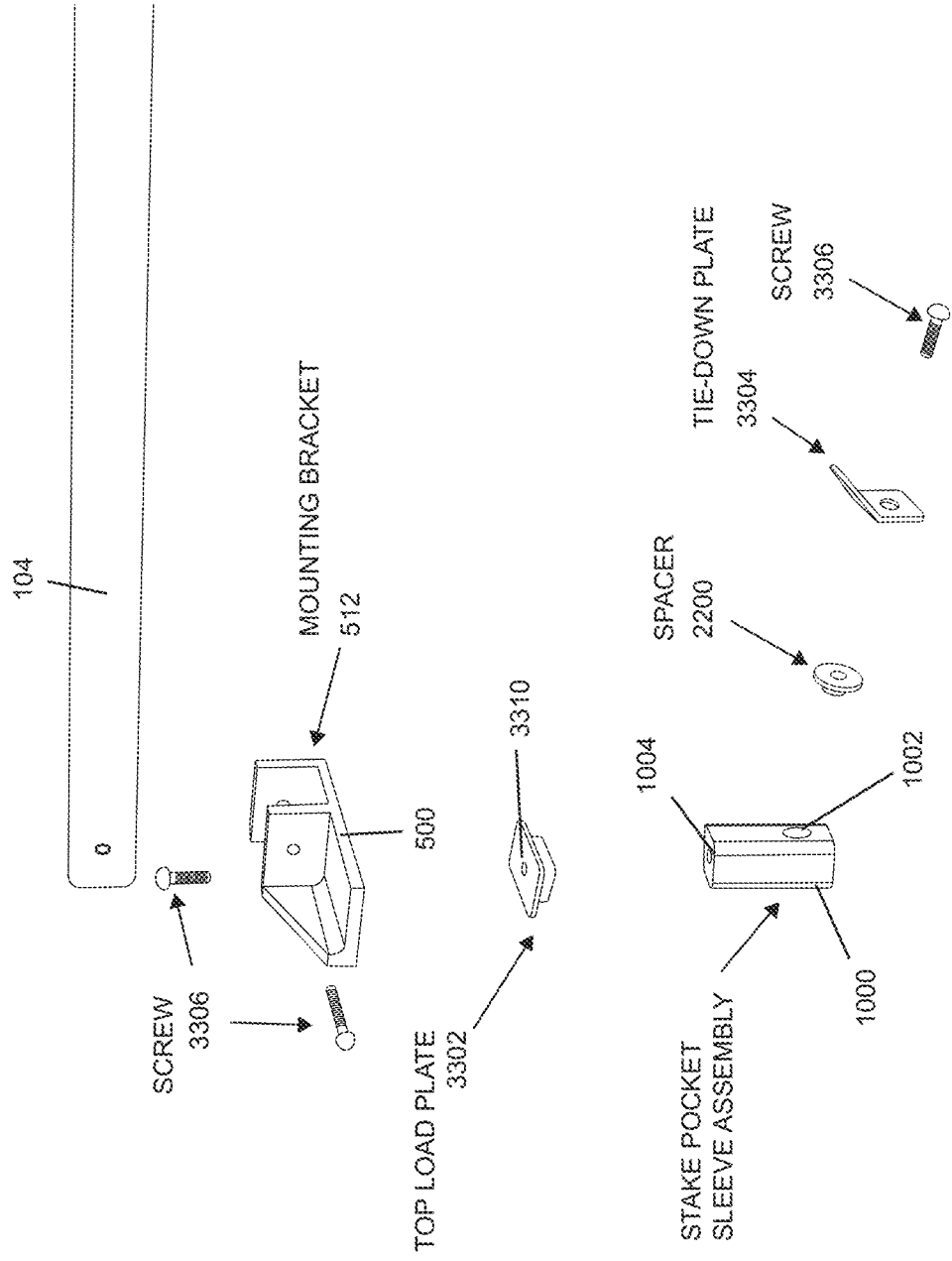
FIG. 35 is a schematic of fastening a rack to a connector.
Figure 36:
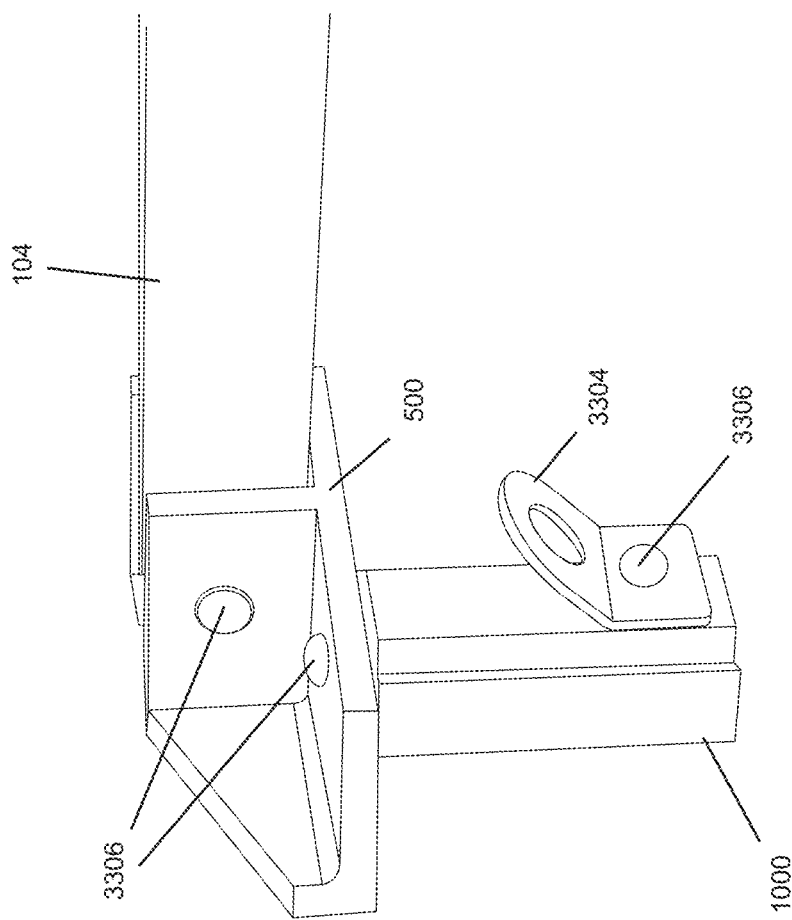
FIG. 36 is a schematic of a rack fastened to a connector.

FIG. 35 is a schematic of fastening a rack 10 to a connector 1000, and FIG. 36 is a schematic of a rack 10 fastened to a connector 1000.

As depicted in FIG. 35 and FIG. 36, the rack 10 has a barrier 100 with a barrier member 104 that may be connected to a mounting bracket 500 using a fastener 3306. The barrier 100 may be received in a slot 512 of the bracket 500 and the barrier 100 and the bracket 500 may be fastened together. FIG. 35 and FIG. 36 depict a connector 1000 having a side channel 1002 to receive a fastener 3306 and a channel 1004 to receive a fastener 3306. A washer 2200 may be inserted in the side channel 1002 and receive a fastener 3306. The connector 1000 may have a load plate, or a load plate 3302 may be positionable between the mounting bracket 500 and the connector 1000. The load plate 3302 may have a channel 3310 for receiving a mechanical fastener for fastening with the connector 1000. The load plate 3302 may be positionable such that while the connector 1600 is disposed within a stake pocket 1605 of a rail 1602 of a truck bed 1600, a side surface portion or a flange of the load plate 3302 is opposed by the flange 1608 of the rail 1602 of the truck bed 1600 for limiting movement of the connector 1000 relative to the truck bed 1600. A tie plate 3304 may be positionable between the fastener 3306 and the washer 2200. The tie plate 3304 may provide a tie point, such as a loop, to secure cargo within the truck bed 1600.

FIG. 36 depicts a fastener 3306 received in the opening 504 of the mounting bracket 500 and the channel 1002 to secure the mounting bracket 500 and the barrier member 104 to the connector 1000, and a fastener 3306 received through the tie plate 3304 and the washer 2200. While the rail 1602 is not depicted in FIG. 36, when the connector 1000 is received in the stake pocket 1605 of the rail 1602, the connector 1000 is fastened to the rail 1602 using the fastener 3306 and the washer 2200, and the tie plate 3304 is secured to the rail 1602 to provide a tie point for securing cargo.

Figure 37:
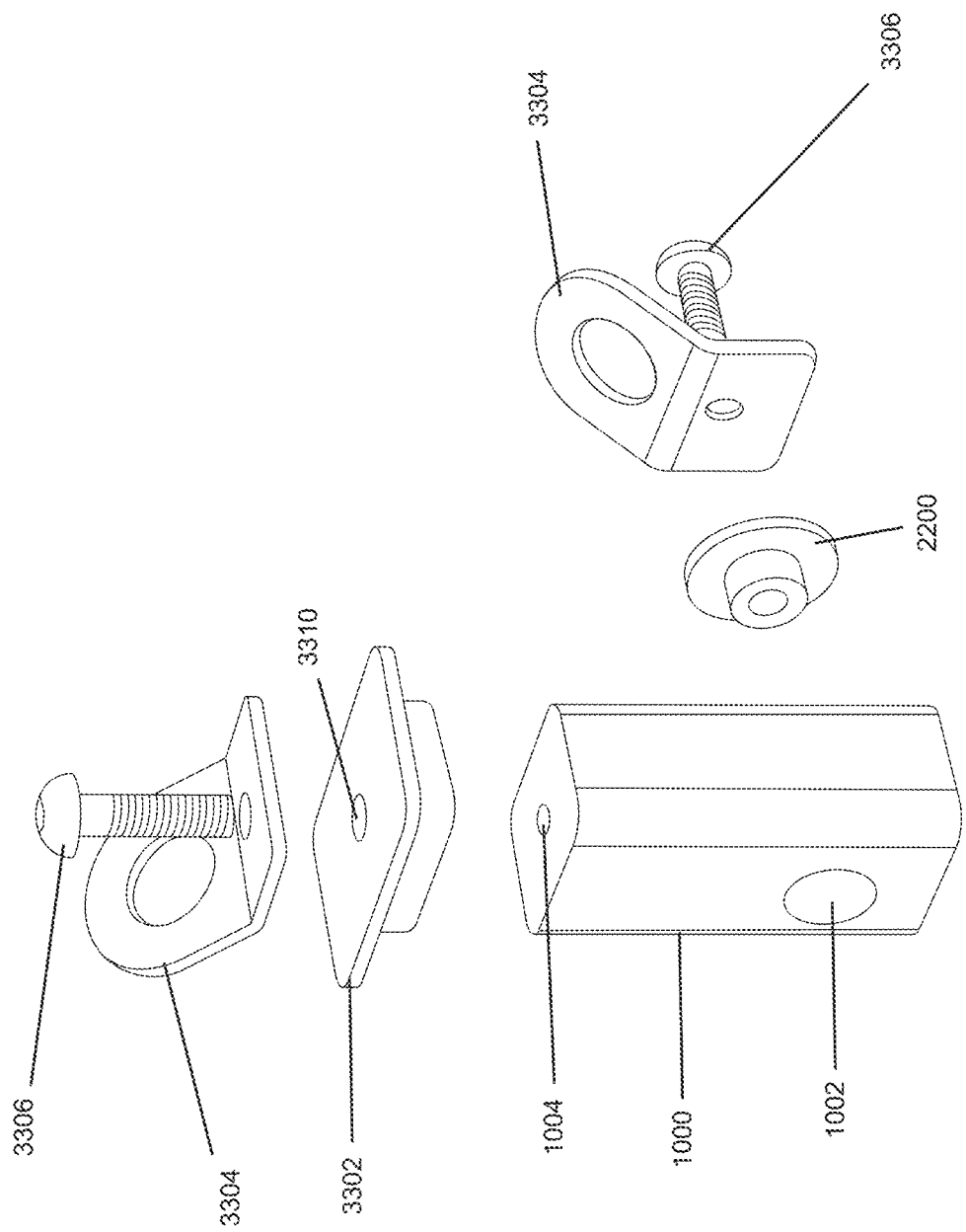
FIG. 37 is a schematic of a connector receiving fasteners.

FIG. 37 is a schematic of a connector 1000 receiving fasteners 3306. FIG. 37 depicts a connector 1000 having a side channel 1002 to receive a fastener 3306 and a channel 1004 to receive a fastener 3306. A washer 2200 may be inserted in the side channel 1002 and receive a fastener 3306. The connector 1000 may have a load plate, or a load plate 3302 may be positionable between a tie plate 3304 and the connector 1000. The load plate 3302 may have a channel 3310 for receiving a mechanical fastener for fastening with the connector 1000. The load plate 3302 may be positionable such that while the connector 1600 is disposed within a stake pocket 1605 of a rail 1602 of a truck bed 1600, a side surface portion or a flange of the load plate 3302 is opposed by the flange 1608 of the rail 1602 of the truck bed 1600 for limiting movement of the connector 1000 relative to the truck bed 1600. A tie plate 3304 may be positionable between the fastener 3306 and the washer 2200, and between the fastener 3306 and the load plate 3302. The tie plates 3304 may provide a tie point, such as a loop, to secure cargo within the truck bed 1600.

When the connector 1000 is received in the stake pocket 1605 of the rail 1602, the connector 1000 is fastened to the rail 1602 using the fastener 3306 and the washer 2200, and the tie plate 3304 is secured to the rail 1602 to provide a tie point for securing cargo. The tie plate 3304 may also be secured to the load plate 3302 to provide a tie point for securing cargo.

Figure 38:
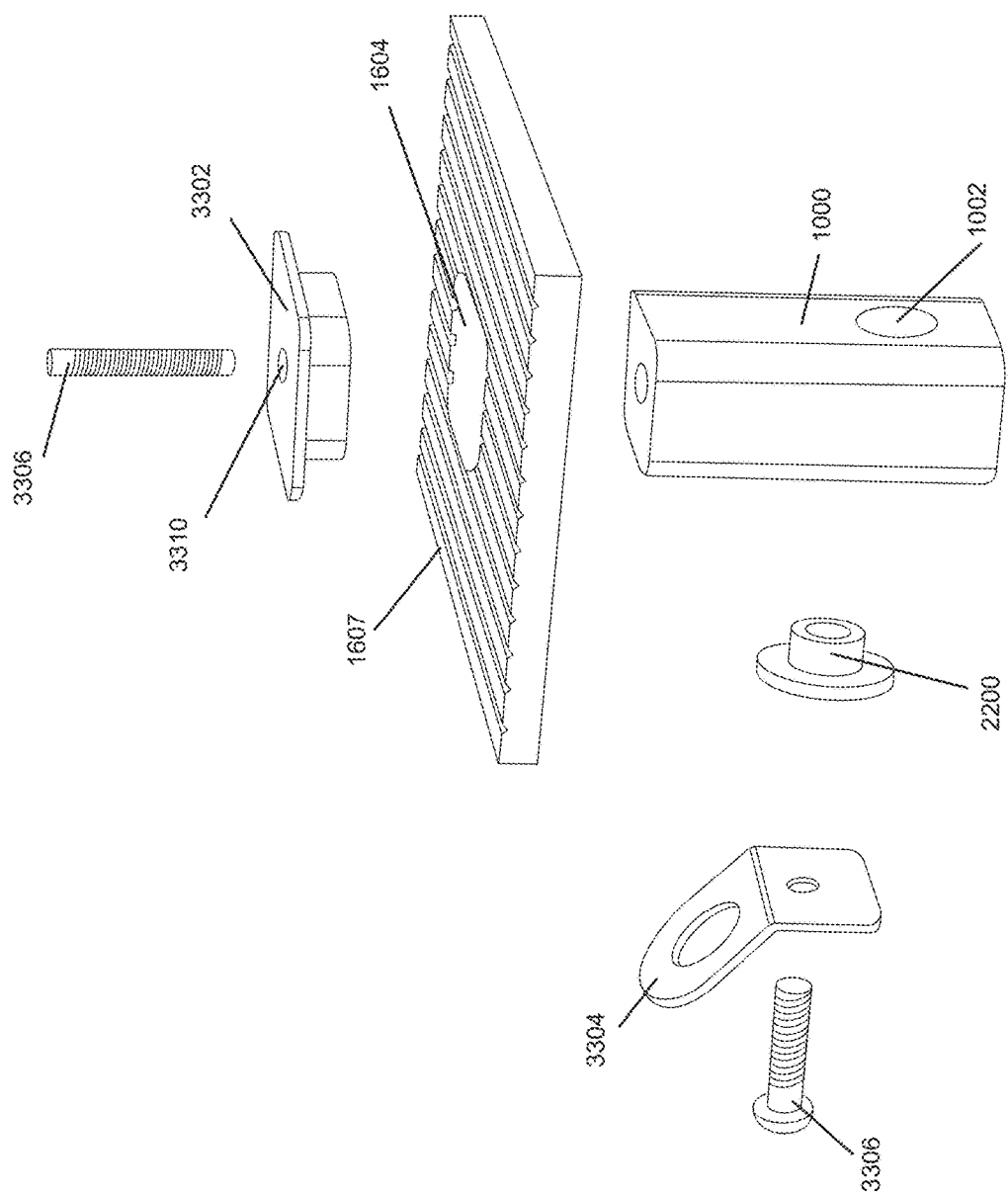
FIG. 38 is a schematic of a connector receiving fasteners.
Figure 39:
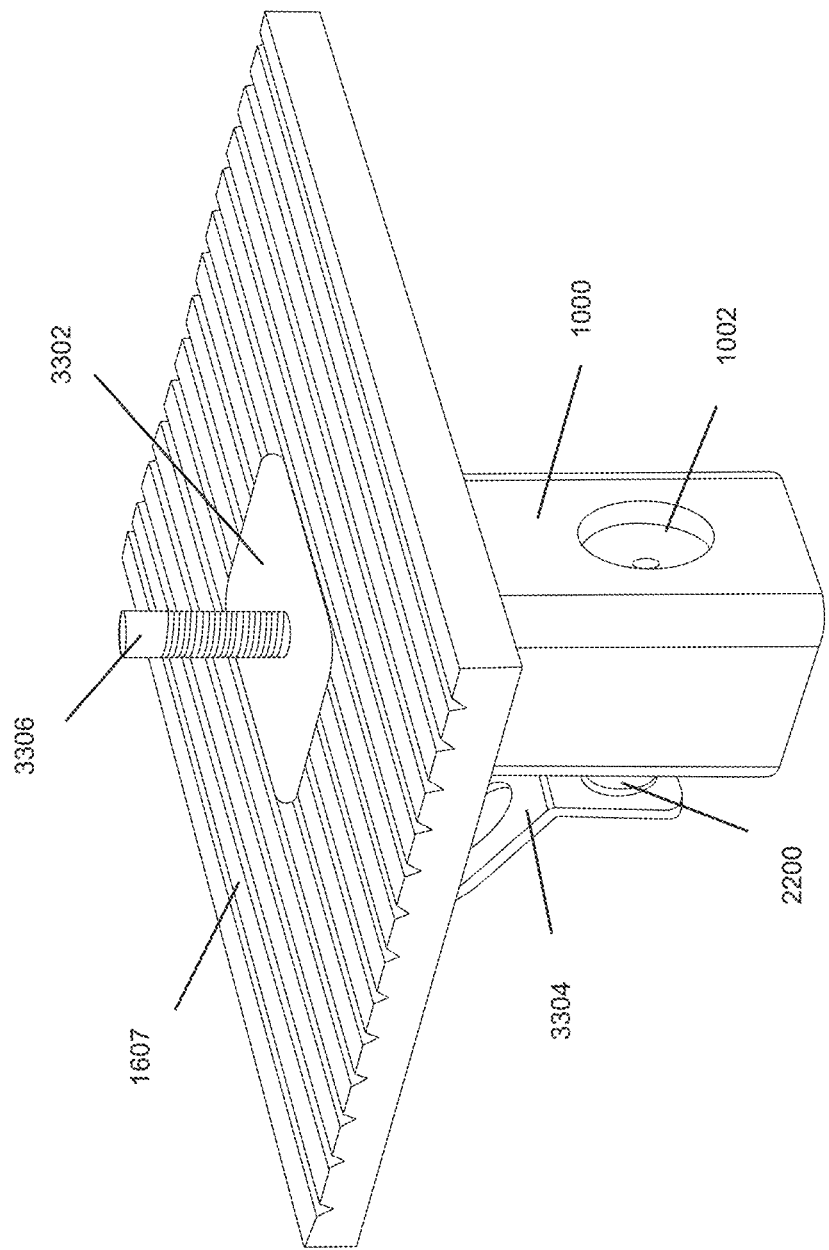
FIG. 39 is a schematic of a connector with received fasteners.

FIG. 38 is a schematic of a connector 1000 receiving fasteners 3306, and FIG. 39 is a schematic of a connector 1000 with received fasteners 3306.

As depicted in FIG. 38 and FIG. 39, a connector 1000 has a side channel 1002 to receive a fastener 3306 and a channel 1004 to receive a fastener 3306. A washer 2200 may be inserted in the side channel 1002 and receive a fastener 3306. The connector 1000 may have a load plate, or a load plate 3302 may be positionable between the mounting bracket 500 and the connector 1000. The load plate 3302 may have a channel 3310 for receiving a mechanical fastener for fastening with the connector 1000. The load plate 3302 may be positionable such that while the connector 1600 is disposed within a stake pocket 1605 of a rail 1602 of a truck bed 1600, a side surface portion or a flange of the load plate 3302 is opposed by the flange 1608 or a surface defining the opening 1604 of the top surface 1607 of the rail 1602 of the truck bed 1600 for limiting movement of the connector 1000 relative to the truck bed 1600. As depicted in FIG. 38, the load plate 3302 may be configured to be received in the opening 1604. For example, the opening 1604 has a generally rectangular shape with rounded corners. In such an example, the load plate 3302 has a similar rectangular shape with rounded corners. When the load plate 3302 is received in the opening 1604 and connected with the connector 1002, the load plate 3302 may fit or fit tightly in the opening 1604. A tie plate 3304 may be positionable between the fastener 3306 and the washer 2200. The tie plates 3304 may provide a tie point, such as a loop, to secure cargo within the truck bed 1600.

FIG. 39 depicts a fastener 3306 received in the channel 3310 and the channel 1002 to secure the loading plate 3302 to the connector 1000, and a fastener 3306 received through the tie plate 3304 and the washer 2200. While the rail 1602 is not depicted in FIG. 39, when the connector 1000 is received in the stake pocket 1605 of the rail 1602, the connector 1000 is fastened to the rail 1602 using the fastener 3306 and the washer 2200, and the tie plate 3304 is secured to the rail 1602 to provide a tie point for securing cargo. As depicted in FIG. 39, when the connector 1000 and the load plate 3302 are fastened together and received through the opening 1604, the side wall portion or flange of the load plate 3302 is positioned in opposition to the surface defining the opening 1604 of the top surface 1607 of the rail 1602 for limiting movement of the connector 1000.

Figure 40:
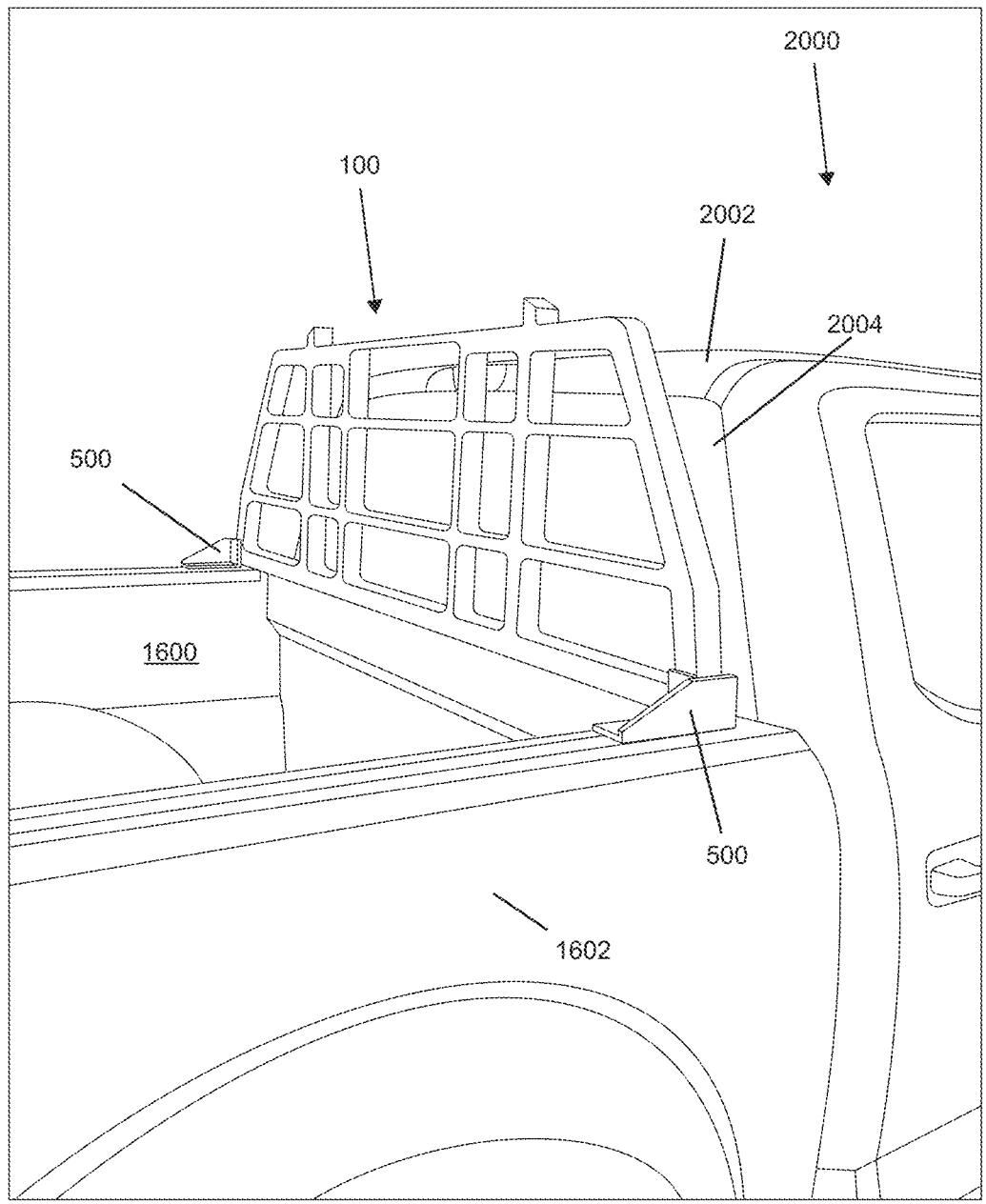
FIGS. 40-44 are schematics of a rack fastened to a rail of a truck bed.
Figure 41:
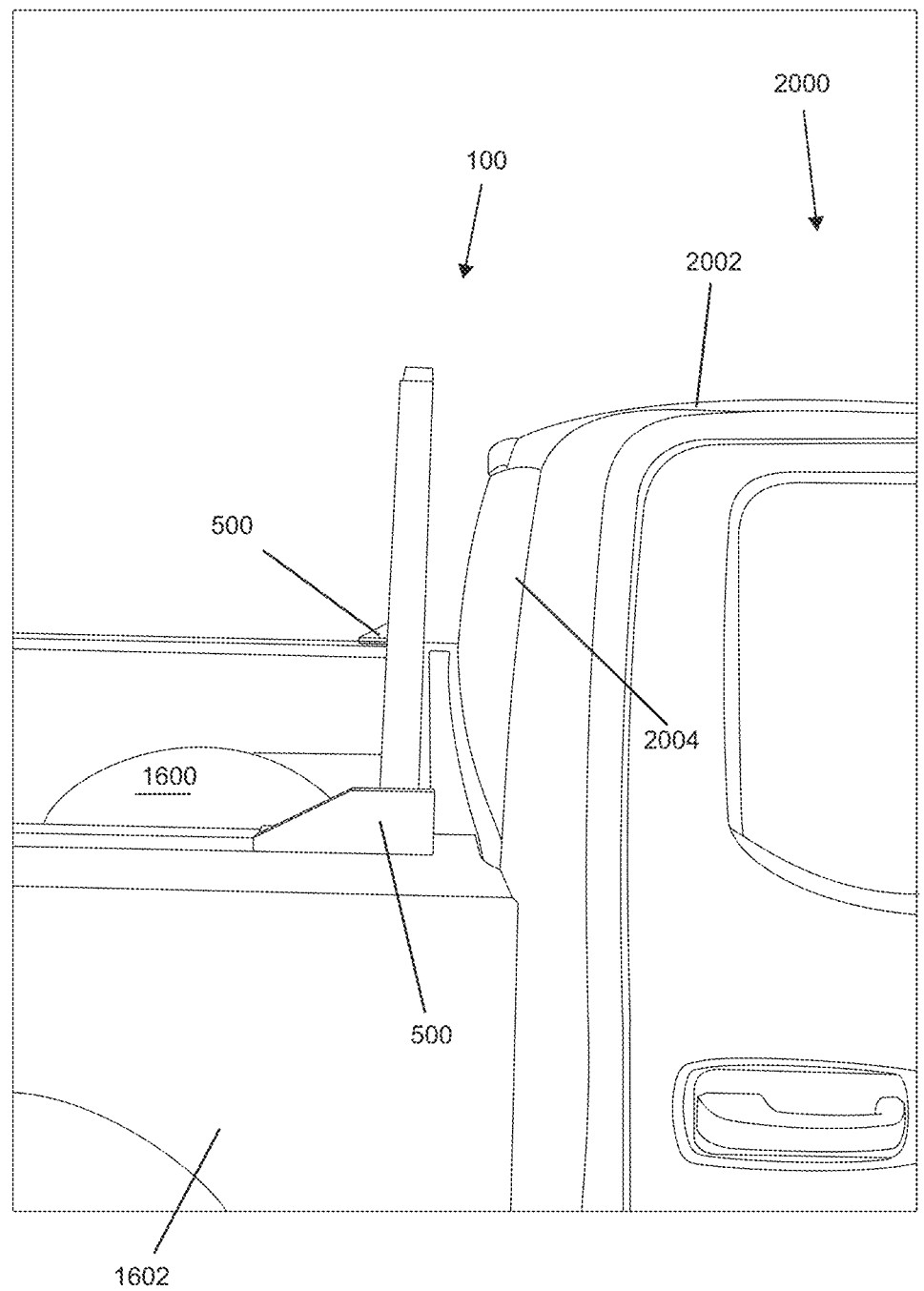
Figure 42:
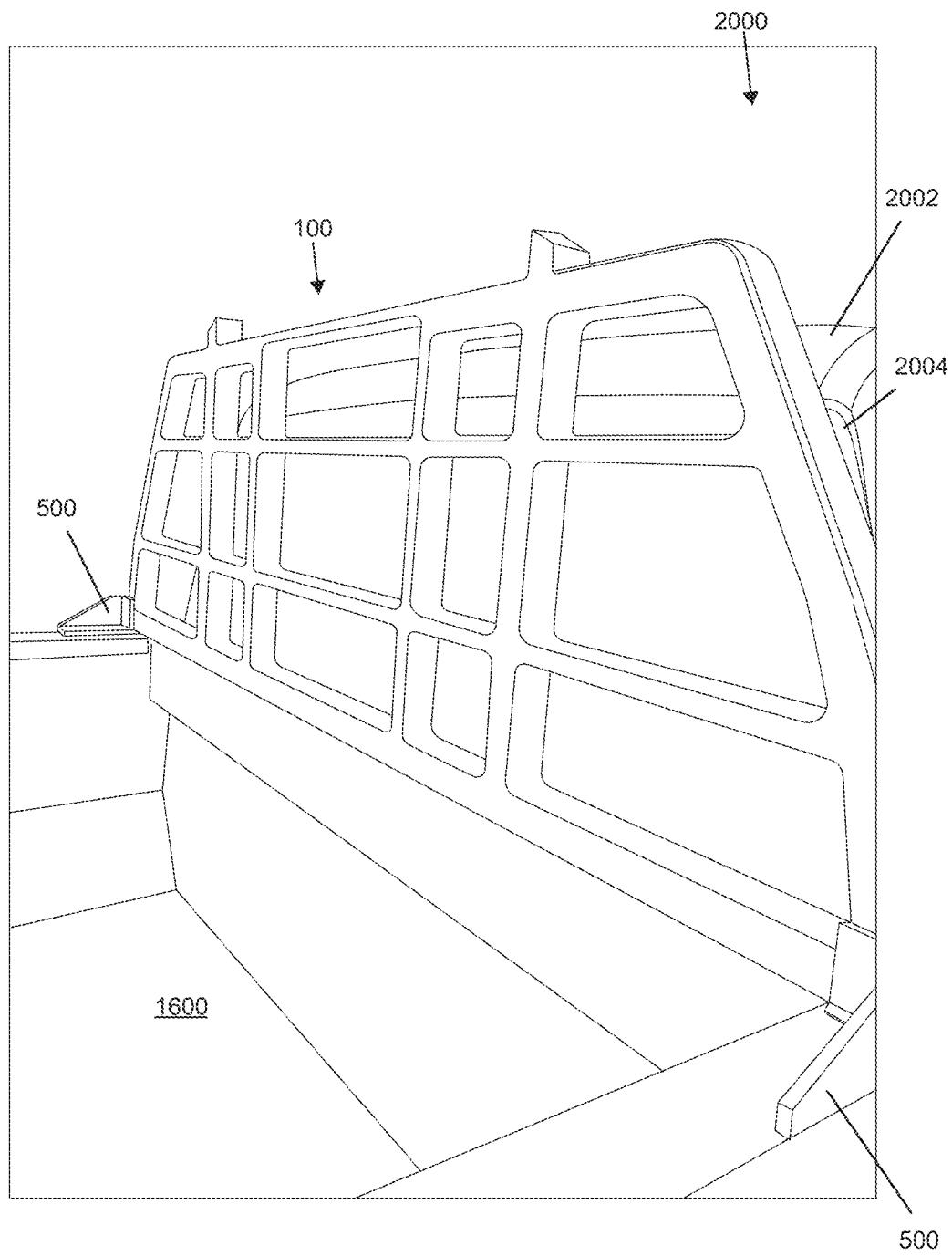
Figure 43:
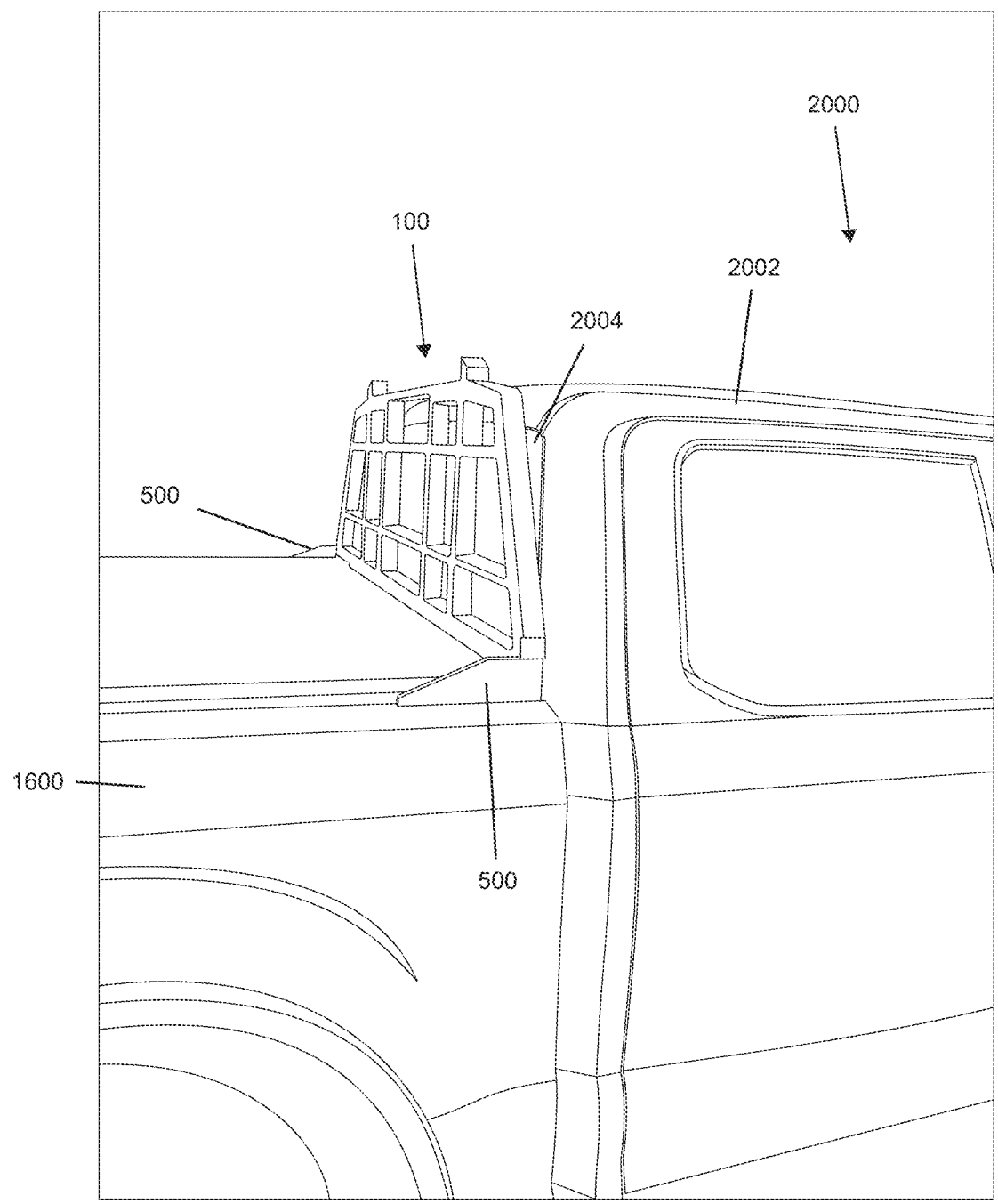
Figure 44:
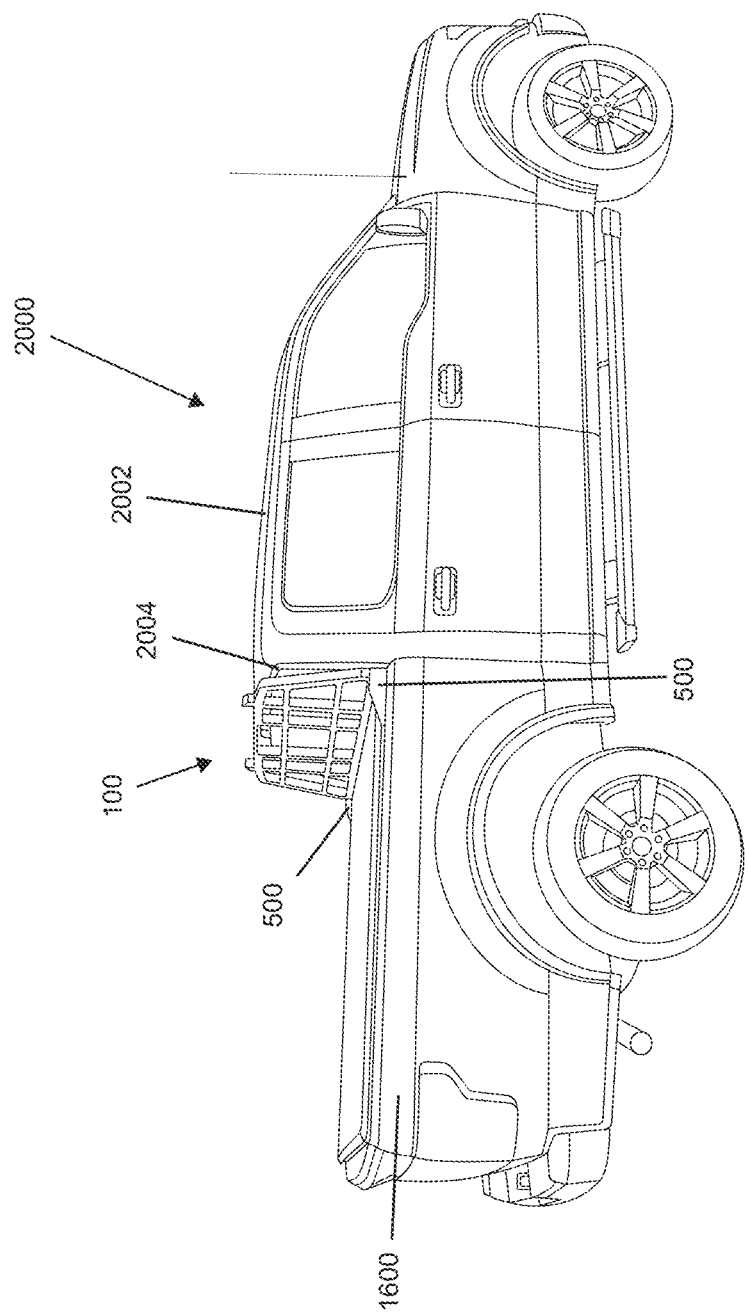

FIG. 40 to FIG. 44 are schematics of a rack 10 having a barrier 100 and mounting brackets 500 fastened to a rail 1602 of a truck bed 1600 of a truck 2000. When the rack 10 is mounted to the rail 1602 of the truck bed 1600, the barrier 100 is configured for disposition in opposition to the rear window 2004. As depicted in FIG. 41, when the rack 10 is mounted to the rail 1602 of the truck bed 1600, the barrier 100 is configured for disposition in opposition to the rear window 2004, and configured for disposition in alignment to the rear window 2004, for example, generally parallel to the rear window 2004.

A fastener, such as nuts and bolts, hex bolts, Allen key bolts, eye bolt, nails, screws, pegs, and the like, may be received through the opening 504 of the mounting bracket 500 and be received in and engage with the channel 1004 of the connector 1000, which is received in the stake pocket 1605 and fastened to the rail 1602, such that the mounting bracket 500 is fastened to the connector 1000. With the barrier 100 connected to the mounting bracket 500 and the connector 1000 fastened to the rail 1602, the rack 10, including the barrier 100, is fastened to the rail 1602 when the rack 10 is fastened to the connector 1000.

As depicted in FIG. 40 to FIG. 44, the barrier 100 is configured to protect the rear window 2004 from cargo that may be stored in the truck bed 1600. As depicted, for example, the barrier 100 may be dimensioned to be as large or larger than the rear window 2004, and the barrier 100 may be dimensioned to be as tall or taller than the cab 2002.

As depicted in FIG. 40, the apertures 102 of the barrier 100 defined between merging barrier members 104 may be narrower at opposing first and second portions of the barrier 100, corresponding to where a driver and passenger would be intended to be positioned in the cab 2002 during operation of the truck 2000, compared to the apertures 102 defined at a central portion of the barrier 100, the central portion of the barrier 100 positioned between the first and second portions of the barrier 100, where a driver and passenger would not be intended to be positioned in the cab 2002 during operation of the truck 2000. This configuration of apertures 102 may allow for the cab 2002 and rear window 2004 to be protected from being contacted by cargo stored in the truck bed 1600, and provide a driver or passenger to have a line of sight from the cab 2002 through the barrier 100 via the apertures 104.

To remove the rack 10 that is fastened to the rail 1602 of the truck bed 1600, the fastener received through the opening 504 of the mounting bracket 500 and engaged with the channel 1004 of the connector 1000 may be unfastened and removed. With the fastener removed, the mounting bracket 500 may not be connected with the connector 1000, such that the rack 10 may be dismounted from the rail 1602 of the truck bed 1600 and removed. With the rack 10 dismounted from the rail 1602 of the truck bed 1600 and removed, the connector 1000 may remain fastened to the rail 1602, and a cover 2600 may be engaged with the top surface of the connector 1000 to cover the connector 1000 and protect the connector 1000 from environmental conditions, and prevent the connector 1000 from being exposed.

In some embodiments, the rack 10 may be mounted to a vehicle and fastened to a vehicle, and unfastened from a vehicle and dismounted from a vehicle, using only a fastener that may fasten the rack 10 to the connector 1000 that is fastened to the vehicle.

In some embodiments, where the rack 10 comprises the barrier 100, the base 200 having the mounting brackets 500, and the connector 1000 as a rack 10 of unitary one-piece construction, the connector 1000 of the rack 10 may be received in the stake pocket 1605 of the rail 1602 and fastened to the rail 1602, which may fasten the rack 10 having the barrier 100, the base 200 having the mounting brackets 500, and the connector 1000 merged together as a rack 10 of unitary one-piece construction to the rail 1602 of the truck bed 1600.

As described herein with respect to the rack 10, the barrier 100, the one or more mounting brackets 500, and the connector 1000 may be of unitary one piece construction.

In some embodiments, for example, the one or more mounting brackets 500 and the connector 1000 are of unitary one piece construction, and may be fastened to the barrier 100 using, for example, fasteners.

In some embodiments, for example, the barrier 100 and the one or more mounting brackets 500 are of unitary one piece construction, and may be fastened to the connector 1000 using, for example, fasteners.

In some embodiments, for example, the rack 10 includes the barrier 100 and the connector 1000 without the one or more mounting brackets 500, and the rack 10 is of unitary one piece construction.

Figure 57:
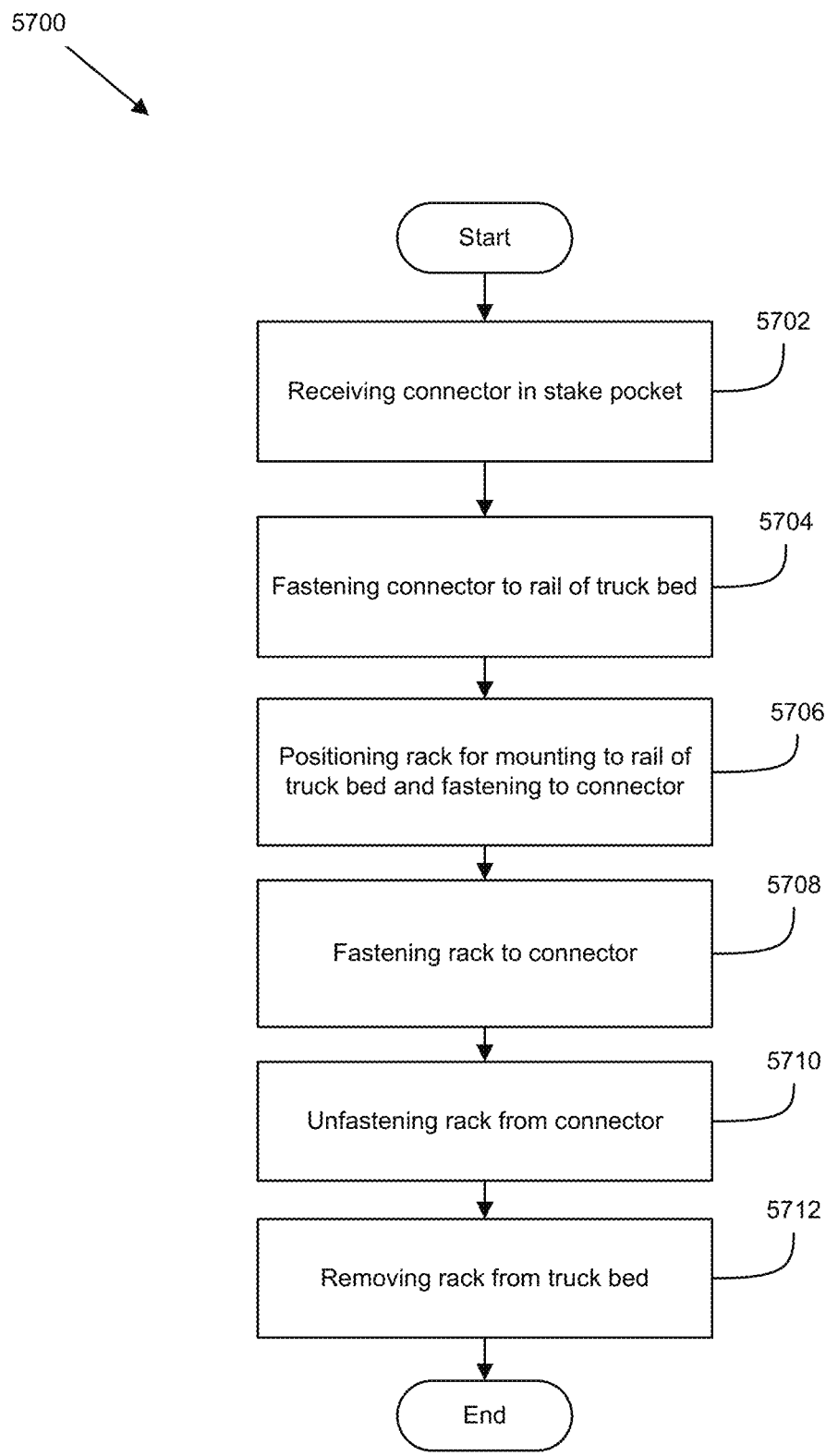
FIG. 57 is a flow chart depicting a method of installing a rack to a truck bed and uninstalling the rack.

FIG. 57 is a flow chart depicting a method 5700 of installing a rack 10 to a truck bed 1600 and uninstalling the rack 10.

At 5702, a connector 1000 is received in a stake pocket 1605 defined by a rail 1602 of a truck bed 1600.

At 5704, the connector 1000 received in the stake pocket 1605 is fastened to the rail 1602. When the connector 1000 received in the stake pocket 1605 is fastened to the rail 1602, the top surface of the connector 1000 may be generally aligned or flush with the top surface 1607 of the rail 1602 or the top surface of the cover 1610 of the rail 1602. In some embodiments, a washer 2200 may be used for fastening the connector 1000 to the rail 1602. When the connector 1000 is fastened to the rail 1602, the connector 1000 is cooperatively configured with a flange 1608 of the truck bed 1600, the flange 1608 extending into the stake pocket 1605, such that, while the connector 1000 is disposed within the stake pocket 1605, a side surface portion of the connector 1000 is being opposed by the flange 1608 of the truck bed 1600, for limiting movement of the connector 1000 relative to the truck bed 1600. In some embodiments, the connector 1000 may have a load plate 3302, or a load plate 3302 may be positionable between a fastener and the connector 1000, such that while the connector 1600 is disposed within a stake pocket 1605 of a rail 1602 of a truck bed 1600, a side surface portion or a flange of the load plate 3302 is opposed by the flange 1608 of the rail 1602 of the truck bed 1600 for limiting movement of the connector 1000 relative to the truck bed 1600.

At 5706, a rack 10 having a barrier 100 and a base 200, which may have one or more mounting brackets 500, may be positioned on the rail 1602 of the truck bed 1600 for mounting to the rail 1602 of the truck bed 1600 and fastening to the connector 1000 that is received in the stake pocket 1605 of the rail 1602 and fastened to the rail 1602. In some embodiments, one of the one or more openings 504 of the mounting bracket 500 is aligned over the channel 1004 of the connector 1000 to position the barrier 100 relative to the rear window 2004, such that a fastener may be through the opening 504 and engage with the channel 1004.

At 5708, with the one or more of the openings 504 of the mounting bracket 500 aligned with the channel 1004, the rack 10 and the connector 1000 may be fastened together using a mechanical fastener, such as nuts and bolts, hex bolt, Allen key bolt, eye bolt, nails, screws, pegs, and the like, such that the rack 10 is mounted to the rail 1602 of the truck bed 1600 and fastened to the rail 1602 of the truck bed 1600. With the rack 10 mounted and fastened to the rail 1602 of the truck bed 1600, the barrier 100 may prevent objects in the truck bed 1600 from contacting the rear window 2004.

At 5710, to remove the rack 10 that is fastened to the rail 1602 of the truck bed 1600, the fastener that fastened the rail 10 to the rail 1602 of the truck bed 1600 may be disengaged, loosened, or removed, such that the barrier 100 and the mounting bracket 500 is not fastened to the connector 1000.

At 5712, the barrier 100 and mounting bracket 500, which is not fastened to the connector 1000, may be dismounted from the rail 1602 of the truck bed 1600 and removed from the truck bed 1600.

In some embodiments, where the rack 10 comprises the barrier 100, the base 200 having the mounting brackets 500, and the connector 1000 as a rack 10 of unitary one-piece construction, the connector 1000 of the rack 10 may be received in the stake pocket 1605 of the rail 1602 and fastened to the rail 1602, which may fasten the rack 10 having the barrier 100, the base 200 having the mounting brackets 500, and the connector 1000 merged together as a rack 10 of unitary one-piece construction to the rail 1602 of the truck bed 1600.

In some embodiments, the rack 10 comprises the barrier 100, the base 200 having the mounting brackets 500, and the connector 1000, where the barrier 100, the base 200 having the mounting brackets 500, and the connector 1000 are separate components. The barrier 100, the base 200 having the mounting brackets 500, and the connector 1000 may be separately manufactured, and then fastened together to form the rack 10. In such embodiments, the barrier 100, the base 200 having the mounting brackets 500, and the connector 1000 may be a kit or be parts for installing a rack system.

In some embodiments, parts for installing a rack system on a vehicle comprise a first part including a rack 10 of unitary one-piece construction for mounting to a vehicle including a cab having a rear window, the rack comprising a barrier 100 as described herein, wherein the barrier 100 includes a plurality of apertures 102, each one of the plurality of apertures 102, independently, is defined between a respective plurality of merging barrier members 104, the barrier 100 is configured for disposition in opposition to the rear window while the rack 10 is mounted to the vehicle, such that line of sight is provided from the cab, through the barrier, via the apertures 102, and the barrier 100 prevents oversized objects from contacting the rear window, a second part including a base 200 as described herein configured for mounting the rack 10 to the vehicle, such that, while the rack 10 is mounted to the vehicle via the base 200, the barrier 100 is configured for disposition in opposition to the rear window; and a third part including a connector 1000 as described herein for fastening the rack 10 to the vehicle.

In some embodiments, the base 200 comprises one or more mounting brackets 500, as described herein.

In some embodiments, a kit for installing a rack system on a vehicle, comprising a rack 10 of unitary one-piece construction for mounting to a vehicle including a cab having a rear window, the rack 10 comprising a barrier 100, wherein the barrier 100 includes a plurality of apertures 102, each one of the plurality of apertures 102, independently, is defined between a respective plurality of merging barrier members 104, the barrier 100 is configured for disposition in opposition to the rear window while the rack 10 is mounted to the vehicle, such that line of sight is provided from the cab, through the barrier 100, via the apertures 102, and the barrier 100 prevents oversized objects from contacting the rear window, and a connector 1000 as described herein for releasably coupling to the vehicle and releasably coupling to the rack 10 for releasably fastening the rack 10 to the vehicle.

In some embodiments, a kit for installing a rack system on a vehicle, comprising a rack 10 of unitary one-piece construction for mounting to a vehicle including a cab having a rear window, the rack 10 comprising a barrier 100, wherein the barrier 100 includes a plurality of apertures 102, each one of the plurality of apertures 102, independently, is defined between a respective plurality of merging barrier members 104, the barrier 100 is configured for disposition in opposition to the rear window while the rack 10 is mounted to the vehicle, such that line of sight is provided from the cab, through the barrier 100, via the apertures 102, and the barrier 100 prevents oversized objects from contacting the rear window, and a first mounting bracket 500 having a first part, such as a slot 512, for receiving a portion of the barrier 100, such as a leg 116 of the barrier 100, and a second part, such as a mounting surface, for mounting to the vehicle, a second mounting bracket 500 having a first part, such as a slot 512, for receiving a portion of the barrier 100, such as a leg 116 of the barrier 100, and a second part, such as a mounting surface, for mounting to the vehicle, a first connector 1000 for releasably coupling to the vehicle and for releasably coupling to the first mounting bracket 500, a second connector 1000 for releasably coupling to the vehicle and for releasably coupling to the second mounting bracket 500, wherein the barrier and the first and second mounting brackets 500 are cooperatively configured such that the releasable coupling of the first and second connectors 1000 to the vehicle and disposition of the barrier 100 and the first and second mounting brackets 500 relative to the first and second connectors 1000 is such that the barrier 100 is disposed in opposition to the rear window of the vehicle.

In some embodiments, the rack 10 described herein may be manufactured by injection moulding.

In some embodiments, a method of producing a rack 10 of unitary one-piece construction for mounting to a vehicle including a cab having a rear window, the rack 10 comprising a barrier 100, wherein the barrier 100 includes a plurality of apertures 102, each one of the plurality of apertures 102, independently, is defined between a respective plurality of merging barrier members 104, the barrier 100 is configured for disposition in opposition to the rear window while the rack 10 is mounted to the vehicle, such that, line of sight is provided from the cab, through the barrier 100, via the apertures 102, and the barrier 100 prevents oversized objects from contacting the rear window, wherein the method comprises injection moulding the rack 10.

In some embodiments, the rack 10 comprises the base 200 having one or more mounting brackets 500 and the connector 1000 as described herein.

Figure 58:
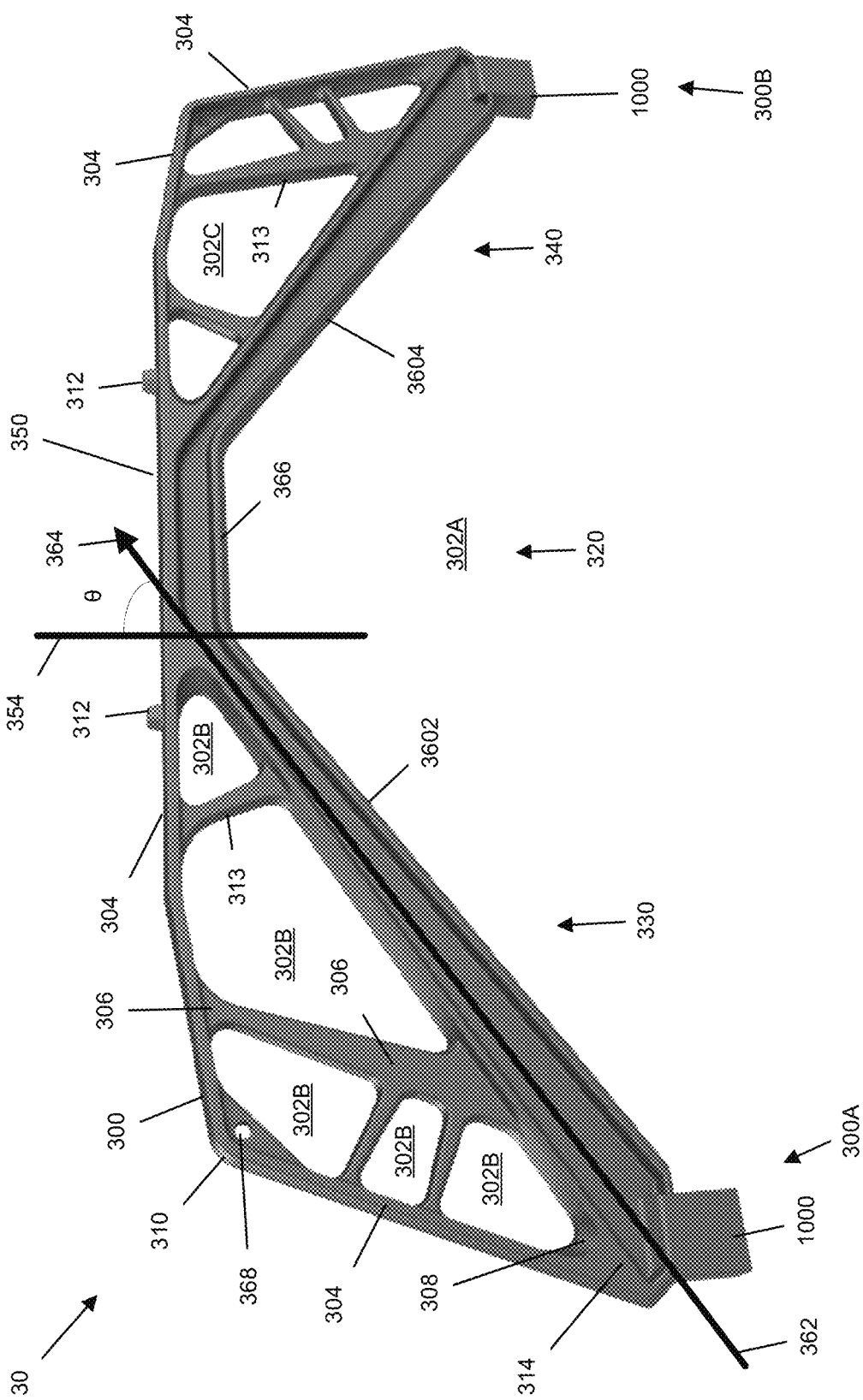
FIG. 58 is a perspective view of an alternate embodiment of the rack of FIG. 1.
Figure 59:
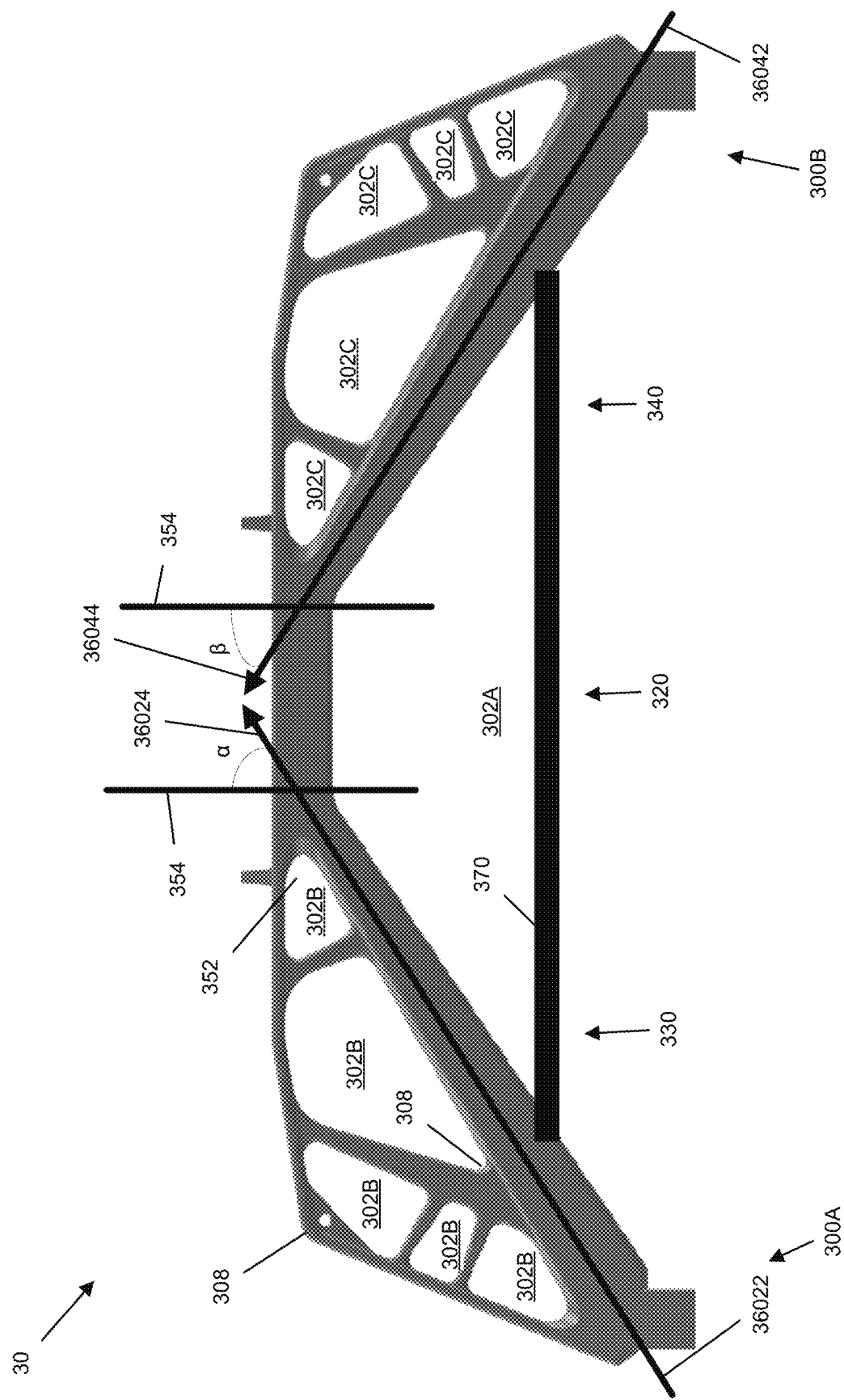
FIG. 59 is a front view of the rack of FIG. 58.
Figure 60:
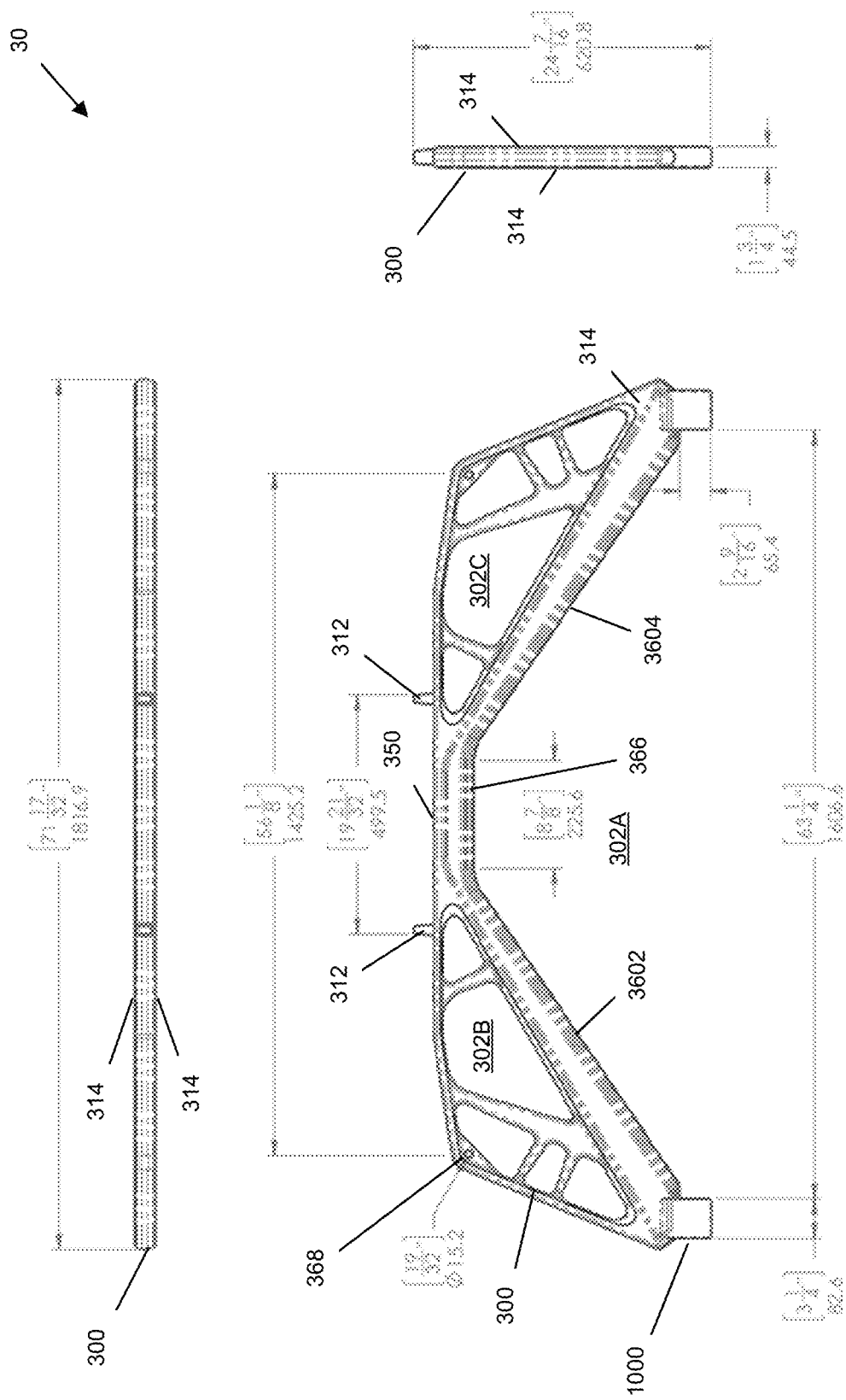
FIG. 60 is a schematic of the rack of FIG. 58.

In some embodiments, the load applied to the rack may be distributed through the body of the rack and to the base of the rack. FIGS. 58 to 60 depict an example rack 30 that is configured to distribute the load applied to the rack 30 through the body of the rack 30 and to the base 200 of the rack 30. In some embodiments, for example, the rack 30 is an alternate embodiment of the rack 10. The rack 30 may be of unitary one-piece construction for mounting the rack to a vehicle that includes a cab having a rear window.

The rack includes a barrier 300, similar to barrier 100, which is defined by a plurality of barrier members 304. As depicted in FIG. 58 to FIG. 60, the barrier portions 304 may be generally straight and have a vertical, horizontal, or diagonal orientation. Accordingly, the barrier portions 304 may define apertures 302 having a four-sided or quadrilateral shape. In some embodiments, the barrier portions 304 may be straight or curved, and may be oriented such that the barrier portions 304 merge to define apertures 302 having a rounded shape, a shape with two sides, or more than two sides.

The barrier 300 may be injection moulded to be of unitary one-piece construction. The material used for the barrier 300 may be high impact co-polymer, nylon, polypropylene, or a thermoplastic. In some embodiments, the material used for the barrier 300 may be polypropylene with 30% glass fiber filler.

Similar to the rack 10, the rack 30 may be mounted and connected to a vehicle with a cab that has a rear window, such as a truck, as described herein. In some embodiments, when the barrier 300 is disposed in opposition to the rear window, the barrier 300 is disposed in alignment with the rear window. For example, when the rack 30 is mounted to a rail of the truck bed, the barrier 300 is disposed generally parallel to the rear window of the cab. In some embodiments, disposition of the barrier 300 in opposition to the rear window is such that the barrier 300 is disposed in alignment with the rear window. In some embodiments, the barrier 300 of the rack 30 and the vehicle are co-operatively configured for disposition of the barrier 300 in opposition to the rear window such that, while the rack 30 is mounted to the vehicle, such that line of sight is provided from the cab below a load distributing member 350 of the rack 30, and the barrier 300 prevents oversized objects from contacting the rear window.

As depicted in FIG. 60, the rack 30 may have an example height of 24.4375".

As depicted in FIG. 60, the rack 30 may have an example width of 71.53125". In some embodiments, while the rack 30 is mounted to the vehicle, a lower portion and an upper portion of the rack 30 are defined. In some embodiments, as depicted in FIG. 60, the lower portion of the rack 30 has an example width of 63.25", and an upper portion of the rack 30 has an example width of 56.125".

As depicted in FIG. 60, the rack 30 may have an example thickness of 1.75".

In some embodiments, for example, the barrier member 304 have dimensions similar to those of the barrier member 104.

In some embodiments, for example, as depicted in FIGS. 58 to 60, at least one of the plurality of barrier members 304 defines a load supporting member 350. The load supporting member 350 defines a longitudinal axis 352, such as a central longitudinal axis. A normal axis 354 is defined relative to the longitudinal axis 352. The load supporting member 350 is configured to support a load applied to the barrier 300, such as, for example, ladders, kayaks, lumber, fishing rods, guns, and the like. In some embodiments, for example, the load supporting member 350 is the uppermost barrier member 304 of the plurality of barrier members 304.

The plurality of barrier members 304 includes at least one load distributing member 360. As depicted in FIG. 58 to FIG. 60, the load distributing member 360 is disposed between the load supporting member 350 and the base 200. The load distributing member 360 is configured to distribute the load that is supported by the load supporting member through the body of the rack 30 and to the base 200. In some embodiments, for example, the at least one load distributing member 360 extends from the base 200. In some embodiments, for example, the at least one load distributing member 360 extends from the base 200 towards the load supporting member 350.

In some embodiments, for example, as depicted in FIG. 58, the barrier 300 of the rack 30 and the vehicle are co-operatively configured for disposition of the barrier 300 in opposition to the rear window such that, while the rack 30 is mounted to the vehicle, a ray 364, that is disposed along a longitudinal axis 362 of the at least one load distributing member 360 (such as a central longitudinal axis of the load distributing member 360 and extending towards a side of the cab, is disposed at an acute angle θ between 30 degrees and 70 degrees relative to the normal axis 354 of the load supporting member 350. In some embodiments, the example, the ray 364 is disposed at an acute angle θ of 50 degrees relative to the normal axis 354 of the load supporting member 350.

As depicted in FIG. 59, in some embodiments, for example, the at least one load distributing member 360 is a first load distributing member 3602 and a second load distributing member 3604. The first load distributing member 3602 and the second load distributing member 3604 are disposed between the load supporting member 350 and the base 200. In such embodiments, for example, a first ray

36024, that is disposed along a longitudinal axis 36022 of the first load distributing member 3602, is disposed at an acute angle α between 30 degrees and 70 degrees relative to the normal axis 354 of the load supporting member 350, and a second ray 36044, that is disposed along a longitudinal axis 36042 of the second load distributing member 3604, is disposed at an acute angle β between 30 degrees and 70 degrees relative to the normal axis 354 of the load supporting member 350.

In some embodiments, for example, the barrier 300 and the vehicle are co-operatively configured such that the first ray 36024 extends towards a first side of the cab, and the second ray 36044 extends towards a second side of the cab, which is opposite the first side of the cab.

In some embodiments, for example, the barrier 300 and the vehicle are co-operatively configured such that the first ray 36024 extends from a first end 300A of the barrier 300 towards the first side of the cab, where the first end 300A of the barrier 300 is disposed opposite the first side of the cab. In some embodiments, for example, the second ray 36044 extends from a second end 300B of the barrier 300 towards the second side of the cab, where the second end 300B of the barrier 300 is disposed opposite the second side of the cab. In such embodiments, the second end 300B of the barrier 300 is disposed opposite the first end 300A of the barrier 300, and the second side of the cab disposed opposite the first side of the cab. In this regard, in some embodiments, for example, the first end 300A of the barrier 300 is a left end of the barrier 300, the first side of the cab is the right side or passenger side of the cab, the second side 300b of the barrier 300 is a right side of the barrier 300, and the second side of the cab is the left side or driver side of the cab.

In embodiments, for example, as depicted in FIG. 59, the first ray 36024 is disposed at an acute angle α of 50 degrees relative to the normal axis 354 of the load supporting member 350, and the second ray 36044, that is disposed along a longitudinal axis 36042 of the second load distributing member 3604, is disposed at an acute angle β of 50 degrees relative to the normal axis 354 of the load supporting member 350.

In some embodiments, the angle defined between the first ray 36024 and the normal axis 354 is the same as the angle defined between the second ray 36044 and the normal axis 354. In some embodiments, the angle defined between the first ray 36024 and the normal axis 354 is different from the angle defined between the second ray 36044 and the normal axis 354.

As depicted in FIG. 59, in some embodiments, for example, where the rack 30 includes the first load distributing member 3602 and the second load distributing member 3604, the first load distributing member 3602 and the second load distributing member 3604 are joined with the load supporting member 350. In some embodiments, for example, the first load distributing member 3602 and the second load distributing member 3604 are not joined with the load supporting member 350. In such embodiments, for example, the first load distributing member 3602 and the second load distributing member 3604 terminate before joining the load supporting member 350.

As depicted in FIGS. 58 to 60, in some embodiments, for example, where the rack 30 includes the first load distributing member 3602 and the second load distributing member 3604, the first load distributing member 3602 extends between a first end 300A and a second end 300B, and between the load supporting member 350 and the base 200. Similarly, the second load distributing member 3604 extends between a first end 300A and a second end 300B, and between the load supporting member 350 and the base 200. In some embodiments, for example, as depicted in FIGS. 58 to 60, with the base 200 as a reference point, the first load distributing member 3602 extends from a first end 300A to a second end 300B, and from the base 200 to the load supporting member 350, while the second load distributing member 3604 extends from a second end 300B to a first end 300A, and from the base 200 to the load supporting member 350. In such embodiments, the first load distributing member 3602 and the second load distributing member 3604 extend from the base 200 and from opposing ends 300A and 300B towards each other. In this regard, the first load distributing member 3602 and the second load distributing member 3604 are configured such that they resemble the legs of a trapezoid, such as an isosceles trapezoid. This configuration may allow the first and second load distributing members 3602 and 3604 to distribute a load applied on top of the barrier 300, such as on the load supporting member 350, towards the first end 300A and second end 300B of the barrier 300 and towards the base 200.

In some embodiments, for example, the at least one load distributing member 360 has an arcuate shape that extends between the first end 300A and the second end 300B. In such embodiments, and where the at least one load distributing member 360 has the first load distributing member 3602 and the second load distributing member 3604, In some embodiments, for example, as depicted in FIGS. 58 to 60, with the base 200 as a reference point, the first load distributing member 3602 extends from a first end 300A to a second end 300B, and from the base 200 to a central portion of the load supporting member 350, while the second load distributing member 3604 extends from a second end 300B to a first end 300A, and from the base 200 to a central portion of the load supporting member 350.

In some embodiments, for example, the first load distributing member 3602 and the second load distributing member 3604 extend from the base 200 and from opposing ends 300A and 300B towards each other, but do not intersect each other. In this regard, as noted herein, and depicted in FIGS. 58 to 60, the first load distributing member 3602 and the second load distributing member 3604 are configured to resemble the legs of a trapezoid. In some embodiments, for example, the first load distributing member 3602 and the second load distributing member 3604 extend from the base 200 and from opposing ends 300A and 300B towards each other, and intersect each other and terminate at a common point, such as at a common point of the load supporting member 350. In this regard, the first load distributing member 3602 and the second load distributing member 3604 are configured to resemble two adjacent sides of a triangle, such as an isosceles triangle. In some embodiments, for example, the first load distributing member 3602 and the second load distributing member 3604 extend from the base 200 and from opposing ends 300A and 300B towards each other, and intersect each other at a common point, and extend beyond the common point of intersection and terminate at different points, such as at different points of the load supporting member 350. In this regard, as noted herein, the first load distributing member 3602 and the second load distributing member 3604 are configured to resemble a cross or an "X".

In some embodiments, for example, at least one of the plurality of barrier members 304 includes a reinforcing member 366. The reinforcing member 366 is configured to reinforce the load supporting member 350, such that the load supporting member 350 may support the load applied to it, and that the load may be distributed by the load distributing member 360 through the body of the rack 30 and to the base 200. In some embodiments, for example, the reinforcing member 366 extends between the first load distributing member 3602 and the second load distributing member 3604. In some embodiments, for example, as depicted in FIG. 58 to FIG. 60, the reinforcing member 366 extends between an end of the first load distributing member 3602 and an end of the second load distributing member 3604. In some embodiments, for example, the reinforcing member 366 is joined directly with the load supporting member 350, such as being joined to the underside of the load supporting member 350. In this regard, in some embodiments, for example, as depicted in FIG. 58 to FIG. 60, the portion of the load supporting member 350 on which the reinforcing member 366 is joined is thicker than the portion of the load supporting member 350 on which the reinforcing member 366 is not joined. In some embodiments, for example, the reinforcing member 366 allows additional weight to be supported by the load supporting member 350.

Figure 67:
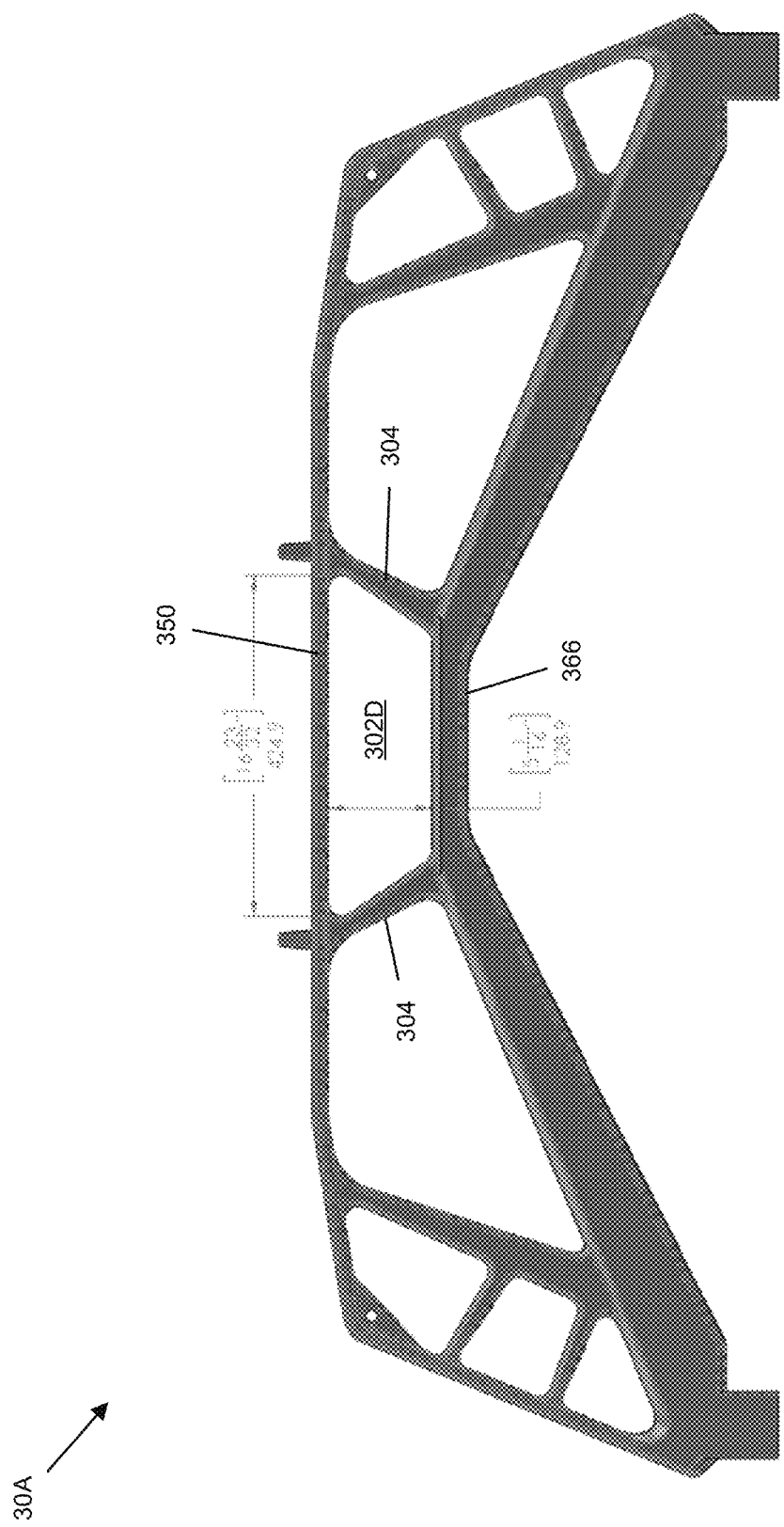
FIG. 67 is a front view of an alternate embodiment of the rack of FIG. 58.

In some embodiments, for example, the reinforcing member 366 is not joined directly to the load supporting member 350, as depicted in FIG. 67. In such embodiments, for example, the reinforcing member 366 is connected to the load supporting member 350 by at least one of the plurality of barrier members 304.

In some embodiments, the reinforcing member 366 has an example width of 8.875", as depicted in FIG. 60.

In some embodiments, for example, while the rack 30 is mounted to the vehicle, the normal axis 354 of the load supporting member 350 is a vertical axis.

In some embodiments, for example, the load supporting member 350 is co-operatively configured with the cab such that the load supporting member 350 extends across a width of the cab, such as between the driver side of the cab and the passenger side of the cab.

In some embodiments, for example, the load supporting member 350 has a length of at least 1'.

In some embodiments, for example, at least one of the plurality of barrier members 304 defines an accessory supporting member 370 that is disposed between the load supporting member 350 and the base 200, as depicted in FIG. 59. The accessory supporting member 370 is configured to support one or more accessories, for example, while the rack 30 is mounted to the vehicle. In some embodiments, for example, the accessory supporting member 370 can support outdoor equipment, sports equipment, bicycles, skis, snowboards, fishing rods, guns, and the like. In some embodiments, for example, the accessory supporting member 370 is a tube that is configured to receive one or more the forks of a bicycle to support the bicycle. In some embodiments, for example, the accessory supporting member 370 has one or more openings that are configured to receive the accessories to be supported, such as the forks of a bicycle, fishing rods, guns, and the like. In some embodiments, the accessory supporting member 370 has one or more openings to receive a mechanical fastener to fasten accessories to the accessory supporting member 370, or to fasten additional supporting members to the accessory supporting member 370 to support accessories. In some embodiments, the accessories that are supported by the accessory supporting member 370 are strapped onto the accessory supporting member 370.

In some embodiments, for example, where the rack 30 includes the first load distributing member 3602 and the second load distributing member 3604, the accessory supporting member 370 is disposed between the first load distributing member 3602 and the second load distributing member 3604, as depicted in FIG. 59. As depicted, the accessory supporting member 370 extends between the first load distributing member 3602 and the second load distributing member 3604. In this regard, the accessory supporting member 370 is joined to an intermediate portion of the first load distributing member 3602 and an intermediate portion of the second load distributing member 3604.

In some embodiments, for example, the accessory supporting member 370 is a separate component of the rack 30 and is attached to the barrier 300 using, for example, fasteners.

In some embodiments, for example, while the rack 30 is mounted to the vehicle and disposed opposite the cab, one or more of the plurality of barrier portions 304 may not be directly aligned or directly opposite the cab, such that one or more of the plurality of barrier portions 304 are not shielded by the cab from moving fluid, such as air, during operation of the vehicle. For example, one or more of the plurality of barrier portions 304 that are positioned about the periphery of the barrier 300 are not shielded by the cab from and exposed to moving fluid, such as air, during operation of the vehicle. In this regard, in some embodiments, for example, the one or more of the plurality of barrier portions 304 that are not shielded by the cab from and exposed to moving fluid has a cross-sectional profile having a foil shape. In some embodiments, for example, the load supporting member 350 has a cross-sectional profile having a foil shape, with a leading edge of the foil shape oriented to face towards the front of the vehicle, and a trailing edge of the oil shape oriented to face towards the rear of the vehicle. With the one or more of the plurality of barrier portions 304 that are not shielded by the cab from and exposed moving fluid, such as the load supporting member 350, having a cross-sectional profile having a foil shape, the drag and the noise due to the fluid flowing over the one or more unprotected or exposed barrier members 350 may be reduced.

Figure 61:
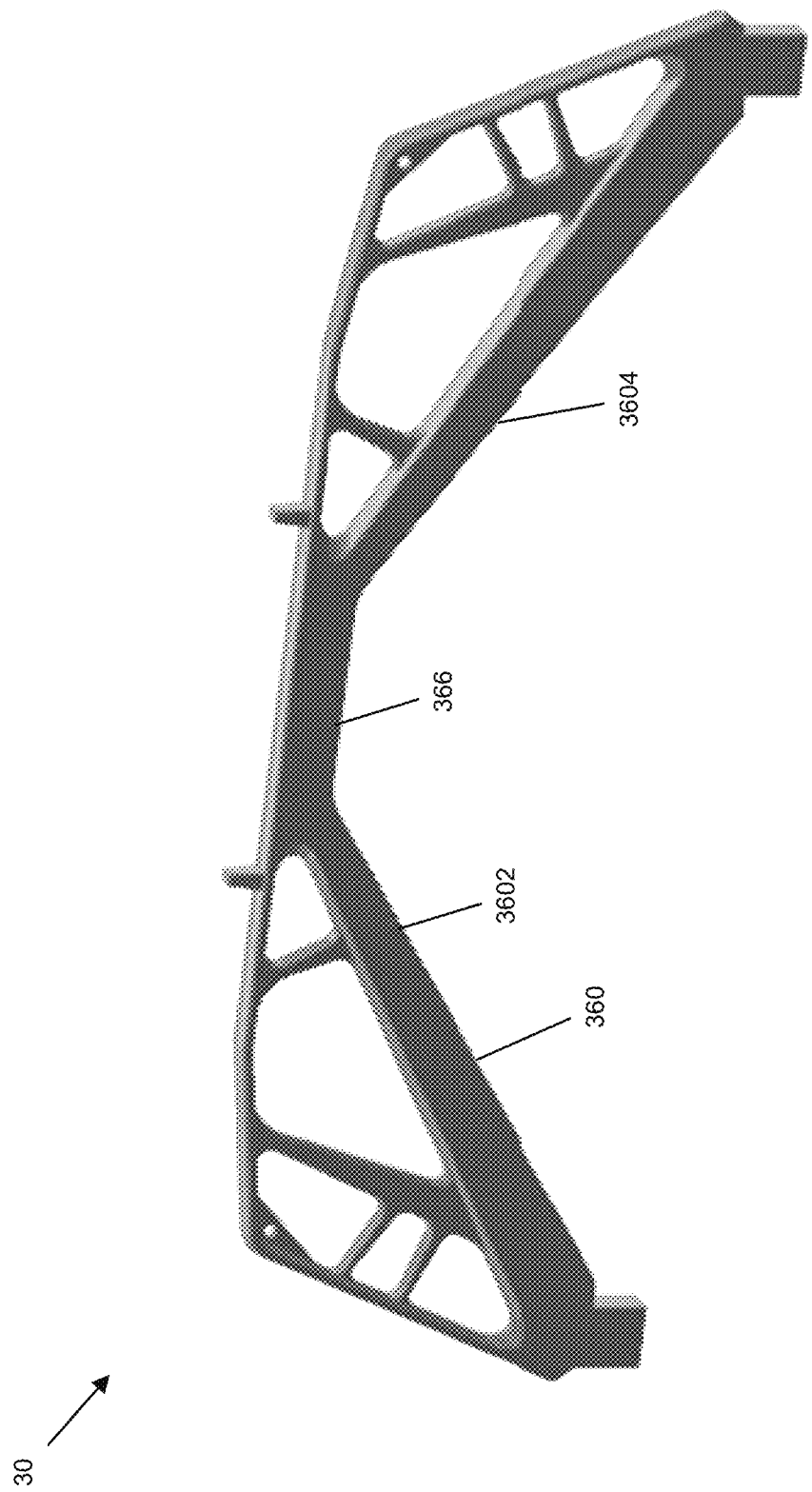
FIG. 61 is a perspective view of an embodiment of the rack of FIG. 58.
Figure 62:
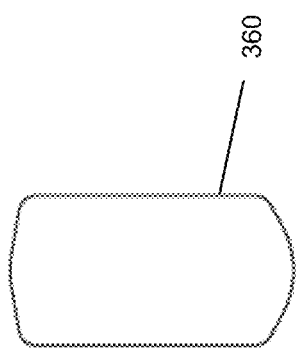
FIG. 62 is a cross-sectional view of a load distributing member of the rack of FIG. 61.

In some embodiments, for example, as depicted in FIG. 61 and FIG. 62, the at least one load distributing member 360 has a solid beam style cross-section. In some embodiments, for example, as depicted in FIG. 61, the first load distributing member 3602, the second load distributing member 3604, and the reinforcing member 366 have a solid beam style cross-section.

Figure 63:
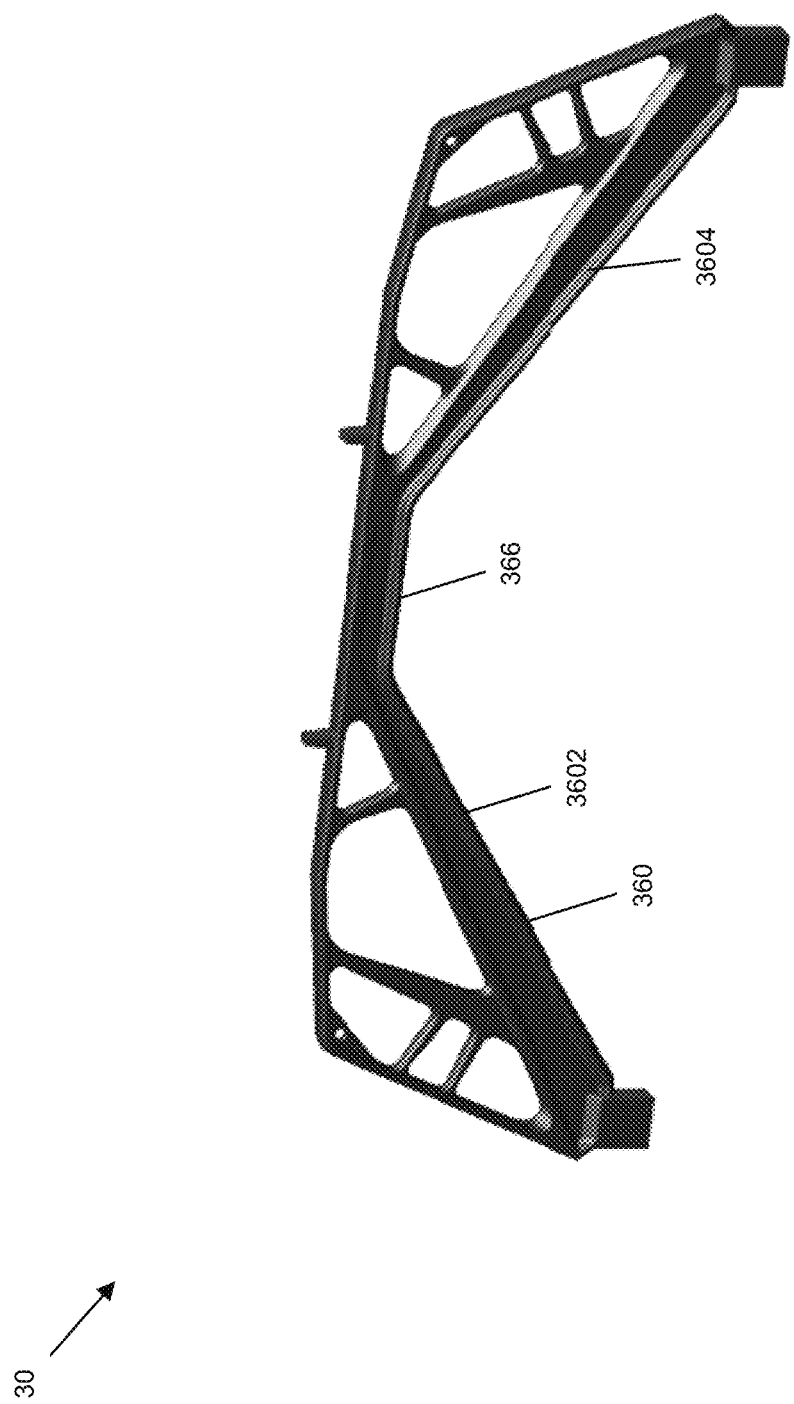
FIG. 63 is a perspective view of an embodiment of the rack of FIG. 58.
Figure 64:
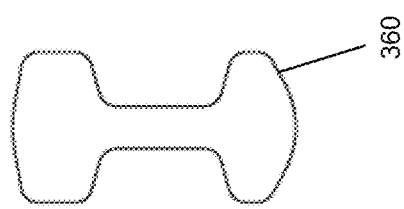
FIG. 64 is a cross-sectional view of a load distributing member of the rack of FIG. 63.

In some embodiments, for example, as depicted in FIG. 63 and FIG. 64, the at least one load distributing member 360 has an I-beam style cross-section. In some embodiments, for example, as depicted in FIG. 63, the first load distributing member 3602, the second load distributing member 3604, and the reinforcing member 366 have an I-beam style cross-section.

In some embodiments, for example, as depicted in FIG. 58, at least one of the plurality of barrier members 304 defines a port 368, and is configured to mount and fasten lights to the barrier 300. The lights to be supported may be directed in a forward or backward direction.

In some embodiments, for example, the rack 30 has the base 200 similar to the base 200 of rack 10. The base portion 200 may be configured to engage with the vehicle, for example, a rail of a truck bed. When the rack 30 is engaged with the vehicle via the base portion 200 of the rack 30, the rack 30 may be mounted to the vehicle. When the rack 30 is mounted to the vehicle, the rack 30 may be fastened to the vehicle. The barrier 300 and the base 200 are cooperatively configured such that, while the base 200 is mounted to the vehicle, the barrier 300 is disposed in opposition to the rear window of the vehicle.

In some embodiments, for example, the barrier 300 and the base 200 are of unitary one piece construction, such as when the barrier 300 and the base 200 are manufactured by injection moulding. In some embodiments, for example, the barrier 300 and the base 200 are separate components, and are fastened together using fasteners, or via friction fit, interference fit, snap fit, and the like.

Similar to rack 10, the base 200 of the rack 30, in some embodiments, for example, comprises a first mounting bracket 500 and a second mounting bracket 500. An example mounting bracket 500 is depicted in FIG. 5 to FIG. 8. The rack 30 may be manufactured by injection moulding, such that the barrier 300 and the base 200 having one or more mounting brackets 500 is of unitary one-piece construction for mounting to the vehicle. In some embodiments, for example, the barrier 300 and the base 200 having one or more mounting brackets 500 are separate components, and are fastened together using fasteners, or via friction fit, interference fit, snap fit, and the like. Each of the first and second mounting brackets 500 comprise a mounting surface for engaging the vehicle, wherein engagement of the mounting surface of the first and second mounting brackets 500 and the vehicle is such that the barrier 300 is disposed in opposition to the rear window. Wth the rack 30 mounted to the vehicle, the rack 30 may be fastened to the vehicle as described herein, for example, using the connector 1000.

In some embodiments, for example, each of the first and second mounting brackets 500 comprise at least one opening 504 for receiving a mechanical fastener to fasten the rack 30 to the vehicle.

In some embodiments, the first mounting bracket 500 is positioned on a first end 300A of the barrier 300, and the second mounting bracket 500 is positioned on a second end 300B of the barrier 300. In some embodiments, the first mounting bracket 500 is disposed at a first end 300A of the barrier 300, and the second mounting bracket 500 is disposed at a second end 300B of the barrier 300.

In some embodiments, for example, the first load distributing member 3602 extends from the first mounting bracket 500, and the second load distributing member 3604 extends from the second mounting bracket 500.

In some embodiments, the barrier 300 comprises legs 316, similar to legs 116 of the rack 10 and barrier 100. The legs 316 extend from a lower portion of the barrier 300. In some embodiments, where the barrier 300 and the mounting brackets 500 are separate components that are fastened together, the legs 316 of the barrier 300 may be received in the slots 512 of the mounting brackets 500. When the legs 316 of the barrier are received in the slots 512 of the mounting brackets 500, the barrier 300 and the mounting brackets 500 may be fastened together using, for example, a mechanical fastener.

In some embodiments, for example, the rack 30 comprises a connector 1000, similar to the connector 1000 of the rack 10, of unitary one-piece construction that may be received in an internal stake pocket of a rail of a truck bed, and may be fastened to the rail of the truck bed using a mechanical fastener and existing openings on the rail of the truck bed. Wth the connector 1000 fastened to the rail of the truck bed, the rack 30 may be fastened to the vehicle by fastening the rack 30 together with the connector 1000, as described herein.

The connector 1000 is configured to receive a mechanical fastener to fasten the rack 30 to the connector 1000, and with the connector 1000 fastened to the vehicle, to fasten the rack 30 to the vehicle using the mechanical fastener. In some embodiments, for example, the vehicle is a truck having a truck bed 1600, and the connector 1000 is configured for insertion within a stake pocket 1605 defined within the truck bed 1600. In such embodiments, the truck bed 1600 includes a flange 1608 extending into the stake pocket 1605. While the connector 1000 is inserted within the stake pocket 1605, the connector 1000 and the flange 1608 are cooperatively configured such that a side surface portion 1016 of the connector 1000 is opposed by the flange 1608 for limiting movement of the connector 1000 relative to the truck bed 1600.

In some embodiments, for example, as depicted in FIG. 58 to FIG. 60, the rack 30 comprises the connector 1000 and is manufactured as a unitary one-piece construction for mounting to a vehicle. As depicted in FIG. 58 to FIG. 60, the embodiment of the rack 30 has the connectors 1000 directly connected to the barrier 300, such that barrier 300 and the connectors 1000 are of unitary one piece construction, and does not have a mounting bracket 500.

In some embodiments, for example, the base 200 comprises a first connector 1000 and a second connector 1000. Each of the first and second connectors 1000 is configured for releasably coupling to the vehicle, wherein releasable coupling of the first and second connectors 1000 and the vehicle is such that the barrier 300 is disposed in opposition to the rear window.

As described herein, the first and second connectors 1000 are each configured to receive a mechanical fastener to fasten the rack 30 to the vehicle using the mechanical fastener.

As depicted in FIG. 58 to FIG. 60, the first connector 1000 is disposed at a first end 300A of the barrier 300, and the second connector 1000 is disposed at a second end 300B of the barrier 300.

As described herein, the first and second connectors 1000 are configured for insertion within stake pockets 1605 defined within a truck bed 1600. When the first and second connectors 1000 are received in the stake pockets 1605, the rack 30 is mounted to the vehicle. The truck bed includes flanges 1608 extending into the stake pockets 1605. While the first and second connectors 1000 are inserted within the stake pockets 1605, the connectors 1000 and the flanges 1608 are cooperatively configured such that a side surface portion of the first and second connectors 1000 are opposed by the flanges 1608 for reducing, mitigating, or limiting movement of the first and second connectors 1000 relative to the truck bed 1600, such as forward, backward, side to side, lateral, upward, and downward movement. Wth the first and second connectors 1000 received in the stake pockets 1605, by fastening the connectors 1000 to the vehicle as described herein, the rack 30 also becomes fastened to the vehicle.

In some embodiments, for example, the first load distributing member 3602 extends from the first connector 1000, and the second load distributing member 3604 extends from the second connector 1000.

The barrier members 304 of the rack 30, as depicted in FIG. 58 to FIG. 60, merge to define a plurality of merging points 306, similar to the merging points 106 of the rack 10. The merging points 306 may be defined along a frame or perimeter of the barrier 300, or may be defined within the frame or perimeter of the barrier 300. The merging points 306, such as merging points 306 defined along the frame or perimeter of the barrier 300, may have an internal rounded corner 308, similar to the internal rounded corner 108 of the rack 10, or an internal rounded corner 308 and an external rounded corner 310, similar to the external rounded corner 110 of the rack 10. The merging points 306, such as merging points 306 defined within the frame or perimeter of the barrier 300, may have one or more internal rounded corners 308. The internal rounded corner 308 or the external rounded corner 310 may provide structural strength to the barrier 300, and may reduce the amount of stress experienced by the barrier 300 when a force is applied to the barrier 300 by not presenting a stress concentration in the barrier 300 or by distributing the stress more evenly about the barrier 300, as described herein with respect to the rack 10.

In some embodiments, the merger of at least one pair of merging barrier members 304 defines an internal rounded corner 308.

In some embodiments, the merger of at least one pair of merging barrier portions 304 defines an external rounded corner 310.

In some embodiments, for example, the barrier members 304 have internal surfaces 313 that define the apertures 302, similar to the internal surfaces 113 of the barrier members 104 of the rack 10.

In some embodiments, for example, the rack 30 has external surfaces 314, as depicted in FIG. 58 to FIG. 60, similar to the external surfaces 114 of the rack 10, which are generally parallel to a plane defined by the body of the barrier 100. The barrier 300 includes a first external surface 314 and a second external surface 314 that is spaced apart from the first external surface 314. While the rack 30 is mounted to the vehicle, the first external surface 314 is disposed in opposition to the rear window of the cab. In this regard, the first external surface 314 is a front-facing external surface, and the second external surface 314 is a rear-facing external surface.

Similar to the barrier 100, the barrier 300 may comprise one or more protrusions 312 that are similar to the protrusions 112. As depicted in FIG. 58 to FIG. 60, the barrier 300 has two protrusions 312, and are configured to prevent or reduce lateral movement of cargo resting on the frame or perimeter of the barrier 300, such as a ladder or lumber. As depicted in FIG. 60, an example distance between the protrusions 312 is 19.65625".

In some embodiments, the barrier 300 is a solid part that is manufactured by injection moulding without supporting structures (e.g. skeleton frame, trusses, etc.) disposed in the barrier 300 or in contact with the barrier 300 to add structural strength to the barrier.

In other embodiments, the barrier 300 is manufactured by injection moulding, and includes supporting structures (e.g. skeleton frame, trusses, etc.) disposed in the barrier 300 or in contact with the barrier 300 to add structural strength to the barrier 300.

Figure 65:
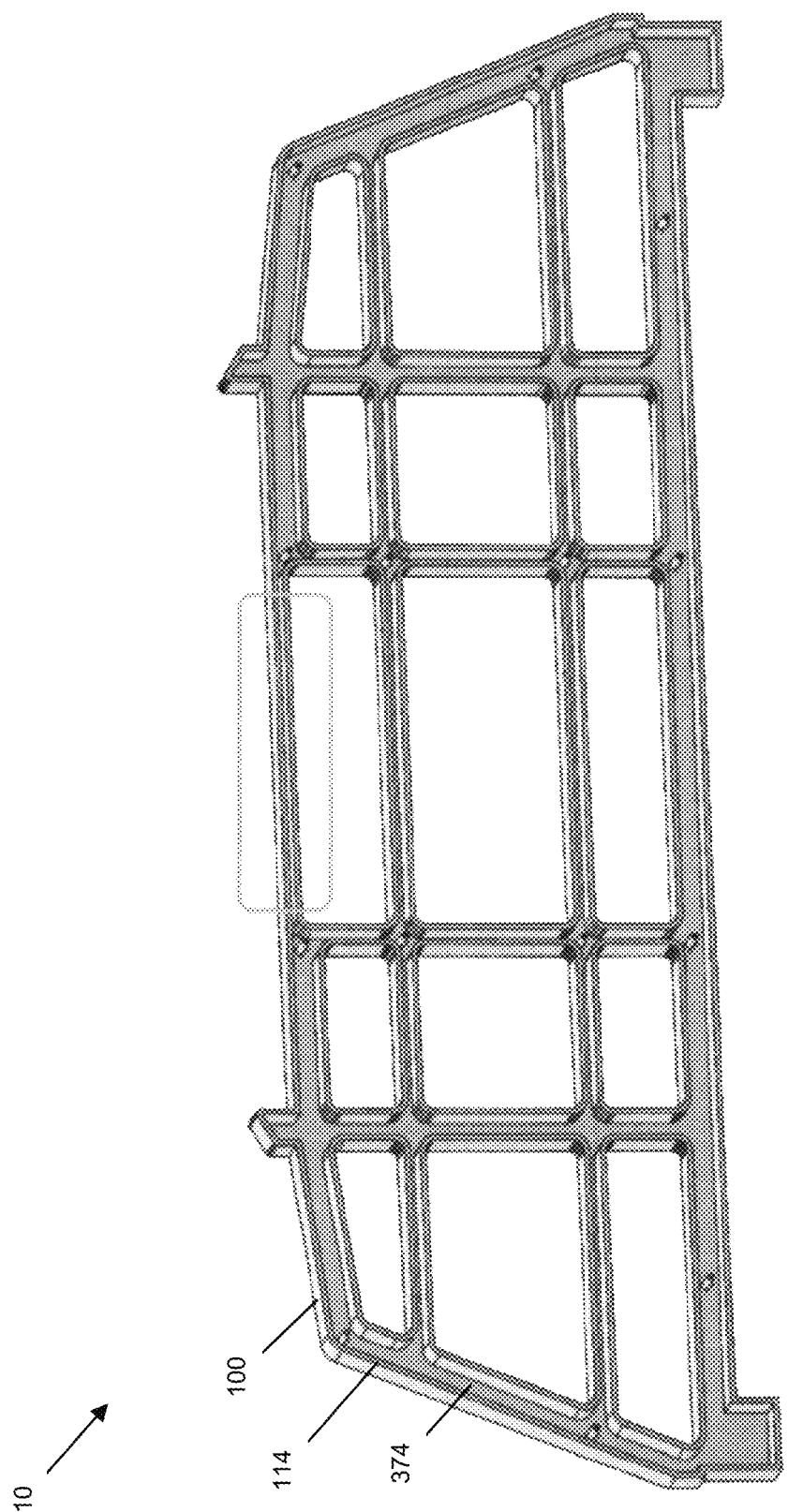
FIG. 65 is a perspective view of the rack of FIG. 1 with a cavity.

In this regard, in some embodiments, for example, an internal supporting structure 372 is disposed within the barrier 300. The internal supporting structure 372 is configured to increase the structural strength of the barrier 300. In some embodiments, for example, the internal supporting structure 372 has a honeycomb structure. At least one of the plurality of barrier members 304 of the barrier 300 defines a cavity 374 to receive the internal supporting structure 372. In some embodiments, the cavity 374 is defined by the plurality of barrier member 304 of the barrier 300. That is, in such embodiments, the cavity 374 is defined by the entire barrier 300, with the cavity 374 extending through the entire barrier 300. An example of the cavity 374 that is defined by the barrier 100 of the rack 10 is depicted in FIG. 65. In some embodiments, for example, the cavity 374 is defined on the first external surface 114, or the front-facing external surface, of the barrier 100 of the rack 10, as depicted in FIG. 65.

Figure 66:
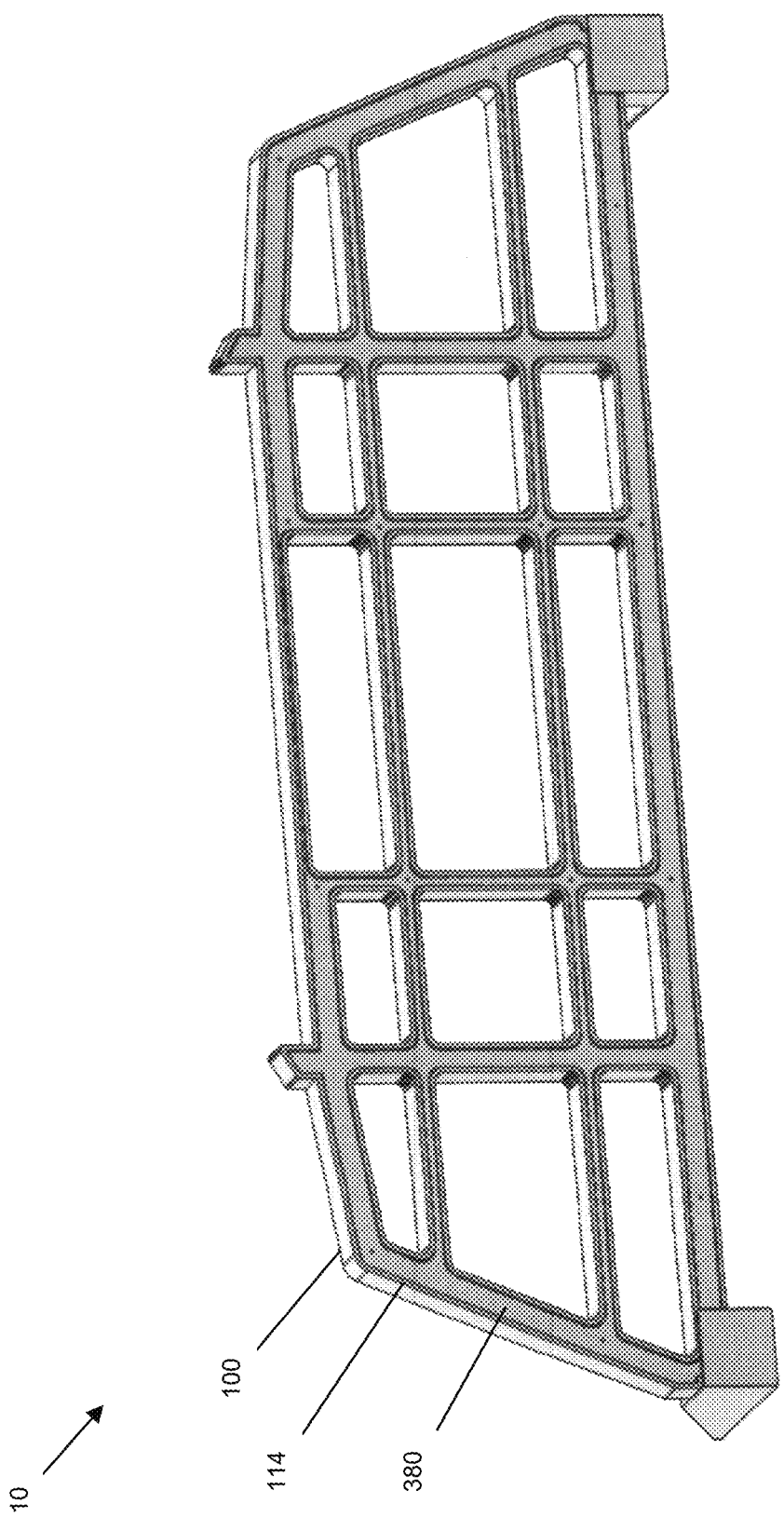
FIG. 66 is a perspective view of the rack of FIG. 65 with a cap covering the cavity.

In some embodiments, where a cavity 374 is defined by at least one of the plurality of barrier members 304, the rack 30 further comprises a cap 380 that is configured cover the cavity 374 and prevent liquid, debris, or dirt from entering the cavity 374, as depicted in FIG. 66. In some embodiments, the cap 380 is configured to be received over the first external surface 314, or the front-facing external surface, of the barrier 300 to cover the cavity 374, which may prevent liquid, debris, or dirt from entering and accumulating in the cavity 374. In some embodiments, the cap 380 is configured to be received in the cavity 374 to cover the cavity 374, which may prevent liquid, debris, or dirt from entering and accumulating in the cavity 374.

In some embodiments, for example, while the rack is mounted to the vehicle and the cap 380 is covering the cavity 374, the cap 380 is disposed in opposition to the rear window.

In some embodiments, for example, the cap 380 is fastened to the barrier 300 using, for example, fasteners.

In some embodiments, the barrier 300 includes a plurality of apertures 302, similar to the apertures 102 described with respect to the barrier 100 of the rack 10. Each one of the plurality of apertures 302, independently, is defined between a respective plurality of merging barrier members 304, as depicted in FIG. 58 to FIG. 60.

In some embodiments, the plurality of apertures 302 is configured to prevent oversized objects from passing through the plurality of apertures 302.

Similar to the rack 10, in some embodiments, the barrier 300 may have a central portion 320, a first portion 330, and a second portion 340, as depicted in FIG. 58. When the barrier 300 is disposed in opposition to the rear window of such a cab, the central portion 320 of the barrier 300 may be opposed to a portion of the rear window corresponding to the central portion of the cab, the first portion 330 of the barrier 300 may be opposed to a portion of the rear window corresponding to the first portion of the cab (e.g. the driver side of the cab), and the second portion 340 of the barrier 300 may be opposed to a portion of the rear window corresponding to the second portion of the cab (e.g. the passenger side of the cab). In some embodiments, the central portion 320 of the barrier 300 includes a space 302A defined below the at least one load distributing member 360, the space 302A having an area. In some embodiments, the first portion 330 of the barrier 300 includes at least one aperture 302B. In the example embodiment depicted in FIG. 58 to FIG. 60, the first portion 330 of the barrier 300 includes five apertures 302B. In some embodiments, the second portion 340 of the barrier 300 includes at least one aperture 302C. As depicted in FIG. 58 to FIG. 60, the second portion 340 of the barrier 300 includes five apertures 302C.

In some embodiments, the barrier 300 has the central portion 320, a first portion 330 disposed adjacent the central portion 320 on one side of the central portion 320, and a second portion 340 disposed adjacent the central portion 320 on a second, opposite side of the central portion 320, wherein the central portion 320 includes a space defined below the at least one load distributing member 360 having a first area, and the first portion 330 and the second portion 340 each include at least one aperture 302B and 302C having a second area, wherein the first area is larger than the second area. In some embodiments, where the first portion 330 and the second portion 340 each include a plurality of apertures 302B and 302C, the area of the space 302A below the at least one load distributing member 360 is larger than the area of the apertures 302B and 302C of the first portion 330 and the second portion 340.

In some embodiments, while the rack 30 is mounted to the vehicle, a space 302A is defined under the at least one load distributing member 360 disposed in a central portion 320 of the barrier 300, a second set of apertures 302B defined in a first portion 330 of the barrier 300 disposed adjacent to and on a first side of the central portion 320, and a third set of apertures 302C defined in a second portion 340 of the barrier 300 disposed adjacent to the central portion 320 on a second opposite side of the central portion 320; wherein the space 302A is larger than the second and third set of apertures 302B and 302C. In some embodiments, the second and third set of apertures 302B and 302C each comprise a plurality of apertures of different sizes.

In some embodiments, for example, the space 302A below the at least one load distributing member 360 provides line of sight from the cab through the barrier 300, while the apertures 302B and 302C are configured to prevent oversized objects from contacting the rear window of the cab.

In some embodiments, for example, the at least one load distributing member 360 is configured to prevent oversized objects from passing through and contacting the rear window of the cab, for example, in order to protect a person that may be in the cab. In some embodiments, for example, as depicted in FIG. 58 to FIG. 60, the first load distributing member 3602 extends across the first portion 330 of the barrier 300, with the first load distributing member 3602 extending generally diagonally across the first portion 330 of the barrier 300. Similarly, the second load distributing member 3604 extends across the second portion 340 of the barrier 300, with the second load distributing member 3604 extending generally diagonally across the second portion 340 of the barrier 300. In some embodiments, for example, while the rack 30 is mounted to the vehicle, the first load distributing member 3602 and the second load distributing member 3604 are disposed in opposition or in alignment with portions of the vehicle cab that may have a person during operation of the vehicle may be configured to prevent oversized objects from passing through and contacting these portions of the cab to protect a person that may be in the cab.

Figure 68:
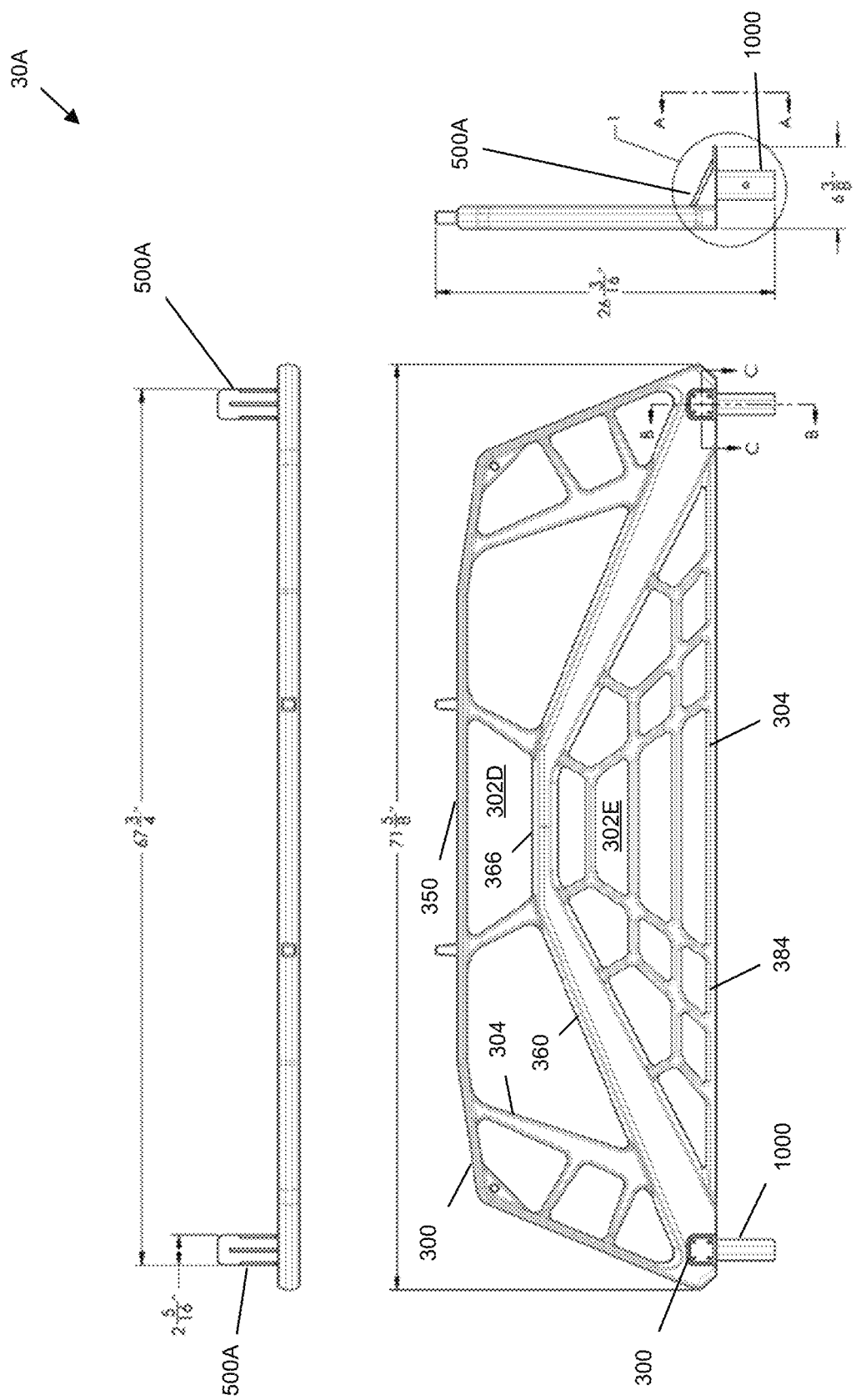
FIG. 68 is a schematic of an alternate embodiment of the rack of FIG. 67.

FIG. 67 and FIG. 68 depicts a rack 30A that is an alternate embodiment of the rack 30.

The rack 30A is similar to the rack 30. As depicted in FIG. 58, the reinforcing member 366 of the rack 30 is joined directly with the load supporting member 350. As depicted in FIG. 67 and FIG. 68, the rack 30A is offset from the load supporting member 350, and is connected to the load supporting member 350 by one or more of the plurality of barrier members 304. In some embodiments, for example, the load supporting member 350, the offset reinforcing member 366, and the barrier members 304 that connect the load supporting member 350 and the reinforcing member 366 are co-operatively configured to define an aperture 302D. When the rack 30A is mounted to the vehicle and disposed in opposition to the rear window, in some embodiments, for example, line of sight is provided from the cab through the aperture 302D.

Figure 70:
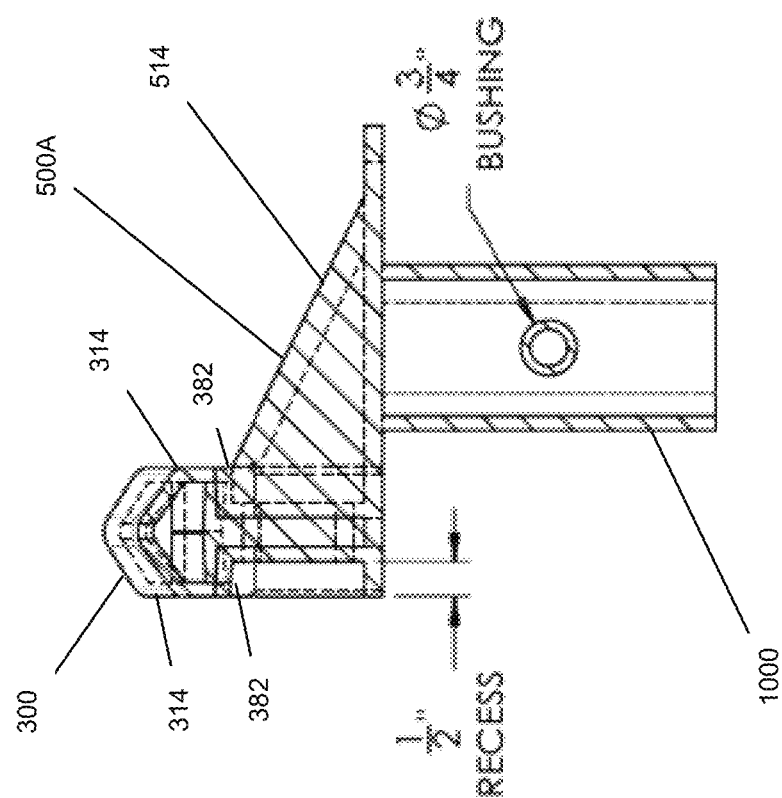
FIG. 70 is a side view of the mounting bracket and connector of the rack of FIG. 68 with a cutaway along line B-B shown in FIG. 68.
Figure 72:
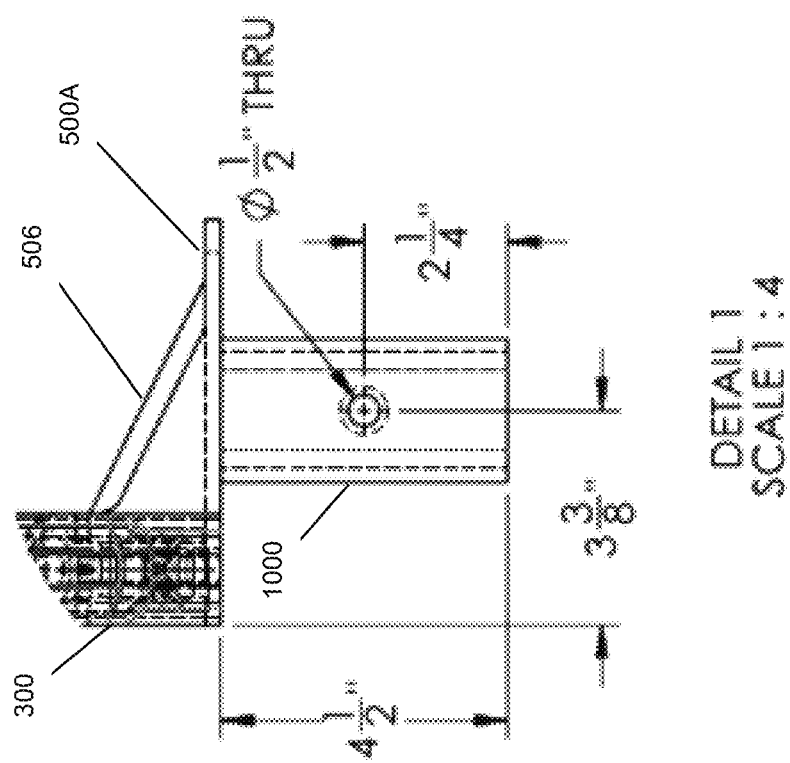
FIG. 72 is an enlarged view of the portion of the rack of FIG. 68, the portion identified by window 1 shown in FIG. 68.

In addition, while the base portion 200 of the rack 30 includes the connector 1000 and the barrier 300 and the connector 1000 are of unitary one piece construction, the base portion 200 of the rack 30A includes the mounting bracket 500A and the connector 1000, and the barrier 300, the mounting bracket 500A, and the connector 1000 are separate components, as depicted in FIG. 68, FIG. 70, and FIG. 72. The barrier 300, the mounting bracket 500A, and the connector 1000 can be connected together using, for example, fasteners, or with friction fit, interference fit, and the like.

Figure 69:
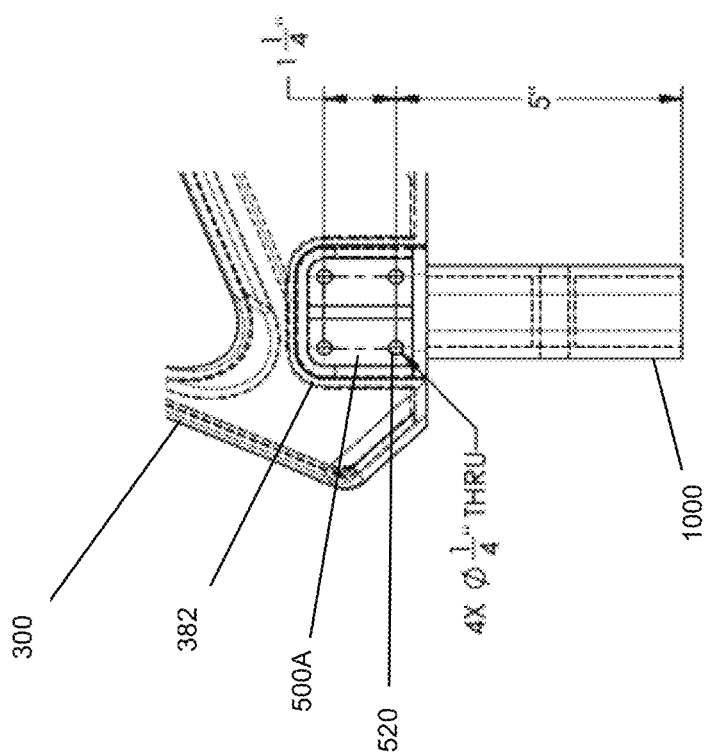
FIG. 69 is a front view of the mounting bracket and connector of the rack of FIG. 68 with a cutaway along line A-A shown in FIG. 68.
Figure 71:
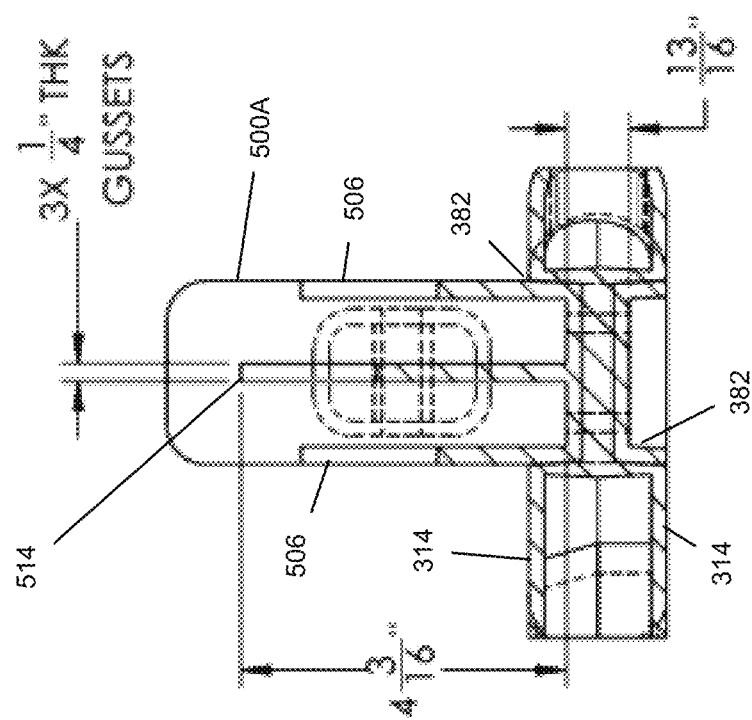
FIG. 71 is a top view of the mounting bracket of the rack of FIG. 68 with a cutaway along line C-C shown in FIG. 68.

In this regard, the barrier 300 defines a recess 382 to receive the mounting bracket 500. As depicted in FIG. 68 and FIG. 69, the barrier 300 defines two recesses 382, one recess at a first end 300A and one recess at a second end 300B of the barrier 300, to receive the mounting bracket 500A. As depicted in FIG. 70 and FIG. 71, the barrier 300 may define opposing recesses 382, one recess defined on a first external surface 314, and another recess defined on a second external surface 314. When the mounting bracket 500A is received in the recess 382, the mounting bracket 500A may be fastened to the barrier 300 using, for example, fasteners. As depicted in FIG. 70, an example depth of the recess 382 is 0.5".

In some embodiments, the mounting bracket 500A defines one or more ports 520 to receive the fasteners to fasten the mounting bracket 500A to the barrier 300. As depicted in FIG. 69, in some embodiments, for example, the mounting bracket 500A has four ports 520, with adjacent ports 520 spaced apart by an example distance of 1.25". As depicted in FIG. 69, an example diameter of the ports 520 is 0.25".

The mounting bracket 500A of the rack 30A is similar to the mounting bracket 500 described herein with respect to the rack 10 or the rack 30, except the mounting bracket 500A does not have an intermediate wall 508 that extends widthwise along the body of the mounting bracket 500, as depicted in FIG. 5 to FIG. 8. Rather, the mounting bracket 500A has two side walls 506 and a middle wall 514 that extends length-wise of the body of the mounting bracket 500A, and is disposed between the two side walls 506, as depicted in FIG. 70 and FIG. 71. The middle wall 514 provides strength and rigidity to the mounting bracket 500A and the base 200 when the mounting bracket 500A is received in the recess 382 of the barrier 300 and fastened to the barrier 300, and promotes distribution of the load applied to the barrier 300 to the bottom wall 502 of the mounting bracket 500A. Similar to the mounting bracket 500, the mounting bracket 500A has a slot 504 that is configured to receive a mechanical fastener to connect the mounting bracket 500A and the connector 1000. Wth the barrier 300, the mounting bracket 500A, and the connector 1000 fastened together, and with the connector 1000 fastened to the vehicle, such as a truck bed, the rack 30 is mounted to and fastened to the vehicle and disposed in opposition to the rear window.

As depicted in FIG. 68, the mounting bracket 500A has an example width of 2.3125" and an example length of 6.375".

As depicted in FIG. 71, the middle wall 514 has an example length of 4.1875".

In some embodiments, for example, as depicted in FIG. 68, at least one of the plurality of barrier members 304 defines a supporting web 384. The supporting web 384 is disposed between the load supporting member 350 and the base 200. In some embodiments, for example, the supporting web 384 is disposed between the at least one load distributing member 360 and the base 200. In some embodiments, for example, the supporting web 384 is disposed below the at least one load distributing member 360. As depicted in FIG. 68, the supporting web 384 is connected to the load distributing member 360 at a plurality of points. The supporting web 384 is configured to provide strength and rigidity to the load distributing member 360, and to promote load distribution from the load supporting member 350 to the base 200. The at least one of the plurality of barriers 304 that defines the supporting web 384 defines at least one aperture 302E. As depicted din FIG. 68, the at least one of the plurality of barriers 304 that defines the supporting web 384 defines a plurality of apertures 302E When the rack 30A is mounted to the vehicle and disposed in opposition to the rear window, in some embodiments, for example, line of sight is provided from the cab through at least one of the apertures 302E.

In other embodiments, for example, as described with respect to the rack 10, the barrier 300, the one or more mounting brackets 500A, and the connector 1000 of the rack 30A may be of unitary one piece construction.

In some embodiments, for example, as described with respect to the rack 10, the one or more mounting brackets 500A and the connector 1000 are of unitary one piece construction, and may be fastened to the barrier 300 using, for example, fasteners.

In some embodiments, for example, as described with respect to the rack 10, the barrier 300 and the one or more mounting brackets 500A are of unitary one piece construction, and may be fastened to the connector 1000 using, for example, fasteners.

In some embodiments, for example, the rack 30A is similar to the rack 30, where the rack 30A includes the barrier 300 and the connector 1000 without the one or more mounting brackets 500A, and is of unitary one piece construction, except the supporting member 366 is offset from the load supporting member 350, as depicted in FIG. 67.

As depicted in FIG. 68, an example width of the rack 30A is 71.625".

As depicted in FIG. 68, an example height of the rack 30A is 26.1875".

As depicted in FIG. 72, an example height of the connector is 1000 4.5".

Example dimensions of the rack 30A are depicted in FIG. 68 to FIG. 72.

In some embodiments, for example, a kit for installing a rack system on a vehicle comprises the rack 30 or 30A and one or more connectors 1000, similar to the kit comprising the rack 10, as described herein.

In some embodiments, for example, a kit for installing a rack system on a vehicle comprises the rack 30, 30A, one or more mounting brackets 500, 500A, and one or more connectors 1000, similar to the kit comprising the rack 10, as described herein.

In some embodiments, the barrier 100, 300 of the rack 10, 30, 30A comprises a built-in conduit to accommodate a wiring harness for auxiliary lighting. The rack 10 rack 10, 30, 30A may provide a wiring solution for light accessories, such that the cords of the light accessories are protected.

In some embodiments, where the barrier 100, 300 defines the cavity 374, the barrier 100, 300 of the rack 10, 30, 30A comprises one or more drain holes, such that liquid that may enter the cavity 374 may drain via the drain holes and does not accumulate in the cavity 374.

In some embodiments, the rack 10, 30, 30A, or components of the rack 10, 30, 30A, such as the barrier 100, 300, the base 200 having one or more mounting racks 500, or the connector 1000, is manufactured by injection moulding. In some embodiments, the connector 1000 is extruded and made of aluminum. In some embodiments, for example, during injection moulding of the rack 10, 30, 30A, a mould insert may be inserted in the mould to change the dimensions of one or more features of the rack 10, 30, 30A. For example, during injection moulding of the rack 10, 30, 30A, a mould insert may be inserted in the mould to change the dimensions of the mounting bracket 500, 500A, in order to be able to mount the rack 10, 30, 30A to vehicles, for example, on truck beds, where the truck beds of different vehicles are of different sizes. As another example, during injection moulding of the rack 10, 30, 30A, a mould insert may be inserted in the mould to change the dimensions of the connector 1000, in order for the connector 1000 to be receivable in the stake pockets 1608 of vehicles, where the stake pockets 1608 of different vehicles are of different sizes.

In some embodiments, a material of construction of the rack 10, 30, 30A, for example, the barrier 100, 300, the base 200 having one or more mounting racks 500, or the connector 1000, is plastic.

In some embodiments, a material of construction of the rack 10, 30, 30A, for example, the barrier 100, 300, the base 200 having one or more mounting racks 500, or the connector 1000, is one of high impact copolymer, nylon, polypropylene, and thermoplastic.

In some embodiments, a material of construction of the rack 10, 30, 30A, for example, the barrier 100, 300, the base 200 having one or more mounting racks 500, or the connector 1000, is polypropylene with 30% glass fiber filler, or a thermoplastic.

By using thermoplastic to manufacture the rack 10, 30, 30A, the rack 10, 30, 30A may be produced at high volume. In addition, the thermoplastic may not react to aluminum in the same manner as steel, for example. Contact between steel and aluminum may cause a galvanic reaction.

By using thermoplastic to manufacture the rack 10, 30, 30A, the rack 10, 30, 30A may be manufactured in multiple colours or with coatings, such as a camouflage coating, or have a carbon fiber appearance.

In some embodiments, the vehicle on which the rack 10, 30, 30A is configured for mounting is a truck.

In some embodiments, the vehicle on which the rack 10, 30, 30A is configured for mounting includes a truck bed disposed rearward of the rear window, for transporting objects.

In some embodiments, the vehicle on which the rack 10, 30, 30A is configured for mounting includes a truck bed, where the truck bed as a minimum area of at least 2550 square inches.

In some embodiments, the rack 10, 30, 30A is configured to support up to 150 pounds.

In some embodiments, the rack 10, 30, 30A complies with Federal Motor Vehicle Safety Standards, codified at 49 CFR 571, such that a rear top mount brake light is visible.

In some embodiments, the rack 10, 30, 30A complies with Canadian Motor Vehicle Safety Standards. The Canadian Motor Vehicle Safety Regulations is codified as CRC, c. 1038, such that a rear top mount brake light is visible.

When the rack 10, 30, 30A is mounted to the rail 1602 of the truck bed 1600, the rack 10, 30, 30A may protect the rear window 2004 from unsecured cargo in the truck bed 1600. The unsecured cargo may move and may contact the rear window 2004 based on acceleration or deceleration of the truck 2000.

The rack 10, 30, 30A may also provide a support to rest and secure cargo with a long length (e.g. ladders, lumber) and protect the top or roof of the truck cab 2002 from being contacted by such cargo that would not fit in the truck bed 1600. In some embodiments, the rack 10, 30, 30A is configured to protect the truck cab 2002, which may have a height of 5.5 feet, 6 feet, 8 feet, such as the truck cabs 2002 of a Ford F150®, Ford F250®, and Ford F350®, for example, or that may have a height of less than 5 feet or a height of greater than 8 feet.

In some embodiments, the one or more merging barrier members 104, 304 may provide contact points, support points, or attachment points for supporting a load or attaching a load, like lights and tools, such as warning lights, LED beam lights, traffic signal lights, strapping systems, SUP boards, shovels, rakes, drills, saws, cargo cases, tool boxes, and the like, using belts, straps, ropes, cables, chains, brackets, clamps, and the like.

In some embodiments, the rack 10, 30, 30A, made with plastic, such as a thermoplastic, may have a weight of approximately 25 pounds, compared to metal racks that may weigh approximately 75 pounds. In some embodiments, the rack 10, 30, 30A may weigh approximately 25 pounds. In some embodiments, the rack may weigh less than 25 pounds. In some embodiments, the rack 10, 30, 30A may be more than half the weight of a rack made with steel, and may be approximately 60% of the weight of a rack made with aluminum. In some embodiments, the rack 10, 30, 30A may weigh less than 20 pounds. In some embodiments, the rack 10, 30, 30A may weigh approximately 20 pounds. The relatively light weight of the rack 10, 30, 30A may present ease of shipping, handling, and installing the rack 10, 30, 30A. The relatively light weight of the rack 10, 30, 30A may allow for one person to install and uninstall the rack 10, 30, 30A, without assistance from others. The relatively light weight of the rack 10, 30, 30A may improve the fuel efficiency of the vehicle on which the rack 10, 30, 30A is mounted, compared to the fuel efficiency of the vehicle on which a heavier metal rack is mounted. In addition, the rack 10, 30, 30A, made with plastic, may not be susceptible to rust, which may reduce wear and tear on the rack 10, 30, 30A and may reduce or prevent such rust damage to the vehicle on which the rack 10, 30, 30A is mounted or fasteners used with the rack 10, 30, 30A for fastening the rack 10, 30, 30A to the vehicle.

Figure 51:
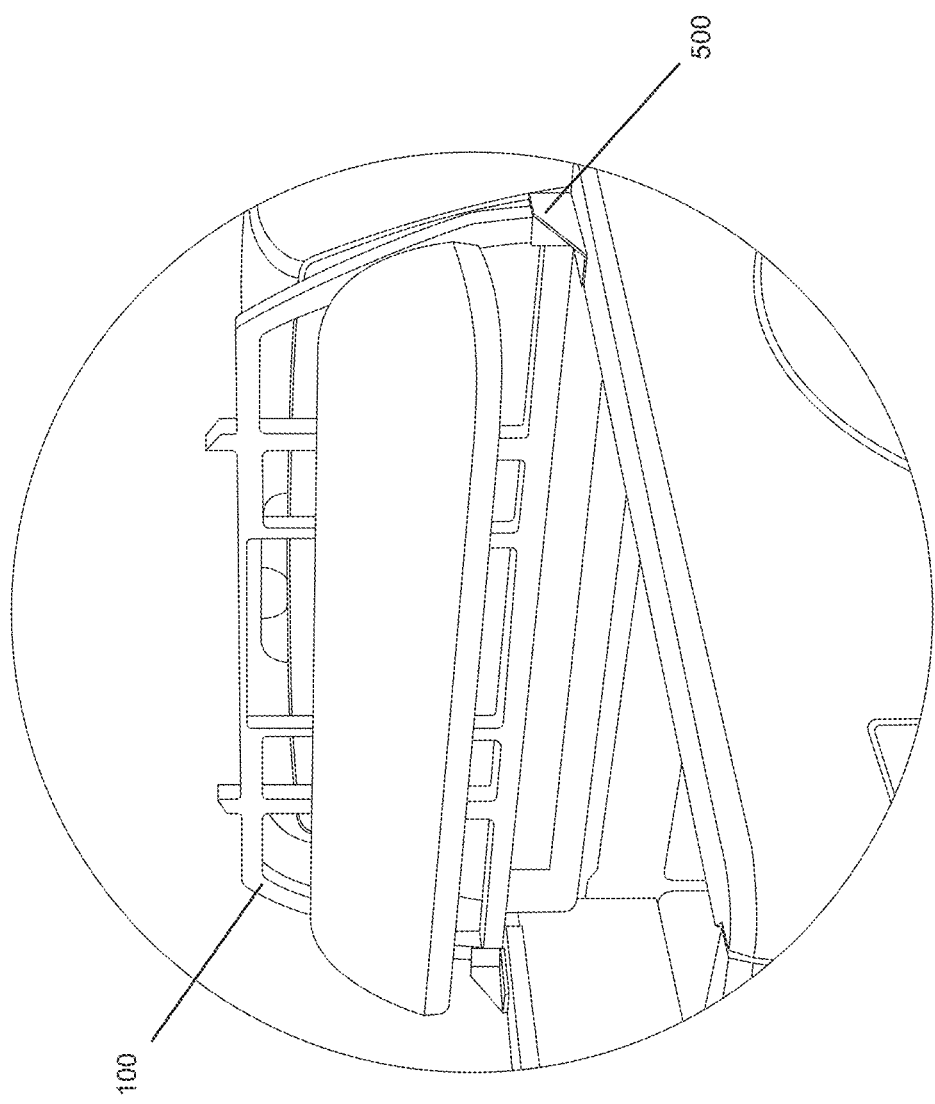
FIG. 51 is a schematic of a rack fastened to a rail of a truck bed with the rack supporting a tool box.
Figure 52:
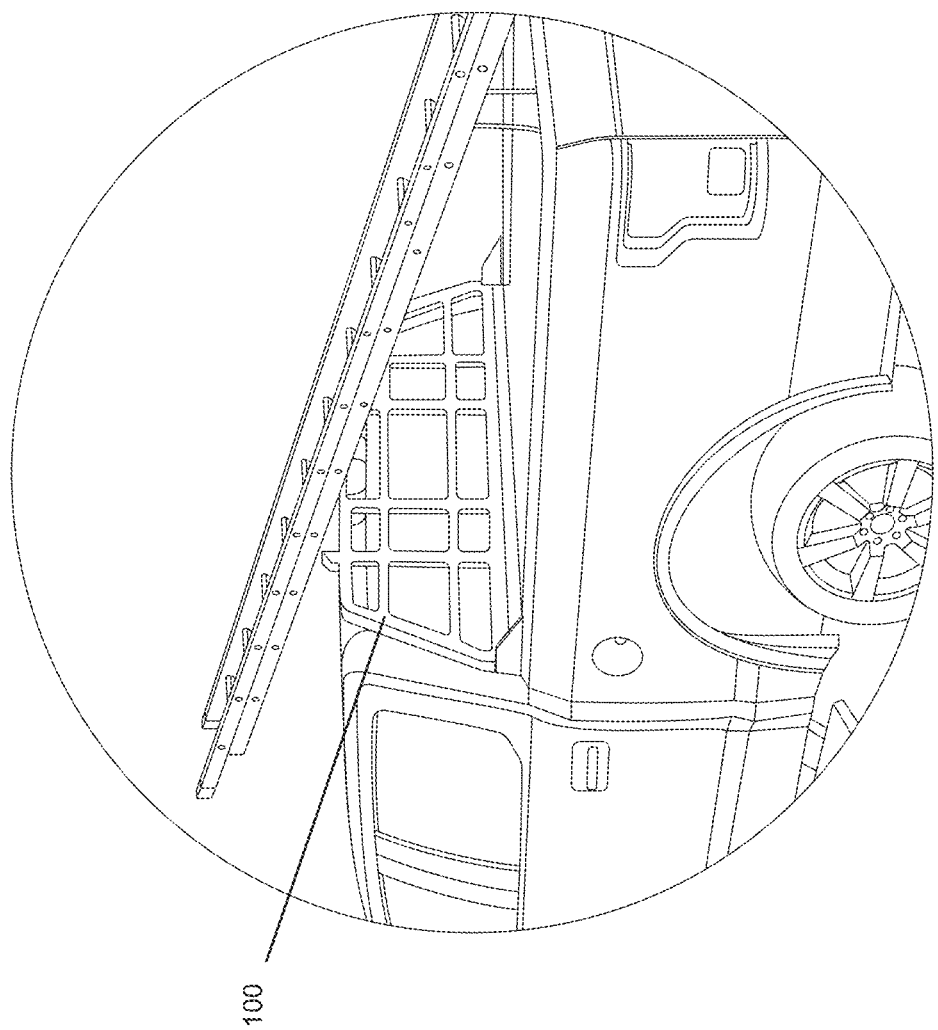
FIG. 52 is a schematic of a rack fastened to a rail of a truck bed with the rack supporting a ladder.
Figure 53:
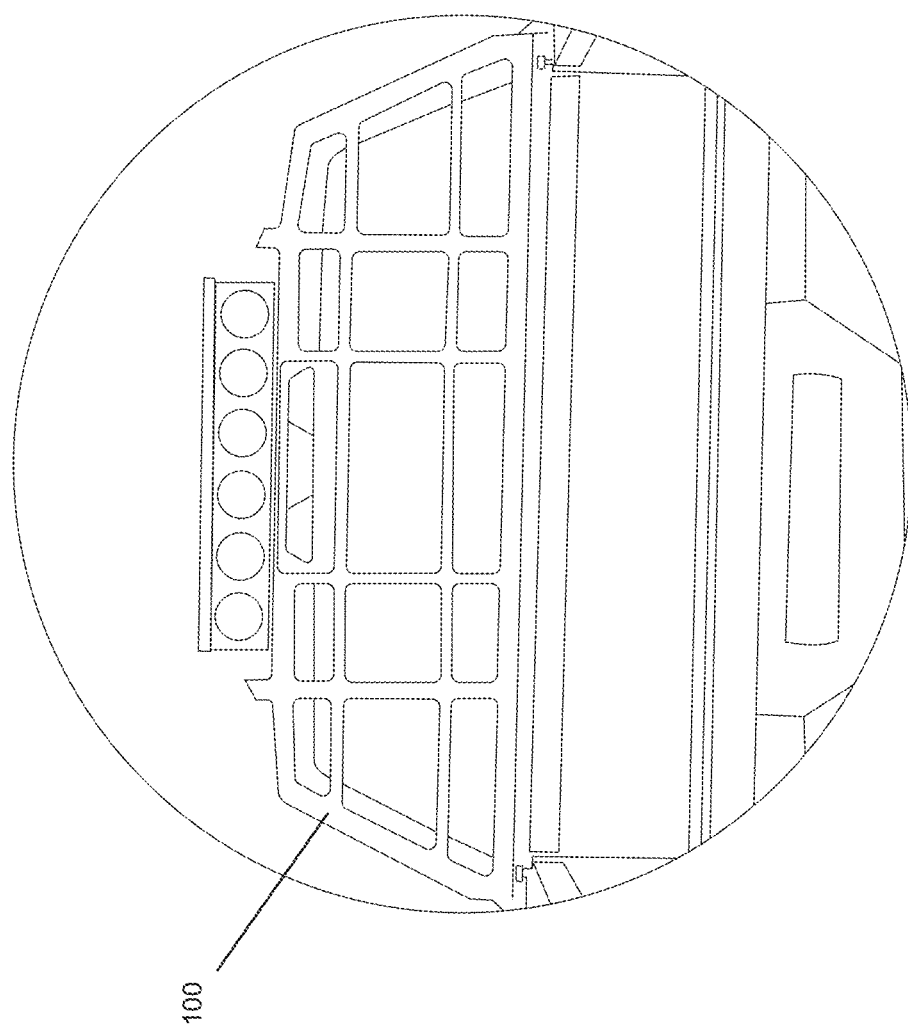
FIG. 53 is a schematic of a rack fastened to a rail of a truck bed with the rack supporting a light assembly.
Figure 54:
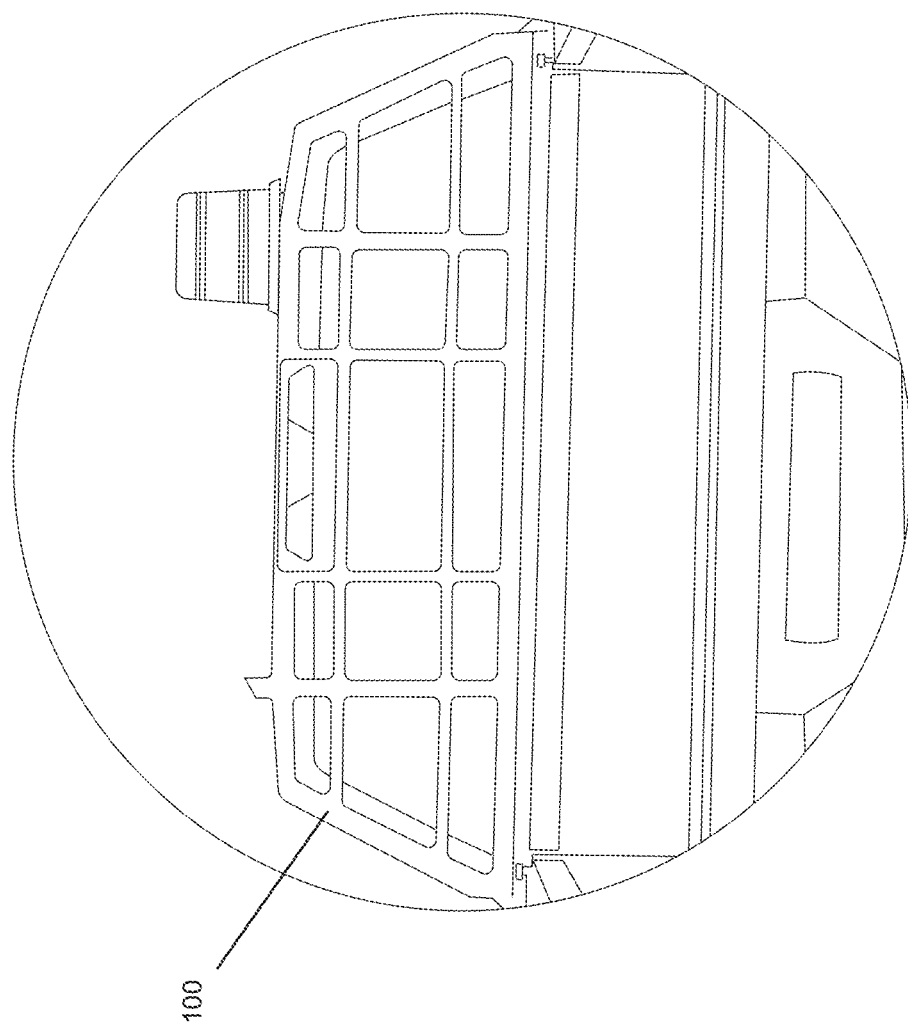
FIG. 54 is a schematic of a rack fastened to a rail of a truck bed with the rack supporting a warning light.
Figure 55:
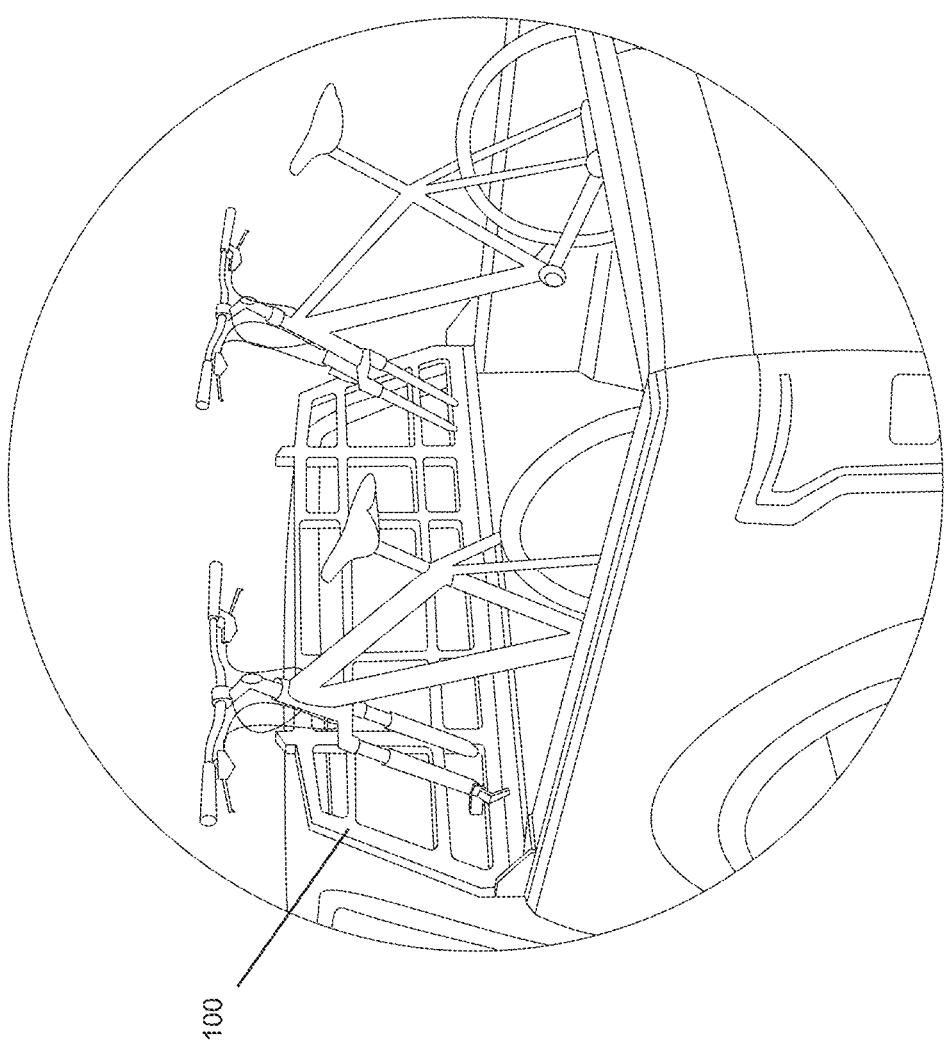
FIG. 55 is a schematic of a rack fastened to a rail of a truck bed with the rack supporting a bicycle frame.
Figure 56:
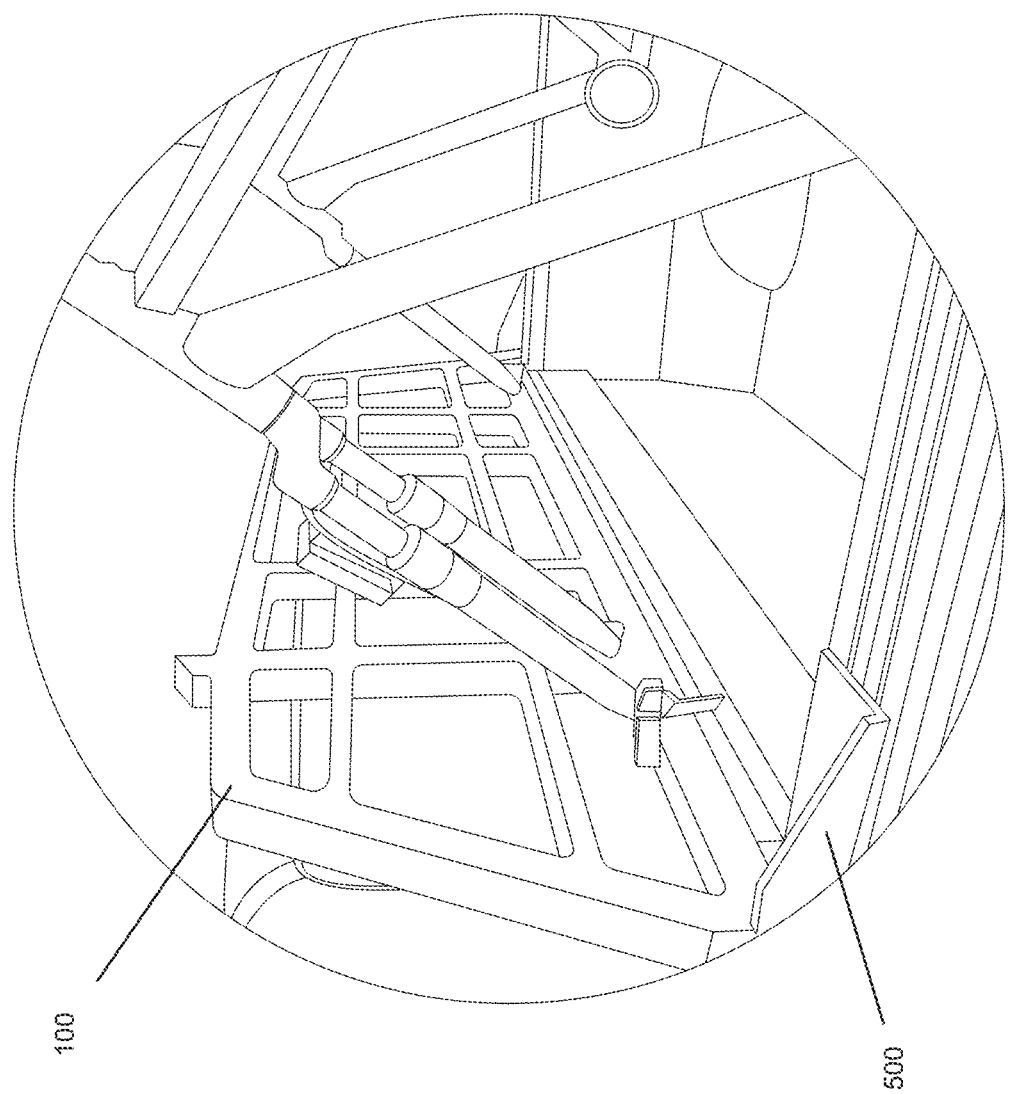
FIG. 56 is a schematic of a rack fastened to a rail of a truck bed with the rack supporting a bicycle frame.

In some embodiments, at least one of the barrier members 104, 304 of the barrier 100, 300 is configured for supporting a load. In some embodiments, at least one of the barrier members 104, 304 of the barrier 100, 300 is configured for attaching a load. For example, as depicted in FIG. 51, a tool box can be supported by and attached to one or more barrier members 104 of the barrier 100. As depicted in FIG. 51, the tool box can be supported by and attached to one or more barrier members 104 of a middle portion of the barrier 100. In some embodiments, for example, the tool box has one lockable gull wing door on each end of the tool box. The tool box may have an example height of 20", an example width of 72" measured along the base of the tool box, 16" depth at the top of the tool box and 20" depth at the bottom of the tool box. For example, as depicted in FIG. 52, a ladder can be supported by and attached to one or more barrier members 104 of the barrier 100. For example, as depicted in FIG. 53, a light assembly can be supported by and attached to one or more barrier members 104 of the barrier 100. For example, as depicted in FIG. 54, a warning light can be supported by and attached to one or more barrier members 104 of the barrier 100. As depicted in FIG. 52 to FIG. 54, the ladder, the light assembly, or the warning light may be supported by and attached to one or more barrier members 104 of an upper portion of the barrier 100. For example, as depicted in FIG. 55, one or more bicycle frames can be supported by and attached to one or more barrier members 104 of the barrier 100. For example, as depicted in FIG. 56, one or more bicycle frames can be supported by and attached to one or more barrier members 104 of the barrier 100. As depicted in FIG. 55 and FIG. 56, the bicycle frame may be supported by and attached to one or more barrier members 104 of a lower portion of the barrier 100. In some embodiments, for example, the one or more barrier members 104 that supports the bicycle frame is a 2"×2" tube.

In some embodiments, where the rack 10, 30, 30A is made with plastic, the rack 10, 30, 30A may be used outdoors, or may be used to protect the rear window 2004 of the truck 2000 when the truck 2000 is outdoors. In addition, cargo made with metal or have metal components, or cargo that may be wet, may be supported by or attached to the rack 10, 30, 30A without rust damage or reduced wear and tear damage to the rack 10, 30, 30A, such as bicycles, bicycle forks, all terrain vehicles, fishing rods, canoes, kayaks, stand-up paddle boards, skis, snowboards, weapons, guns, and the like.

Figure 50:
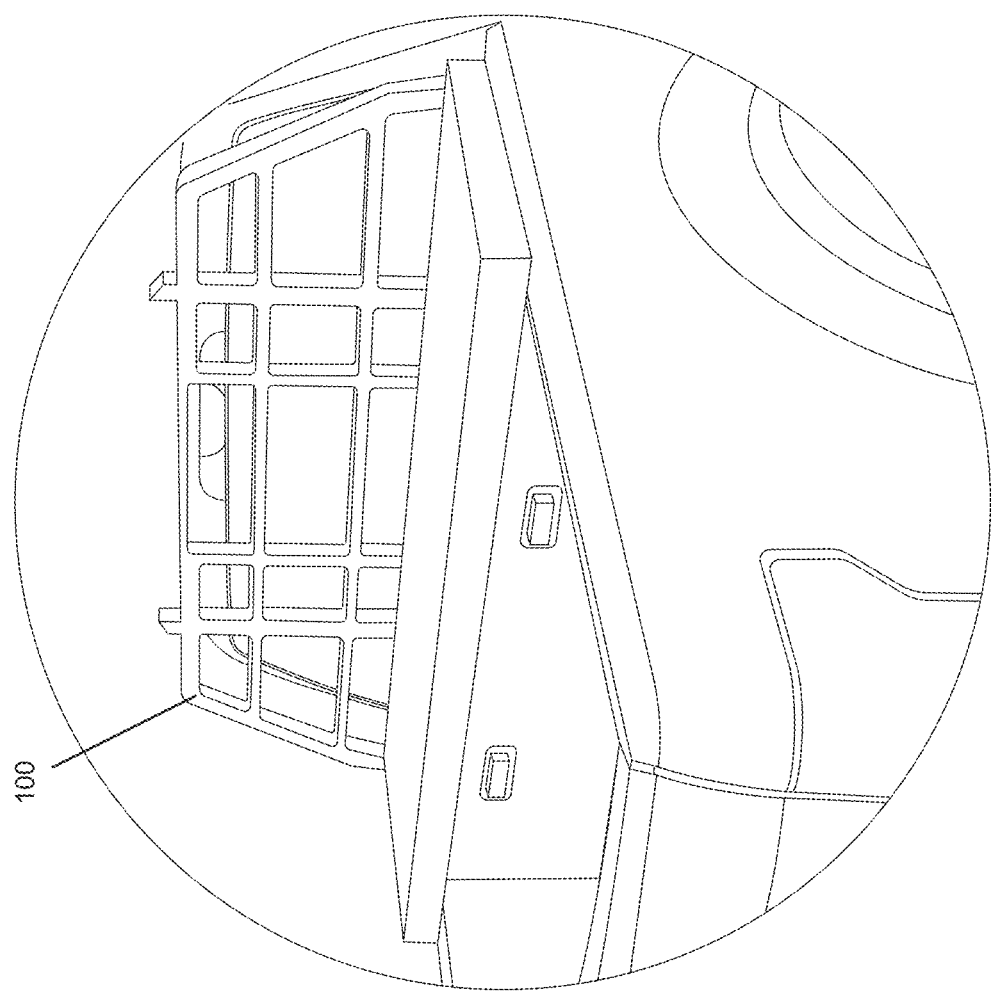
FIG. 50 is a schematic of a rack fastened to a rail of a truck bed, and a tool box in the truck bed.

In some embodiments, while the rack 10, 30, 30A is mounted to a vehicle, the rack 10, 30, 30A is configured to accommodate accessories of the vehicle, such as tool boxes and tonneau covers. For example, as depicted in FIG. 46 to FIG. 49, the rack 10 may be mounted and fastened to a rail 1602 of a truck bed 1600 that is covered with a truck bed cover. For example, as depicted in FIG. 50, the rack 10 may be mounted and fastened to a rail 1602 of a truck bed 1600 that has a tool box, where the tool box is received in the truck bed 1600 and a portion of the lid of the tool box rests on the rail 1602 of the truck bed 1600.

In some embodiments, where the rack 10, 30, 30A is made with plastic, the rack 10, 30, 30A may contact the metal components of the vehicle on which the rack 10, 30, 30A is mounted, and may prevent or reduce corrosion of the metal components of the vehicle, where such corrosion of the metal components of the vehicle may be due to dissimilar metal corrosion or galvanic corrosion, which may occur if the rack 10, 30, 30A were manufactured with metal.

In some embodiments, where the rack 10, 30, 30A is made with plastic, the rack 10, 30, 30A may be recycled at end of life using, for example, plastic recycling methods.

In some embodiments, the rack 10, 30, 30A may be mounted and fastened to a vehicle using the connector 1000 by a fastener. Similarly, the rack 10, 30, 30A may be dismounted and removed from the vehicle by disengaging or loosening the fastener. Accordingly, the rack 10, 30, 30A may be installed or installed from the vehicle using a fastener, without additional parts, such as additional brackets or clamps, and the like, or without additional tools, such as drills. This may provide relative ease of install or ease of uninstall of the rack 10, 30, 30A, such that the rack 10, 30, 30A may be installed or uninstalled from the vehicle as desired. As such, a user may install the rack 10, 30, 30A on the vehicle when the user needs the rack 10, 30, 30A, and the user may uninstall the rack 10, 30, 30A from the vehicle when the user does not need the rack 10, 30, 30A, as desired. In some embodiments, the rack 10, 30, 30A and the connector 1000 may be installed on the vehicle if desired, such that the rack 10, 30, 30A and the connector 1000 may effectively be permanently mounted and fastened to the vehicle. In some embodiments, the rack 10, 30, 30A and the connector 1000 may be installed on the vehicle, and then the rack 10, 30, 30A and the connector 1000 may be uninstalled from the vehicle, such that the rack 10, 30, 30A and the connector 1000 may be releasably mounted and fastened to the vehicle. Rack 10, 30, 30A may provide flexibility for when a user wants to have the rack 10, 30, 30A mounted to the vehicle and when the user does not want to have the rack 10, 30, 30A mounted to the vehicle.

In some embodiments, by being one piece plastic injection moulded, the cost to manufacture the rack 10, 30, 30A may be lower than racks made of metal, such as steel or aluminum.

In some embodiments, where the rack 10, 30, 30A comprises the barrier 100, 300, the base 200 having one or more mounting brackets 500, and the connector 1000, the barrier 100, 300, the base 200 having one or more mounting brackets 500, and the connector 1000 may be separate components, such that they may be separately manufactured and then fastened together. In such embodiments, this may provide relative ease of shipping and handling the components or the components, such as the mounting bracket 500, may be used for another purpose, such as for mounting another embodiment of the rack 10, 30, 30A or the barrier 100, 300.

In some embodiments, where the rack 10, 30, 30A is manufactured by injection moulding, the rack 10, 30, 30A may be manufactured to supply high volume production.

The preceding discussion provides many example embodiments. Although each embodiment represents a single combination of inventive elements, other examples may include all suitable combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be examples only. The invention is defined by the appended claims.

What is claimed is:

1. A rack of unitary one-piece construction for mounting to a vehicle including a cab having a rear window, the rack comprising:
   a barrier defined by a plurality of barrier members;
   a base for mounting the rack to the vehicle;
   wherein:
   at least one of the plurality of barrier members defines a load supporting member that is configured to support a load applied to the barrier, the load supporting member including a longitudinal axis;
   a normal axis is defined relative to the longitudinal axis of the load supporting member;
   the plurality of barrier members includes at least one load distributing member, where the at least one load distributing member is disposed between the load supporting member and the base, and configured to distribute the load supported by the load supporting member to the base;
   wherein the barrier and the vehicle are co-operatively configured for disposition of the barrier in opposition to the rear window such that, while the rack is mounted to the vehicle:
   line of sight is provided from the cab below the load distributing member;
   the barrier prevents oversized objects from contacting the rear window; and
   for each of the at least one load distributing members, independently, a ray, that is disposed along a longitudinal axis of the at least one load distributing member and extending towards a side of the cab, is disposed at an acute angle between 30 degrees and 70 degrees relative to the normal axis of the load supporting member.

2. The rack of claim 1, wherein the ray, that is disposed along the longitudinal axis of the load distributing member, is disposed at an acute angle of 50 degrees relative to the normal axis of the load supporting member.

3. The rack of claim 1, wherein the at least one load distributing member is a first load distributing member that is disposed between the load supporting member and the base, and a second load distributing member that is disposed between the load supporting member and the base, wherein a first ray that is disposed along a longitudinal axis of the first load distributing member is disposed at an acute angle between 30 degrees and 70 degrees relative to the normal axis of the load supporting member, and a second ray that is disposed along a longitudinal axis of the second load distributing member is disposed at an acute angle between 30 degrees and 70 degrees relative to the normal axis of the load supporting member.

4. The rack of claim 3, wherein the barrier and the vehicle are co-operatively configured such that the first ray extends towards a first side of the cab, and the second ray extends towards a second side of the cab that is opposite the first side of the cab.

5. The rack of claim 4, wherein the barrier and the vehicle are co-operatively configured such that the first ray extends from a first end of the barrier towards the first side of the cab, the first end of the barrier disposed opposite the first side of the cab, and the second ray extends from a second end of the barrier towards the second side of the cab, the second end of the barrier disposed opposite the second side of the cab, the second end of the barrier disposed opposite the first end of the barrier, and the second side of the cab disposed opposite the first side of the cab.

6. The rack of claim 3, wherein the ray that is disposed along the longitudinal axis of the first load distributing member is disposed at an acute angle of 50 degrees relative to the normal axis of the load supporting member, and the ray that is disposed along the longitudinal axis of the second load distributing member is disposed at an acute angle of 50 degrees relative to the normal axis of the load supporting member.

7. The rack of claim 1, wherein the base and the barrier are of unitary one piece construction.

8. The rack of claim 1, wherein the base comprises a first mounting bracket and a second mounting bracket, each of the first and second mounting brackets comprising a mounting surface for engaging the vehicle, wherein engagement of the mounting surface of the first and second mounting brackets and the vehicle is such that the barrier is disposed in opposition to the rear window.

9. The rack of claim 8, wherein the first load distributing member extends from the first mounting bracket, and the second load distributing member extends from the second mounting bracket.

10. The rack of claim 1, wherein the base comprises a first connector and a second connector, each of the first and second connectors for releasably coupling to the vehicle, wherein releasable coupling of the first and second connectors and the vehicle is such that the barrier is disposed in opposition to the rear window.

11. The rack of claim 10, wherein the first load distributing member extends from the first connector, and the second load distributing member extends from the second connector.

12. The rack of claim 1, wherein, while the rack is mounted to the vehicle, a space is defined under the at least one load distributing member disposed in a central portion of the barrier, a first set of apertures is defined by the plurality of barrier members in a first portion of the barrier disposed adjacent to and on a first side of the central portion, and a second set of apertures defined by the plurality of barrier members in a second portion of the barrier disposed adjacent to the central portion on a second side of the central portion opposite the first side, wherein the space is larger than the first and second set of apertures.

* * * * *